(12) United States Patent
Kobayashi et al.

(10) Patent No.: US 11,623,663 B2
(45) Date of Patent: Apr. 11, 2023

(54) TRANSPORT SERVICE METHOD, VEHICLE PLATOONING METHOD, VEHICLE GROUP NAVIGATION SYSTEM, SELF-DRIVING VEHICLE CAPABLE OF PLATOONING, AND GROUPED VEHICLE GUIDANCE DEVICE

(71) Applicant: TOSHIBA DIGITAL SOLUTIONS CORPORATION, Kawasaki (JP)

(72) Inventors: Megumi Kobayashi, Kodaira (JP); Yasuto Hatafuku, Kawasaki (JP); Masahiro Samejima, Minato (JP); Hideki Kubo, Fuchu (JP); Motokazu Iwasaki, Chiba (JP); Yoko Ikeda, Bunkyo (JP); Shinsuke Iuchi, Yokohama (JP); Kiyoshi Takemoto, Setagaya (JP); Keishi Higashi, Hino (JP); Kaori Kitami, Kunitachi (JP); Masaharu Doi, Minato (JP); Tatsuki Shiraishi, Tama (JP); Keiji Ogata, Minato (JP); Yoshiki Yamaoka, Fuchu (JP); Masaru Watabiki, Yokohama (JP); Takeshi Nagai, Tokorozawa (JP); Masao Uozumi, Kawasaki (JP); Masatomo Saito, Kawasaki (JP); Michiyo Sato, Yokohama (JP); Masanori Takahashi, Minato (JP)

(73) Assignee: TOSHIBA DIGITAL SOLUTIONS CORPORATION, Kawasaki (JP)

( * ) Notice: Subject to any disclaimer, the term of this patent is extended or adjusted under 35 U.S.C. 154(b) by 193 days.

(21) Appl. No.: 16/893,484

(22) Filed: Jun. 5, 2020

(65) Prior Publication Data

US 2020/0298882 A1  Sep. 24, 2020

Related U.S. Application Data

(63) Continuation of application No. PCT/JP2018/044806, filed on Dec. 5, 2018.

(30) Foreign Application Priority Data

Dec. 5, 2017 (JP) ............................ JP2017-233519

(51) Int. Cl.
*G08G 1/00* (2006.01)
*B60W 60/00* (2020.01)

(52) U.S. Cl.
CPC .... *B60W 60/0018* (2020.02); *B60W 60/0025* (2020.02); *G08G 1/22* (2013.01); *B60W 2300/12* (2013.01); *B60W 2555/60* (2020.02)

(58) Field of Classification Search
CPC ......... B60W 60/0018; B60W 60/0025; B60W 2300/12; B60W 2555/60; B60W 30/16;
(Continued)

(56) References Cited

U.S. PATENT DOCUMENTS

2012/0143335 A1  6/2012  Yamada et al.
2013/0041576 A1* 2/2013  Switkes ................ G01C 22/00
                                                                         701/123
(Continued)

FOREIGN PATENT DOCUMENTS

CN           105809950 A       7/2016
DE    10 2016 003 432 A1      10/2016
(Continued)

*Primary Examiner* — Nadeem Odeh
(74) *Attorney, Agent, or Firm* — Maier & Maier, PLLC

(57) ABSTRACT

According to one embodiment, a transport service method comprises organizing a vehicle group of a plurality of self-driving vehicles in which a parameter value inherent to vehicles falls within a predetermined range, and controlling cooperative travel of the self-driving vehicles in the vehicle group to perform transport service of baggage, persons, animals, and the like.

5 Claims, 42 Drawing Sheets

(58) Field of Classification Search
CPC ... B60W 40/04; G08G 1/22; G08G 1/096811;
G08G 1/202; G06Q 50/30; G06Q 10/08
See application file for complete search history.

(56) References Cited

U.S. PATENT DOCUMENTS

| | | |
|---|---|---|
| 2014/0316671 A1 | 10/2014 | Okamoto |
| 2018/0211546 A1* | 7/2018 | Smartt .................... H04W 4/46 |
| 2019/0025857 A1* | 1/2019 | Luckevich ............ G01S 13/931 |
| 2019/0130765 A1* | 5/2019 | Tulpule ................... H04W 4/46 |

FOREIGN PATENT DOCUMENTS

| | | |
|---|---|---|
| JP | 07-200991 A | 8/1995 |
| JP | 10-261195 A | 9/1998 |
| JP | 2010-221874 A | 10/2010 |
| JP | 2014-211715 A | 11/2014 |
| JP | 2016-128997 A | 7/2016 |
| JP | 2017-4471 A | 1/2017 |
| JP | 2017-062691 A | 3/2017 |
| SE | 1550387 A1 | 10/2016 |
| WO | WO 2010/143264 A1 | 12/2010 |
| WO | WO-2012105889 A1 * | 8/2012 ........... G05D 1/0293 |

* cited by examiner

1. Platoon organization
    1.1. Platoon organization conditions
    1.2. Platoon order setting method
    1.3. Platoon organization procedure
    1.4. Platoon condition management
    1.5. In-platoon feedforward control
    1.6. Display to outside of platoon
        1.6.1. Display of platoon organization to general vehicle
        1.6.2. Advertising manner using platoon
    1.7. Platoon property adaptability navigation
        1.7.1. Overtaking in platoon in terminal
        1.7.2. Overtaking in platoon and display during traveling
2. Change of platoon organization
    2.1. Transition in drive mode
    2.2. Merging to platoon
        2.2.1. Platoon order immediately after merging
        2.2.2. Drive mode control
    2.3. Change of platoon order
        2.3.1. Change in terminal
        2.3.2. Change during traveling
    2.4. Separation of platoon
        2.4.1. Separation in terminal
        2.4.2. Separation during traveling
        2.4.3. Drive mode control
3. Platooning management using database
4. Driver getting on and off and change of drive mode

FIG. 7

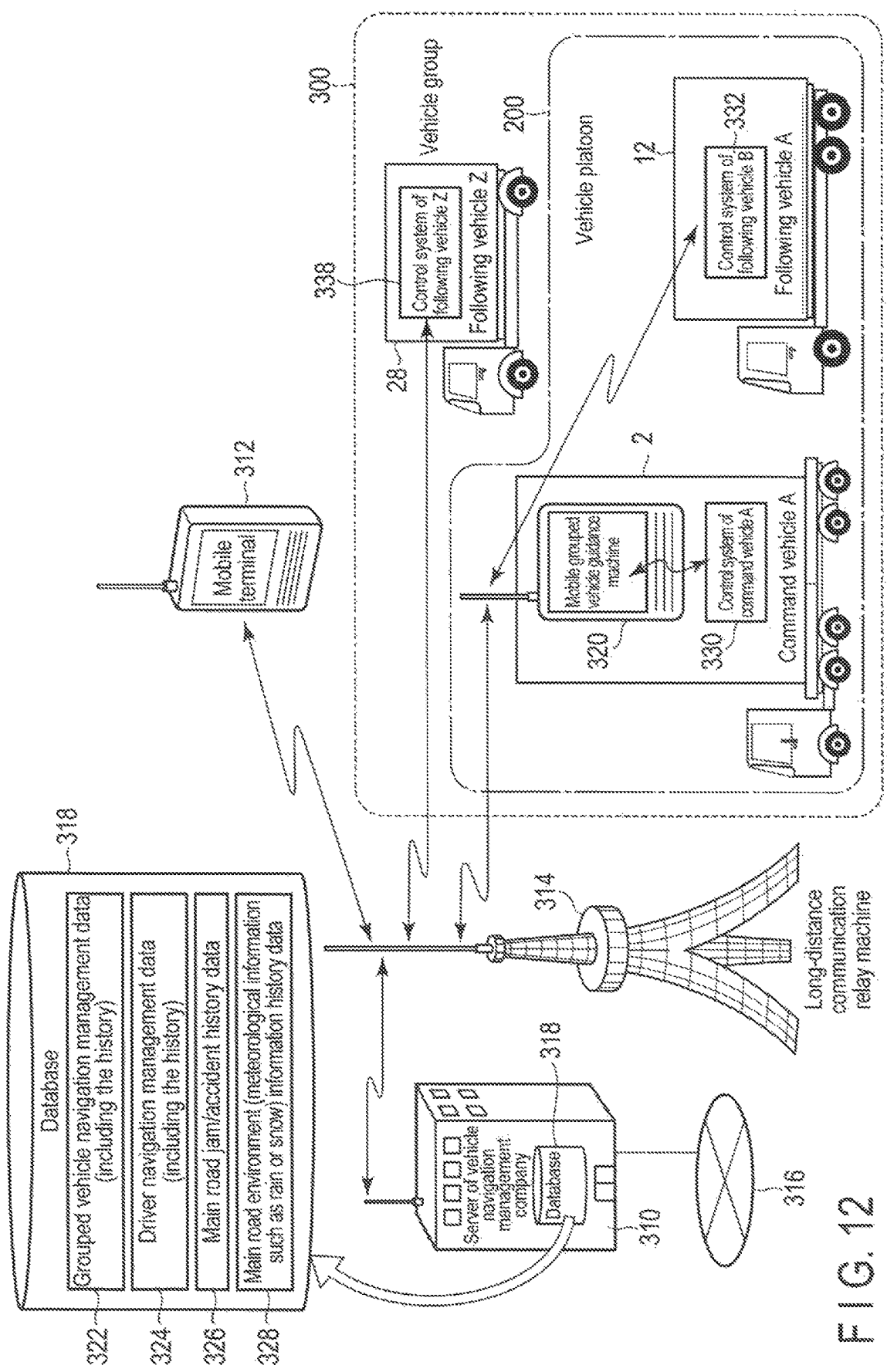
F I G. 12

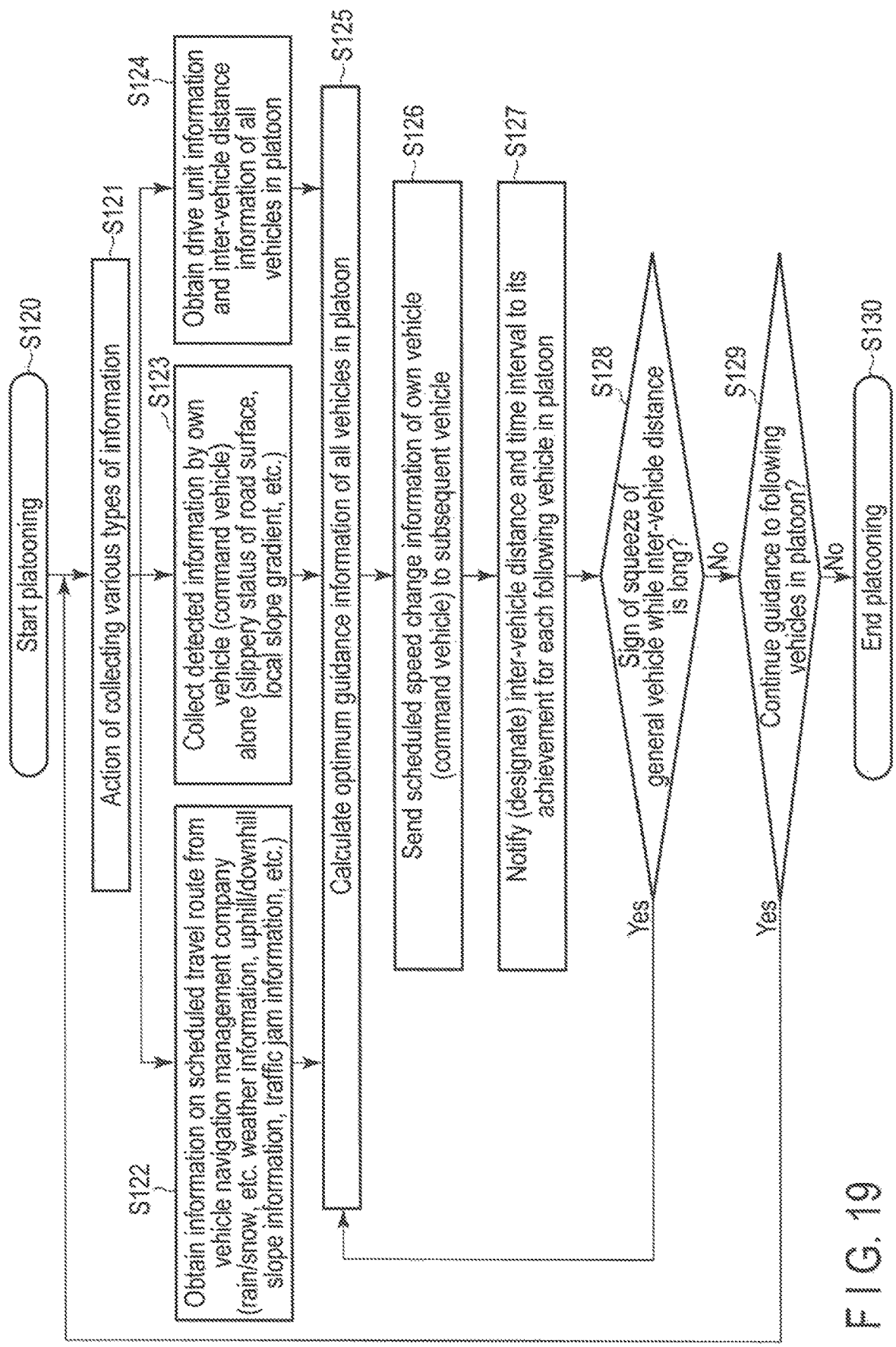
F I G. 19

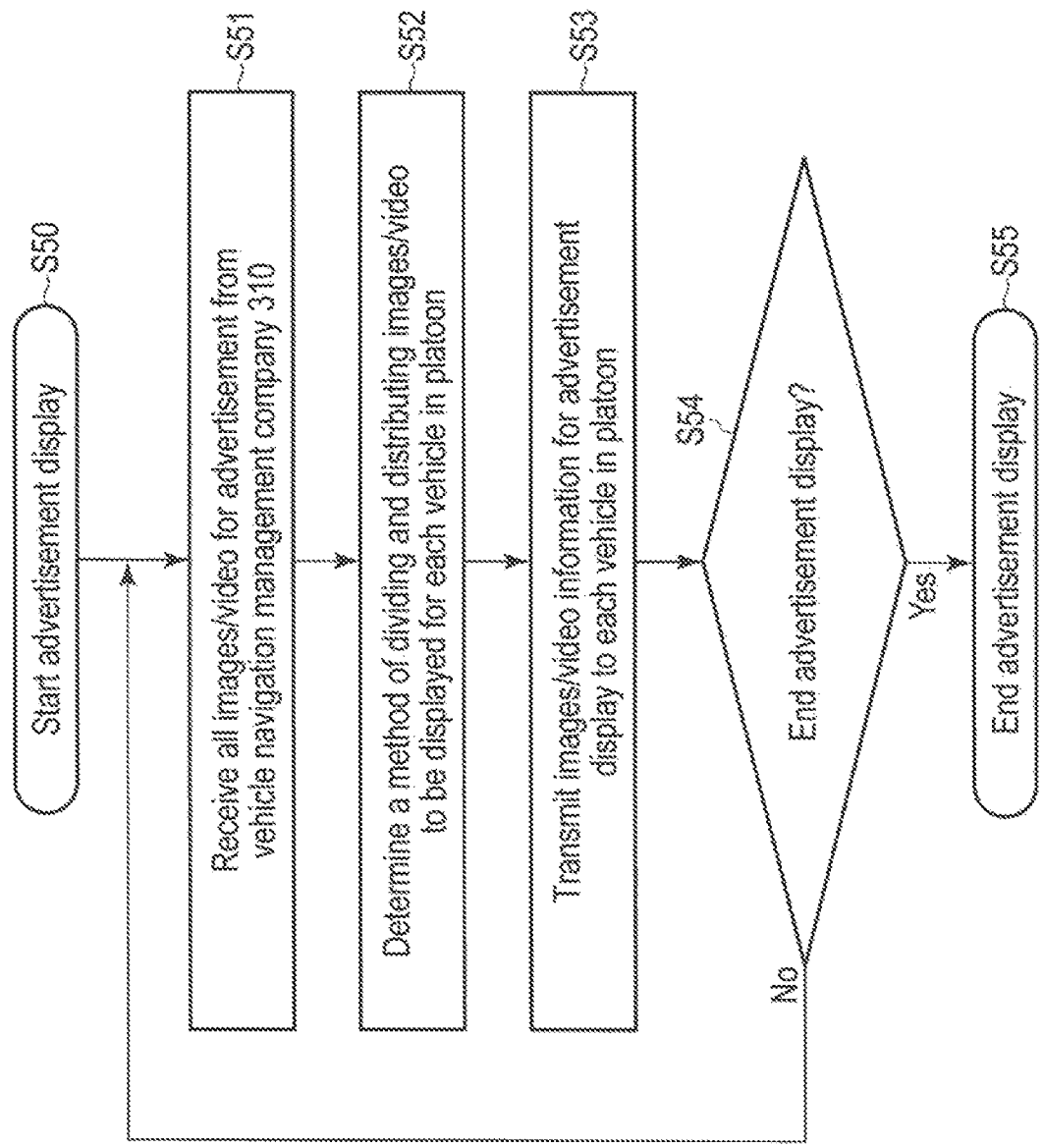
F I G. 23

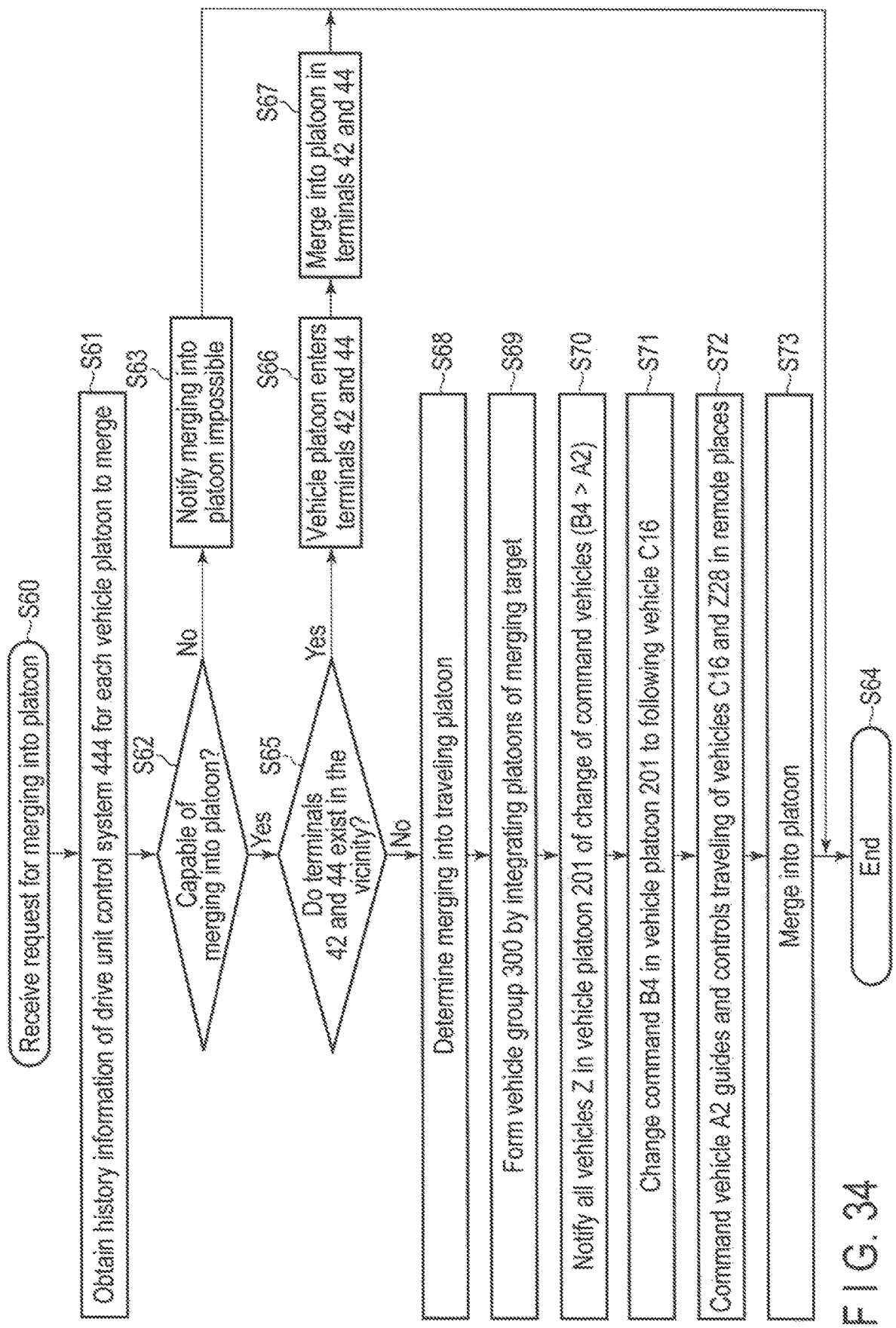
F I G. 34

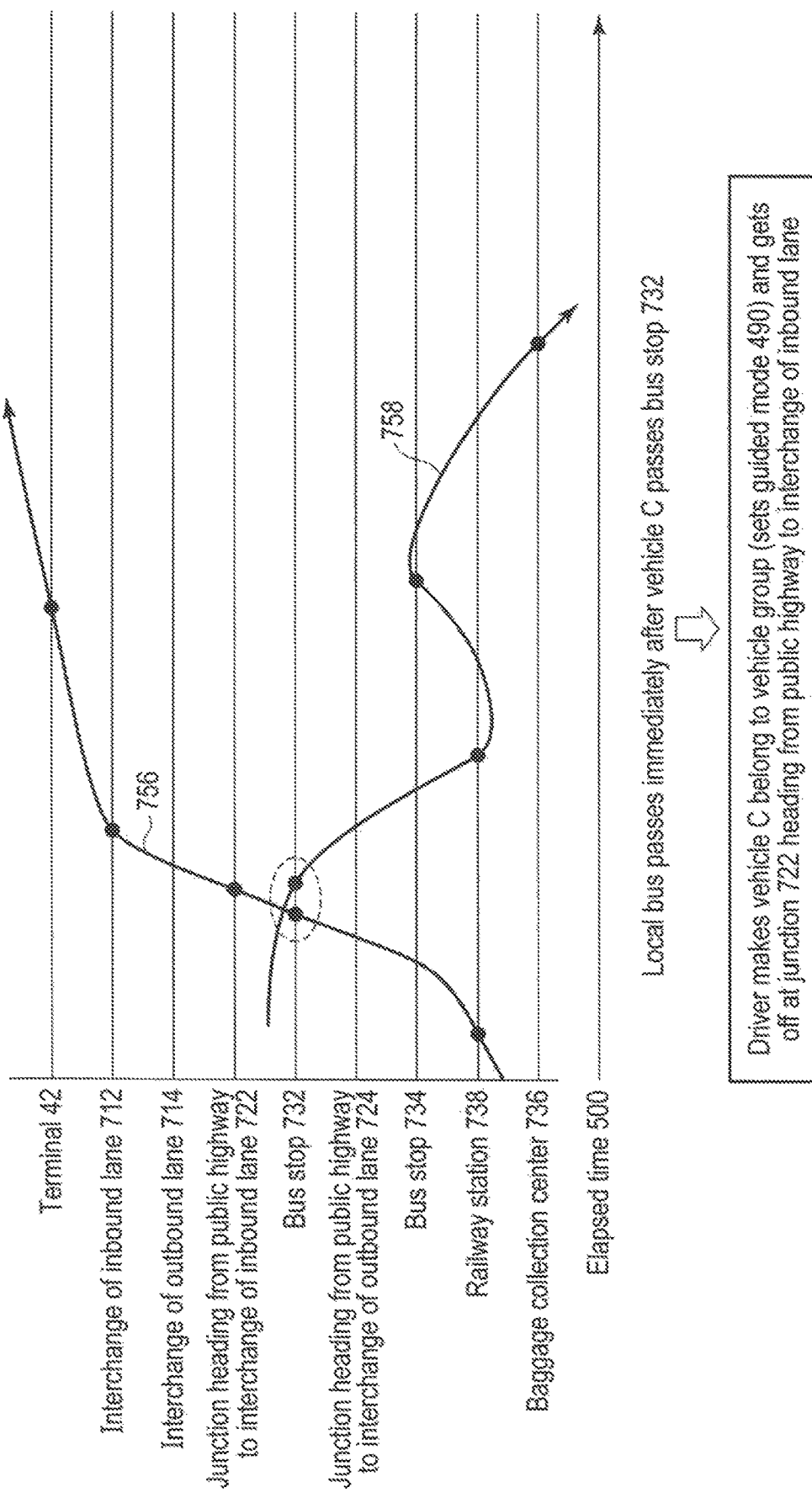
F I G. 42

TRANSPORT SERVICE METHOD, VEHICLE PLATOONING METHOD, VEHICLE GROUP NAVIGATION SYSTEM, SELF-DRIVING VEHICLE CAPABLE OF PLATOONING, AND GROUPED VEHICLE GUIDANCE DEVICE

CROSS-REFERENCE TO RELATED APPLICATIONS

This application is a Continuation Application of PCT Application No. PCT/JP2018/044806, filed Dec. 5, 2018 and based upon and claiming the benefit of priority from Japanese Patent Application No. 2017-233519, filed Dec. 5, 2017, the entire contents of all of which are incorporated herein by reference.

FIELD

Embodiments described herein relate generally to a transport service method of performing transport service of baggage, persons, and animals using cooperative drive in a plurality of self-driving vehicles, a vehicle platooning method used at the transport, a navigation system of a vehicle group composed of cooperative traveling vehicles, a self-driving vehicle capable of cooperative travel which implements cooperative travel, and a guidance machine which guides traveling of a grouped vehicle constituting the vehicle group.

BACKGROUND

The automatic steering technology of the vehicle unit (electronic self-driving technology) has progressed, and the cooperative traveling between a plurality of vehicles depending on automatic control is likely to be enabled.

As a method of enabling cooperative travel of a plurality of vehicles, a group is composed of a plurality of vehicles cooperating in traveling according to the existing technology. The traveling is managed in group units on the management center side.

In the cooperative traveling between a plurality of vehicles forming a group, the interval control between the grouped vehicles is very important. For example, a plurality of vehicles in the group is assumed to platoon on the same traffic lane. When the inter-vehicle distance between the platooning vehicles is too short, the risk of crush may increase. In contrast, when the inter-vehicle distance is too long, squeeze of a general vehicle to the interval may occur frequently. When the quantity of squeeze of the general vehicle in the platoon increases, the full length of the platoon is made longer and stability of the cooperative traveling decreases.

In particular, a frozen road surface and the surface wet with rain are slippery and the inter-vehicle distance needs to be appropriately longer to travel. However, the technique to control an appropriate inter-vehicle distance depending on the road surface condition is not disclosed.

BRIEF DESCRIPTION OF THE DRAWINGS

FIG. 7 is an explanatory view showing classification of process summary that can be implemented by the system of the present embodiment.

FIG. 12 is an explanatory view illustrating an example of a vehicle group operation system in the present embodiment.

FIG. 19 is an explanatory flowchart illustrating a method of guiding a platoon vehicle using the feedforward method.

FIG. 23 is an explanatory flowchart illustrating an example of control of advertisement display in the system of the system of the present embodiment.

FIG. 34 is a flowchart illustrating an example of a drive mode control at the time of the platoons merging.

FIG. 42 is an explanatory view illustrating a vehicle operation table based on a second example.

DETAILED DESCRIPTION

Embodiments will be described hereinafter with reference to the accompanying drawings.

In general, according to one embodiment, a transport service method comprises: organizing a vehicle group of a plurality of self-driving vehicles in which a parameter value inherent to vehicles falls within a predetermined range; and controlling cooperative travel of the self-driving vehicles in the vehicle group to perform transport service of baggage, persons, animals, and the like.

Figure 8:
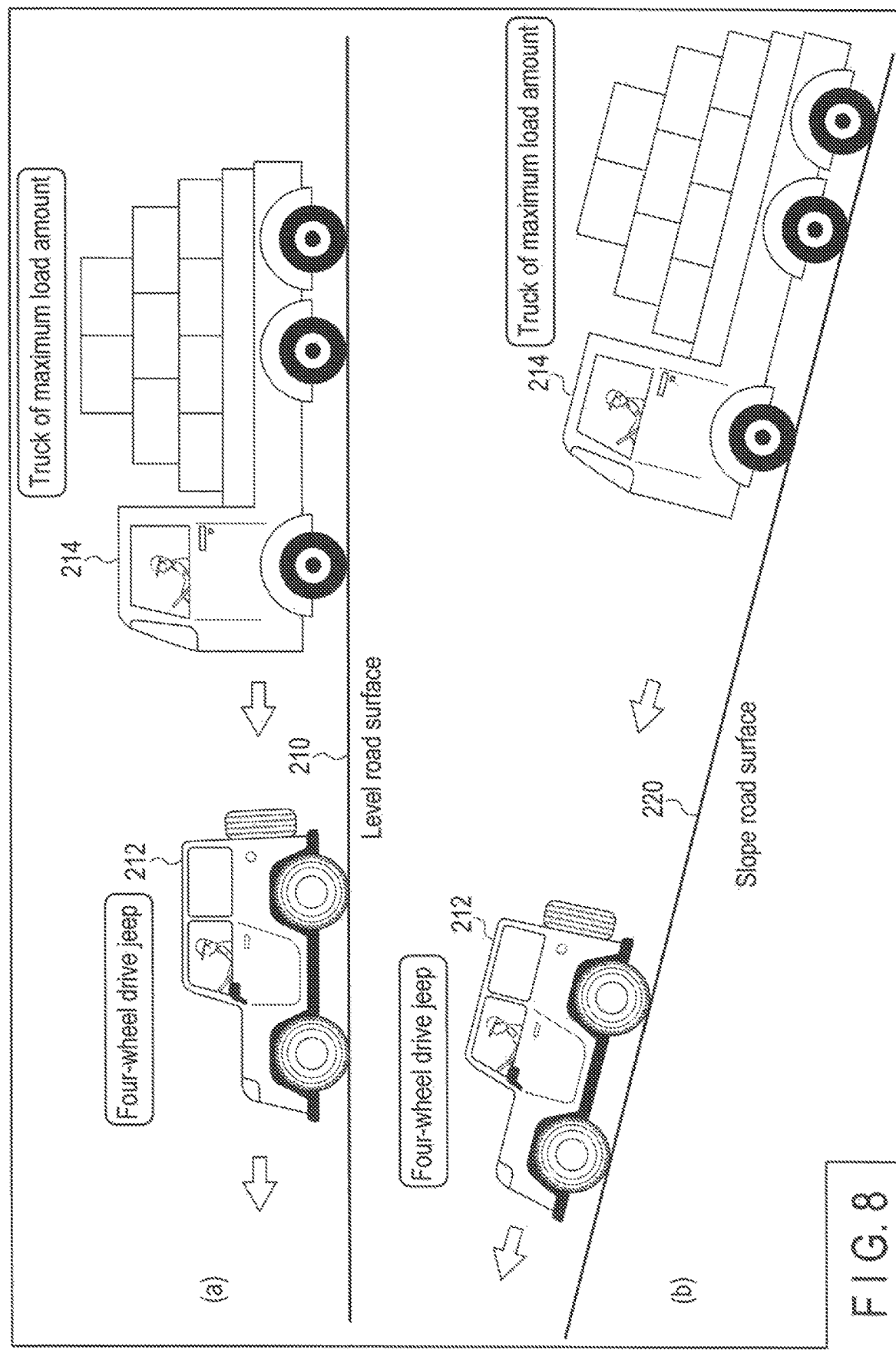
FIG. 8 is a view illustrating an example of a platoon inadaptable to organization in the present system.
Figure 9:
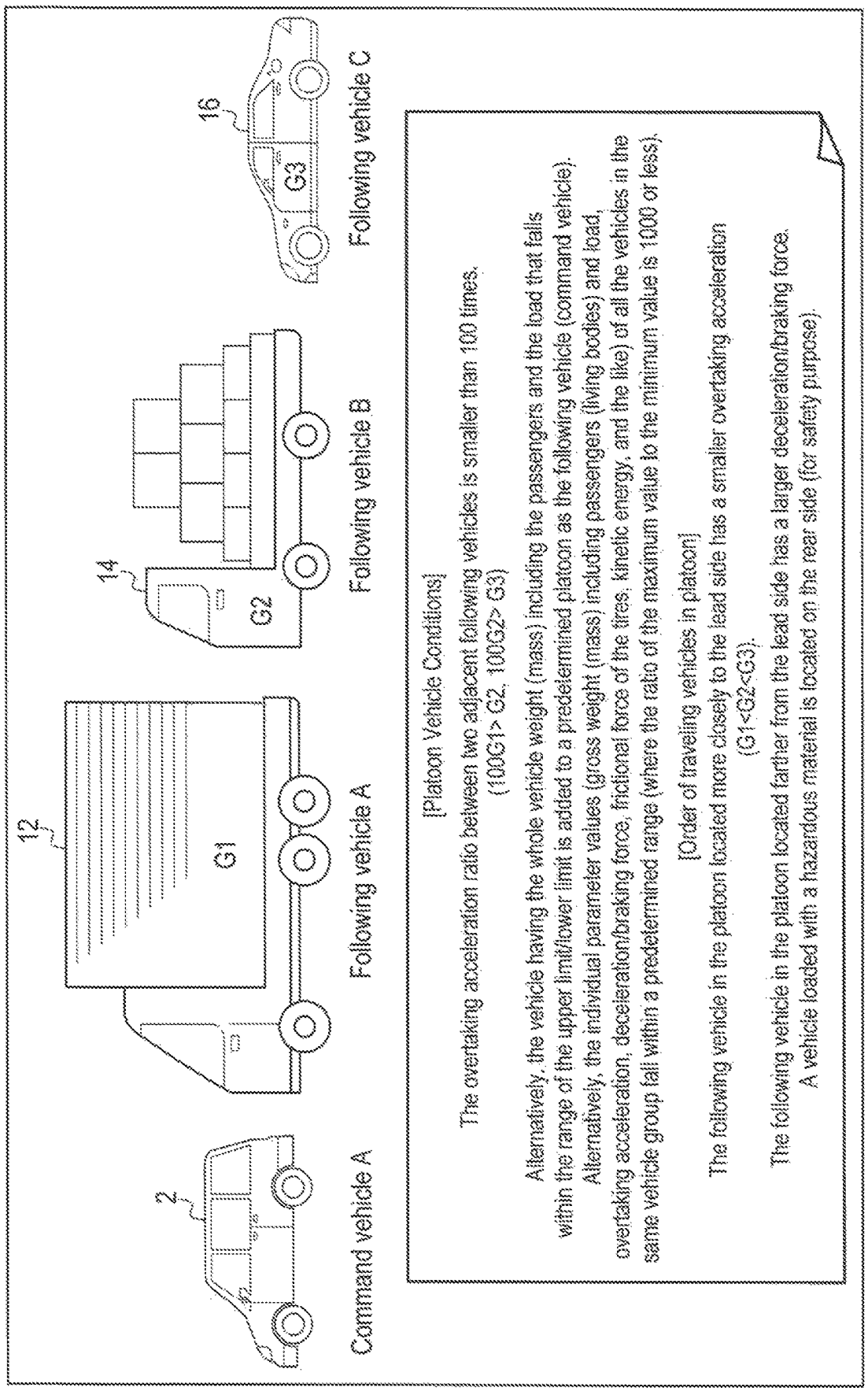
FIG. 9 is an explanatory view illustrating conditions of platoon (group) vehicles in the system of the present embodiment.

In the present embodiment, vehicles in which parameter values (for example, gross weight and overtaking acceleration and deceleration/braking performance, the frictional force of the tires, and the like at the time of loading baggage, persons, animals, and the like) for individual vehicles fall within predetermined ranges are collected to organize a vehicle group (FIG. 9). An interval between the grouped vehicles can be appropriately controlled depending on a variation of the road surface condition, by the vehicle group organization method. The reason will be described below with reference to FIG. 8. An example of a transport service method using the vehicle group thus organized will be described with reference to FIG. 4 and FIG. 5.

First, an example of form of the vehicle group or the vehicle platoon will be described with reference to FIG. 1. In the cooperative traveling, grouped vehicles 2, 12, and 14 belonging to a vehicle group are electrically connected to each other by radio communication. As a physical layer of the wireless communication system, short-range wireless communication such as ZigBee (registered trademark), Bluetooth (registered trademark), Ultra Wide Band (UWB), and Z-WAVE, or middle-range wireless communication such as Wireless Fidelity (Wi-Fi) and EnOcean may be used.

In the communication system of the upper layer to the physical layer of wireless communication, of the grouped vehicles 2, 12, and 14, master-slave (Master-Slave) mode is adopted. That is, a following vehicle (Slave Vehicle) A 12 and a following vehicle B 14 on the slave side are in an unmanned or guided mode 490 in which drivers do not drive directly. (The guided mode 490 will be described below with reference to FIG. 32.)

In contrast, a driver directly drives a command vehicle (Master Vehicle) A 2 on the master side. In addition, the same driver guides the subsequent following vehicle A 12 and following vehicle B 14 directly or indirectly while driving the command vehicle A 2. In the example of the embodiment of FIG. 1, the lead vehicle in the vehicle group serves as the command vehicle A 2. The command vehicle is not limited to this and a vehicle of arbitrary order in the vehicle group may be the command vehicle A 2. Furthermore, the commanding device on the master side does not necessarily need to be a vehicle and may be, for example, a mobile grouped vehicle guidance device 320.

Figure 1:
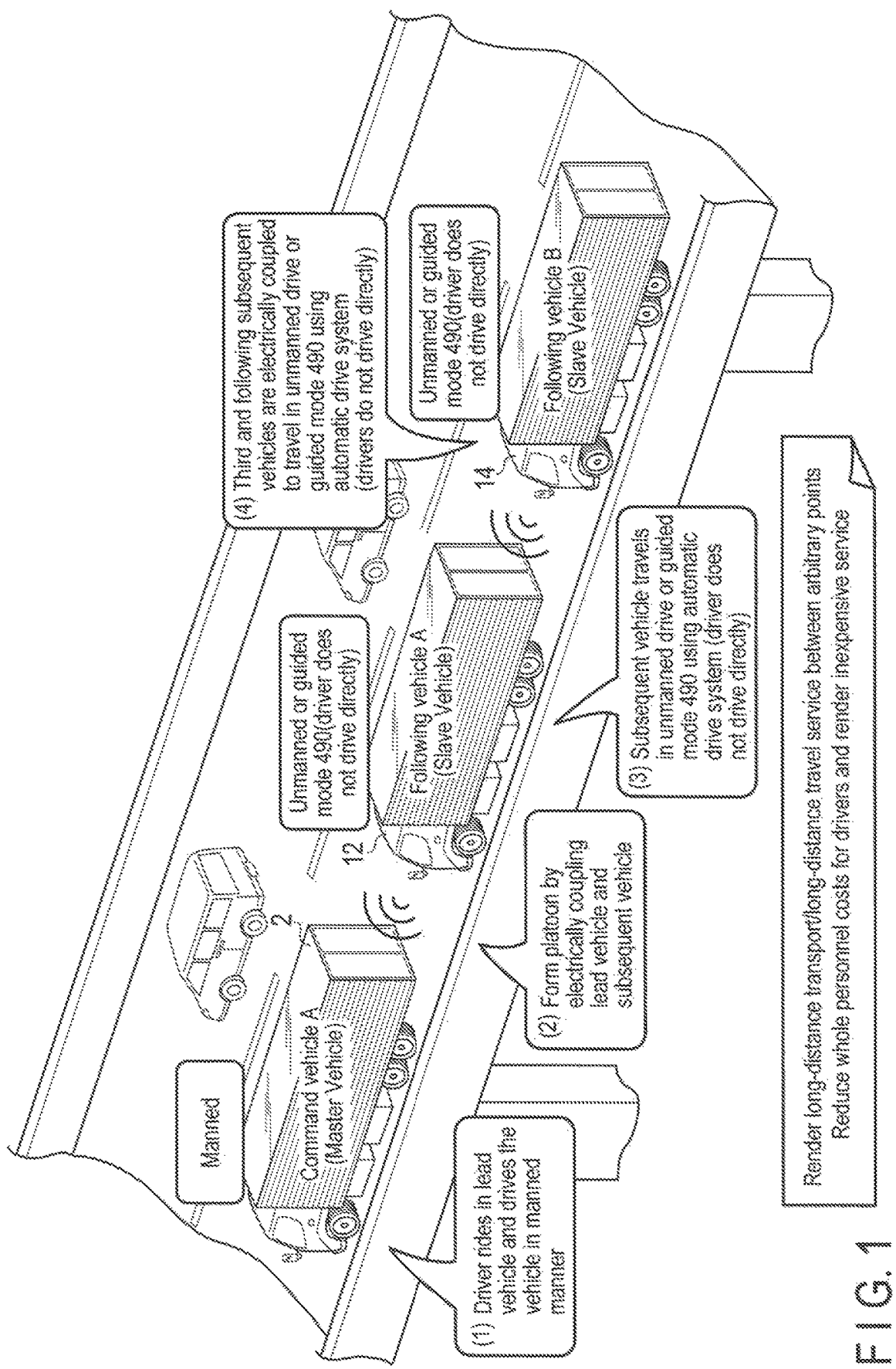
FIG. 1 is an explanatory view illustrating a basic form in the present embodiment.

In the example illustrated in FIG. 1, for example, one driver operates three vehicles A 2, A 12, and B 14 included in the vehicle group. For this reason, the example has an effect of reducing personnel expenses of drivers (in comparison with a conventional system requiring three drivers). Therefore, an inexpensive transport service can be rendered to users.

In addition, in the example of the present embodiment, for example, merging to and separation/withdrawal from the vehicle group can be performed while traveling on a main road (expressway) 50. Then, merging and separation/withdrawal at an arbitrary place can be performed. Therefore, the example also has an effect of rendering a long-distance transport/long-distance travel service between arbitrary points can provide in a flexible platoon form as compared with a conventional railway transport.

Incidentally, an object in the system of the present embodiment, "vehicle (Vehicle)", is indicative of a generic name of the self-driving transport units of every type and every form. In this example, the "self-driving vehicle" which is capable of driving by itself corresponds to the object. Therefore, for example, a movable body such as a platform truck or cart which "needs dynamic action from the outside for movement" falls out of the object of "vehicle" in the present embodiment. In addition, a baggage, a person, an animal, and the like may be optionally selected as the object of the transport.

The concrete examples of the "vehicle" include bicycles, motorcycles, cars, buses, trucks, trains (railroad), ships, airplanes, rockets, special-purpose vehicles, or the like. The special-purpose vehicles may include military trucks, tanks, fighters, bombers, artificial satellites, aircraft carriers, battleships, destroyers, submarines, and the like.

Figure 2:
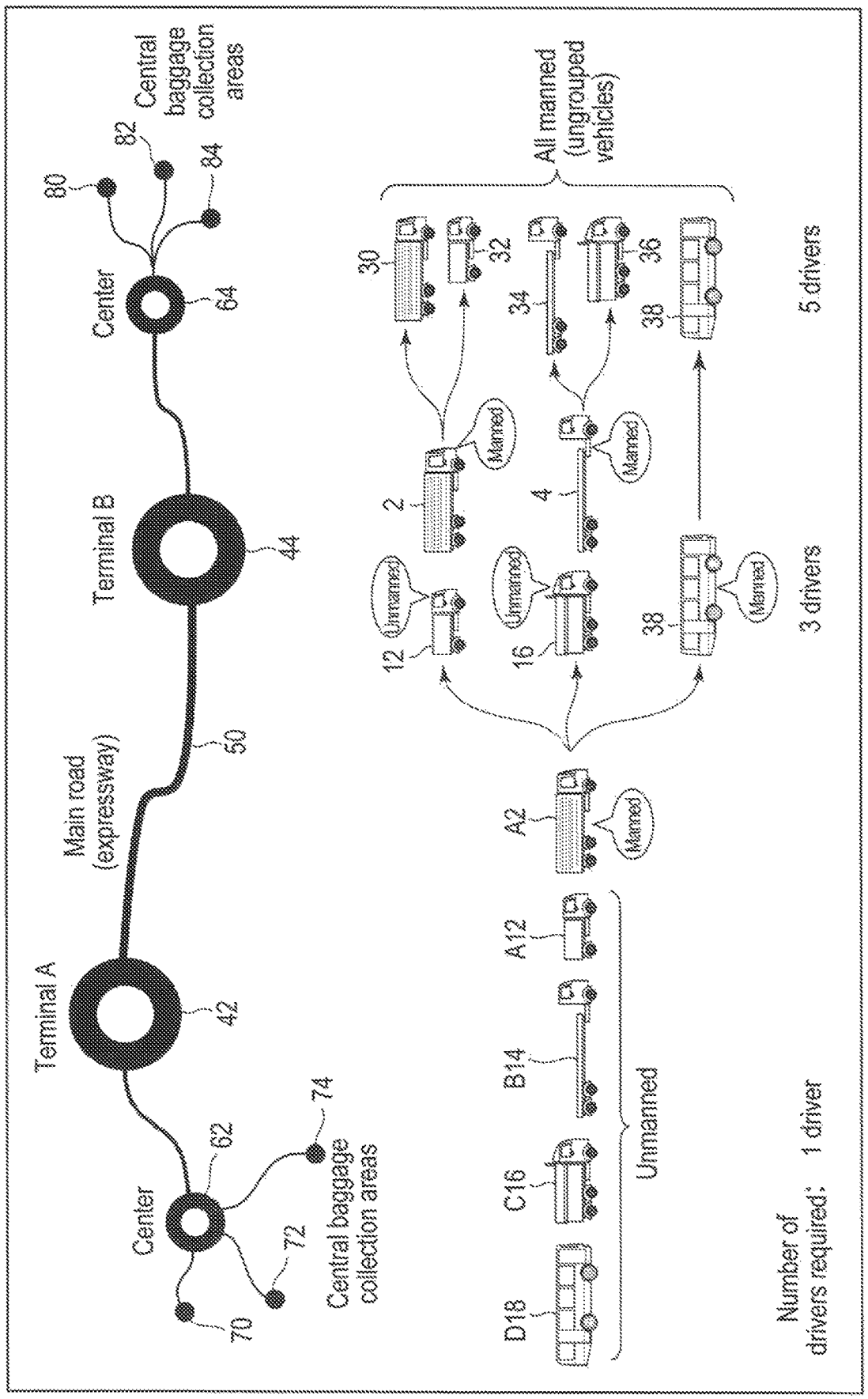
FIG. 2 is an explanatory view showing an example of a relationship between a drive route and a necessary driver in the system of the present embodiment.

An example of a relationship between a drive route and a necessary driver in the system of the present embodiment is illustrated in FIG. 2. For example, five grouped vehicles travel on the main road (expressway) 50 which links terminal A 42 and terminal B 44. At this time, one driver controls drive of the whole grouped vehicles.

The single vehicle group is separated into three vehicle groups at terminal B 44. At this time, three drivers are necessary. Furthermore, when the vehicle groups are completely separated at center 64 five drivers in total are required.

Concrete examples of the inside of terminals A 42 and B 44 illustrated in FIG. 2 will be described with reference to FIG. 3. At entrance registration/parking location indication units 112 and 116, indication of the registration and parking location for a vehicle to join the vehicle group is performed. At the same time, the gross weight of a vehicle in a baggage loaded status or a passenger boarding status is measured at gross vehicle weight measurement units 114 and 118.

In the present embodiment, as described above, the only vehicle having the parameter values (for example, gross weight and overtaking acceleration and deceleration/braking force, frictional force of the tires, and the like at the time of loading baggage, a person, an animal, and the like) of individual vehicles falling within predetermined ranges is made to join the corresponding vehicle group. Therefore, different types of vehicle groups are defined depending on the parameter values of the individual vehicles. In FIG. 3, different types of vehicle groups are parked at respective platoon parking lots 142 to 176. Therefore, organization of each type of vehicle group is completed by making the vehicle groups park at the platoon parking lots 142 to 176 indicated at the entrance registration and parking location indication units 112 and 116.

Incidentally, a bus stop 134 is installed in the center of terminals A 42 and B 44 such that persons can move by using space of the bus stop 134. Then, for example, after getting off in terminals A 42 and B 44, a driver driving on an inbound driving lane 102 can pass through the space of the bus stop 134 by walk. After that, the driver can get on the vehicle parking in the parking lots 152 to 156 and 172 to 176 and drive on an outbound driving lane 104.

An example of a method for the transport service using the cooperative traveling of a plurality of vehicles in the system of the present embodiment will be described with reference to FIG. 4. As a concrete example of the transport service according to FIG. 4, for example, a case where a plurality of members separately living in remote areas assemble at one place and then dismiss after carrying out some event is taken. In the system of the present embodiment, a service of supporting movement (transport) of the members including backup of this event may be provided.

A plurality of members separately living in the remote areas move using some transport units (vehicles). When the number of participation members increases, several vehicles are necessary for movement. If a predetermined vehicle of the plurality of vehicles moving at the same time is set to a guided mode 490, the driver riding in the vehicle can drink. If all the participation members want to drink during movement dispatch of a lead vehicle (command vehicle 2) of the vehicle group may be requested by payment.

Figure 4:
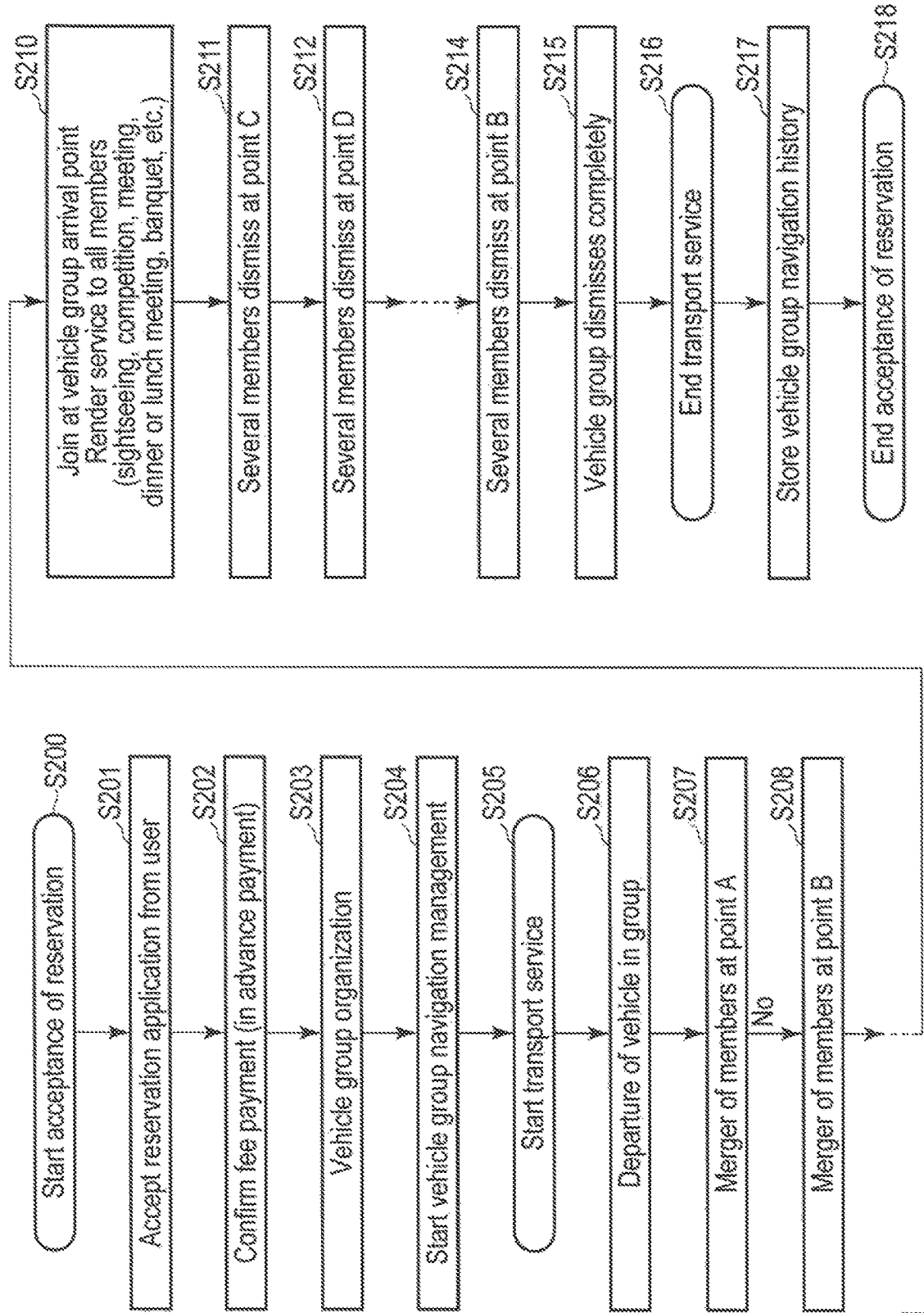
FIG. 4 is an explanatory flowchart illustrating an example of providing transport service using the system of the present embodiment.

A flow of a concrete transport service taking the above-described case as an example is illustrated in FIG. 4. A server 310 (not illustrated) of a vehicle navigation management company starts, for example, acceptance of reservation for the transport service on the Internet (S200). When accepting the application of reservation from a user in S201, the user is requested to input "name of the participating vehicle type", "number of persons participating (the number of each of adults and children)", "weight information on carried baggage on each vehicle", "request for dispatch of the lead car (command vehicle A 2)", "event subject at the site", "contents of backup request at the event", and the like via the Internet.

The server 310 of the vehicle navigation management company automatically calculates the amount billed of fees at the time of rendering the transport service. When the user agrees the presented fees, the user pays the fees in advance. The payment is not limited to this, and the user may pay the fees after the transport service end (S216).

When the server 310 of the vehicle navigation management company completes confirmation of the fee payment confirmation (advance payment) (S202), vehicle group organization (S203) is performed. An example of a response method in a case where "request for dispatch of the lead vehicle (command vehicle A 2)" is made is described. The above information input at acceptance of the reservation application from the user is stored in a database 318 (not illustrated) managed by the server 310. Based on the above information, the server 310 calculates baggage or a person, the gross weight, overtaking acceleration and average drive speed of each vehicle, and the kinetic energy of each vehicle at the time of loading the baggage, persons, animals, or the like, by a method to be described below. Next, the server 310 calculates an average value of the parameter values for all the participating vehicles. Then, the server 310 selects a vehicle having a parameter value close to the average value and determines the vehicle as the lead vehicle (command vehicle A 2) to be dispatched. Then, the vehicle group that is to be the service target is organized (S203) by the determined command vehicle A 2 and the participating vehicles reserved in advance.

As described above, the transport service method rendered by the system of the present embodiment obtains the information on the vehicle participating at the acceptance of the reservation prior to the execution of the transport service, and organizes an appropriate vehicle group based on the information.

In the system of the present embodiment, the vehicle group is organized such that the parameter values (for example, baggage or a person, gross weight and overtaking acceleration and deceleration/braking force, the frictional force of tires, and the like at the time of loading baggage, persons, animals, and the like) of the respective grouped vehicles fall within a predetermined range, and stabilization of control of the interval between the grouped vehicles is attempted. However, when the user specifies a participating vehicle as described above, the following vehicles A 12 and B 14 included in the vehicle group cannot be selected. In the system of the present embodiment, in this case, a vehicle close to the average value of the parameter values of the following vehicles A 12 and B 14 is selected as the command vehicle A 2. Thus, the vehicle group is organized such that "the parameter values of individual grouped vehicles fall within the predetermined ranges" in a broad sense.

The server 310 of the vehicle navigation management company of the vehicle group thus organized starts (S204) and then the transport service is started (S205). When the command vehicle A 2 is dispatched, departure of the grouped vehicle mentioned in S206 corresponds to departure of the command vehicle A 2. In contrast, when the command vehicle A 2 is not dispatched, the timing at which the vehicle farthest from the destination (arrival point) is regarded as "departure of the vehicle in group (S206)".

As a concrete content of the method of merging members at points A and B (S207 and S208), a member may ride in a grouped vehicle already traveling or a vehicle newly registered in advance may merge in the vehicle group.

When the whole vehicle group arrives at the destination (arrival point) in S210, rendering the service (sightseeing, competition, meeting, lunch or dinner meeting, banquet, and the like) to the participating members is performed.

The participating members start returning home after the service at the destination is rendered (on the next day). Since the participating members live separately in remote areas, the members dismiss successively and partially depending on return routes. The partial disassembling places of the members do not necessarily correspond to the merging places. As the partial disassembling forms in S211 to S214, some members get off the grouped vehicles and predetermined vehicles of the others separate from the vehicle group.

After the vehicle group completely dismisses (S215) and the transport service ends (S216), the vehicle group navigation history is stored in the database 318 (S217) and the reservation acceptance is finally ended (S218).

As the other application example to FIG. 4 of the transport service form using the cooperative travel between a plurality of vehicles, the service may be rendered to "only the user returning home". For example, a user may go out using a private vehicle and drink by mistake at a visit place. In the transport service method of the present embodiment, the command vehicle A 2 is called instead of "calling a taxi for returning home". In this case, the user's private vehicle serves as the following vehicle A 12 and guides to a return route. When the above transport service is used, an effect of completing the transport of the private vehicle for a normal taxi cost too (making a total return fee inexpensive) can be obtained.

As the other system of the present embodiment on the transport service, rendering the service to the ride share (ridesharing) extension for a number of users may be performed. In the conventional ridesharing, a social platform to connect the users who want to move on vehicle with an owner or driver of the vehicle is provided. The user requests hailing a vehicle using mobile application (corresponding to S201 of FIG. 4). Then, the driver who is closer to the user's current position and can meet the user is arranged (corresponding to S203 of FIG. 4). The requested driver can earn a small amount of money by a shuttle service (transport service) at a free time.

When a small number (for example, three or less) of users want to move, transport service can be rendered by conventional ridesharing. However, when a large number of (for example, four or more or ten or more) users want to move at the same time, the conventional ridesharing is unsatisfactory. This is because, in the conventional ridesharing, shuttle vehicles on which the users ride separately are different in pickup timing and simultaneous movement of all the users is therefore difficult.

In the ridesharing extension service rendered in the example of the system of the present embodiment, a plurality of vehicles pick up and send off simultaneously. The driver rides only one vehicle (command vehicle A 2) of the plurality of vehicles performing pickup and send-off while remaining lent vehicles (following vehicles A 12 and B 14) are in a condition of guided mode 490.

The user requests the vehicle to be hailed by using a mobile application (S201 of FIG. 4). As the process corresponding to the vehicle group organization in S203, the server 310 of the vehicle navigation management company looks for a free driver and a vehicle which can be lent in a predetermined time zone.

In the process corresponding to step in S206 of the departure of vehicle in group, the driver to drive the command vehicle A 2 departs. Then, in the processes corresponding to steps in S207 and S208 of the mergers of members at points A and B, the following vehicles A 12 and B 14 which can be lent in a predetermined time zone are lent.

Then, the simultaneous movement of a number of users (for example, four or more or ten or more users) is the process corresponding to the rendering service to all the members in S210.

In addition, the processes are not limited, but some of the steps in FIG. 4 may be used for collection of a rent-a-car dropped off. In the rent-a-car service, the user returns the rented vehicle directly to the shop where the vehicle has been rented after the rental is completed or drops off the rented vehicle at the movement destination. In the latter case, a rental company needs to collect the rented vehicle dropped off.

For example, in the process corresponding to the step of reservation acceptance from the user in S201, reservation of the collection of the rented vehicle is accepted from a rental company. Then, in the processes corresponding to steps in S207 and S208 of the mergers of members at points A and B, the processing of S208, the rented vehicles are collected.

Furthermore, the above-described transport service may be applied to forced removal of an illegally parked vehicle. The service rendering form using (at least a part of) FIG. 4 is not limited to the above, but (at least a part of) FIG. 4 may be applied to every other similar service rendering form.

Figure 5:
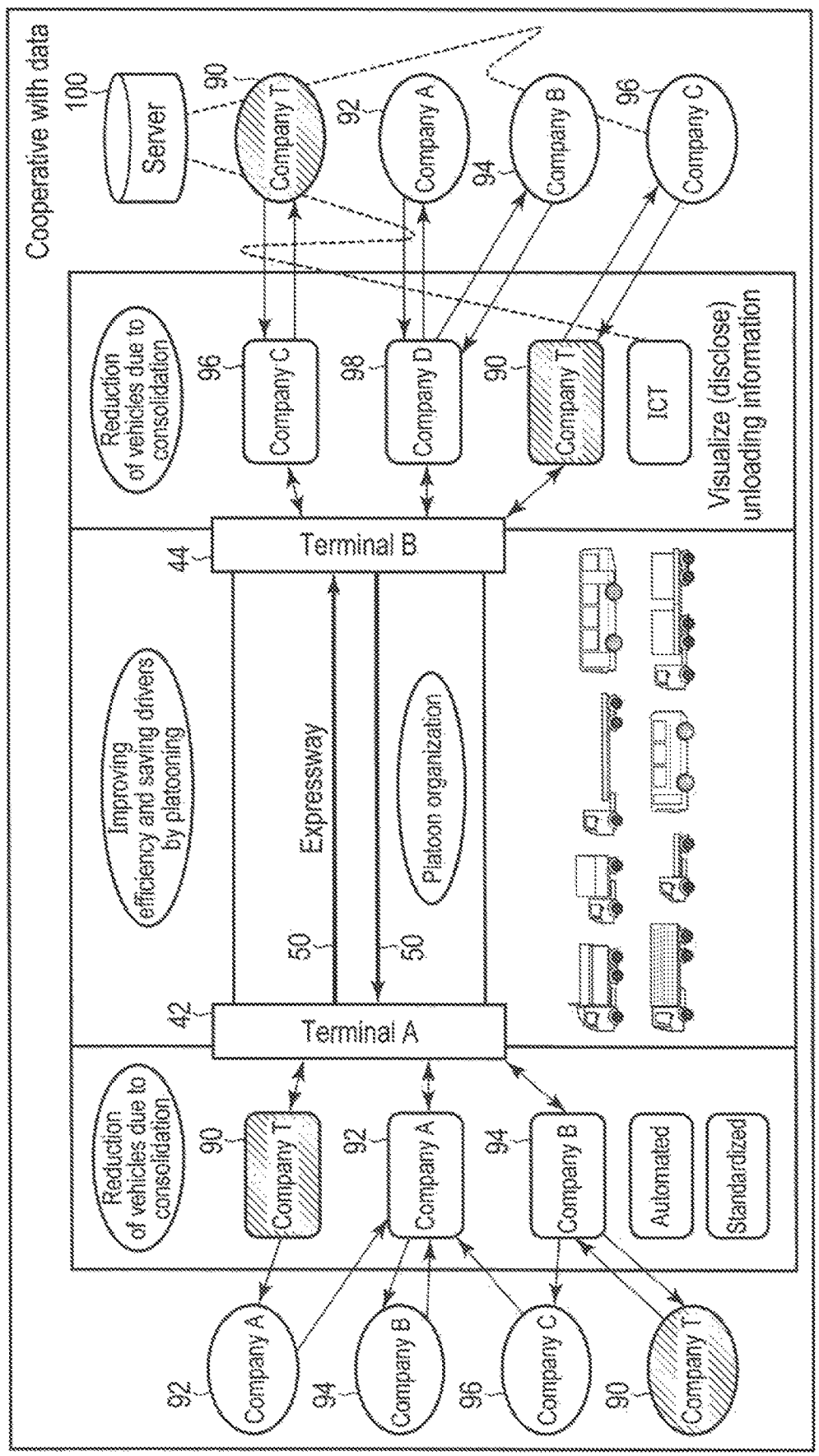
FIG. 5 is an explanatory view illustrating an example of infrastructural contents that can be provided by the present system.

The other example of the transport service method using the cooperative travel of a plurality of vehicles in the system of the present embodiment is illustrated in FIG. 5. For example, conventionally, different transport companies T 90, A 92, B 94, and C 96 have performed long-distance transport using respective transportation trucks. In the example of the transport service method in FIG. 5, reduction of the number of transport trucks is performed by consolidation of the transported baggage. Furthermore, in the expressway 50 between the terminals A 42 and B 44, a platoon is organized by a plurality of transport trucks to reduce the number of necessary drivers. When the cooperative travel of a plurality of vehicles is used, an effect of reducing the whole personnel expenses of the drivers and rendering inexpensive service is produced.

The terms "vehicle group" and "vehicle platoon" used herein will be explained prior to explanation of the technique necessary to stably render the transport service using the cooperative travel of a plurality of vehicles conducted later.

A vehicle group 300 and a vehicle platoon 200 have a feature that "all vehicles constituting them cooperate in traveling". Then, the command vehicle A 2 or the mobile grouped vehicle guidance device 320 is used as a master (commander) stably integrating and controlling the cooperative travel. Furthermore, information transmission is performed using wireless communication between the following vehicle A 12 (or following vehicle Z 28) receiving guidance from the master (commander) and the master (command vehicle A 2 or mobile grouped vehicle guidance device 320).

A plurality of vehicles traveling common route A 202 from point A 180 to point B 190 constitute "vehicle platoon 200" while having the above common feature. A plurality of vehicles constituting the vehicle platoon do not need to be close to each other. In addition, individual vehicles constituting the vehicle platoon are referred to as "platoon vehicles".

Figure 6:
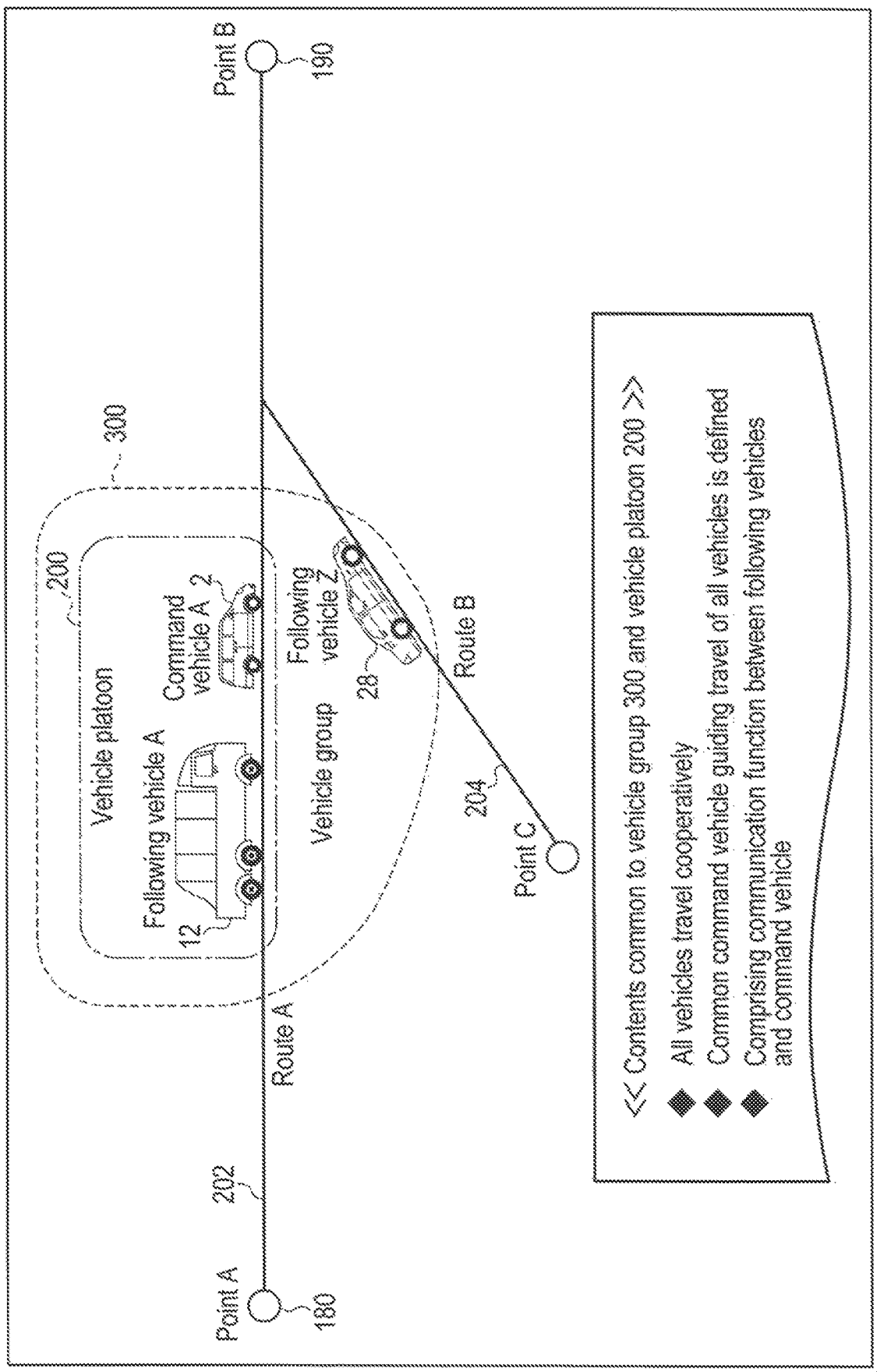
FIG. 6 is an explanatory view illustrating a difference between a group and a platoon in the present embodiment.

In comparison with this, the vehicles (grouped vehicles) constituting the "vehicle group 300" do not need to travel in the same route A 202. For example, the command vehicle A 2 and the following vehicle A 12 traveling in the route A 202, and the following vehicle Z 28 may constitute the same vehicle group 300. As illustrated in the example of FIG. 6, however, the following vehicle Z 28 may travel on a route B 204 different from the route of the command vehicle A 2 and the following vehicle A 12. That is, the command vehicle A 2 (or the mobile grouped vehicle guidance device 320) of the system of the present embodiment can perform "remote guidance" of the following vehicle Z 28 traveling in the different route B 204.

The technology of rendering the example of the transport service illustrated in FIG. 4 or FIG. 5 will be described below in accordance with a procedure illustrated in FIG. 7. As illustrated in a first part of FIG. 7, the platoon organization conditions will be first described.

For example, a case where a four-vehicle drive jeep 212 and a truck 214 loaded with a maximum permissible amount of baggage constitute a vehicle platoon will be reviewed. As illustrated in FIG. 8 (*a*), a problem rarely occurs during traveling on a level road surface 210. When traveling changes to platooning toward an upper point of a slope road surface 220 as illustrated in FIG. 8 (*b*), however, maintaining the inter-vehicle distance between the vehicles appropriately becomes difficult.

Since the weight of the truck 214 loaded with the maximum permissible load amount is large, climbing on the slope road surface 220 at a high speed is difficult. In contrast, the four-vehicle drive jeep 212 having a large driving force (horsepower) can easily climb the slope road surface 220 at a high speed. Thus, when the overtaking accelerations of the vehicles in the same vehicle platoon are greatly different, the inter-vehicle distance between the vehicles is likely to be longer.

In addition, since the truck 214 loaded with the maximum permissible amount of baggage has a gross weight (gross mass), the deceleration/braking force is relatively small. For this reason, there is a large risk that when the four-vehicle drive jeep 212 suddenly brakes at the time of traveling on the downhill slope road surface 220, the truck 214 loaded with the maximum permissible amount of baggage may bump the jeep.

To solve the problem, in the present embodiment, a vehicle group or vehicle platoon is organized by only a plurality of vehicles in which the parameter values inherent with the vehicles (for example, gross weight and overtaking acceleration and deceleration/braking performance, the frictional force of the tires and the like at the time of loading baggage, persons, animals, and the like), and the cooperative travel in the vehicle group (vehicle platoon) is controlled to render the transport service of baggage, persons, animals, or the like. When the cooperative travel in the vehicle group or the vehicle platoon thus organized is controlled, an effect of securing the appropriate inter-vehicle distance in accordance with the road surface condition (uphill slope, downhill slope, a road surface which is wet and slippery, and the like which got wet, snow-covered road or the like) can be obtained.

As explained with reference to FIG. 8 (*b*), typical parameters inherent to the vehicles that are elements of impairing the optimum inter-vehicle distance control in the vehicle group (vehicle platoon) correspond to the "overtaking acceleration" and "deceleration/braking force".

The overtaking acceleration is evaluated as "positive acceleration". In contrast, "negative acceleration" occurs at the deceleration caused by braking. At both the positive and negative accelerations, the following relationship is established.

$$[\text{Acceleration}]=[\text{driving force or braking force}]/[\text{gross mass of vehicle}] \quad (1)$$

The "gross mass of vehicle" of expression (1) means, for example, gross mass at the time of being loaded with baggage, persons, animals, and the like (the whole vehicle mass including passengers and load). In addition, the "force" becomes "gross weight" when the "gravitational acceleration of the earth" is substituted into expression (1). Therefore, in the present specification, "mass" and "weight" are substantially treated as synonyms.

In addition, the frictional coefficient of the tires is decreased on the wet road surface 210 and snow-covered road, and the roads become slippery. The frictional coefficient of the tires has a close relationship with the intensity of the tires pressing against the road surface 210 (i.e., the vehicle weight). Therefore, the frictional force of the tires also relates to the vehicle weight.

That is, based on the above explanations, the "overtaking acceleration" and the "deceleration/braking force" (in consideration of the frictional force of the tires) also have a close relationship with the gross mass (weight) of the vehicle. For this reason, It is considered that the "gross mass (weight) of the vehicle (at the time of loading baggage, persons, animals, and the like)" of the parameters inherent to the vehicle gives the largest influence to the most suitable inter-vehicle distance control in the vehicle group (vehicle platoon).

In the following descriptions, the platoon organization conditions (conditions of the vehicles which can organize the vehicle group) will be reviewed mainly on the "gross mass (weight) of the vehicle" of the parameters inherent to the vehicles. However, the conditions are not limited to this, but may correspond to the overtaking acceleration and deceleration/braking performance, frictional force of the tires, kinetic energy of the traveling vehicle, and the like as the parameters inherent to the vehicles.

In addition, injury/damage scale at occurrence of a vehicle accident in a vehicle crash is related to the motion amount of energy of the vehicle just before the crash. The kinetic energy of the vehicle is expressed in the following expression.

$$[\text{kinetic energy of vehicle}]=[\text{gross mass of vehicle}]\times [\text{vehicle speed}]\times[\text{vehicle speed}]/2 \quad (2)$$

Since the vehicle speed almost matches in the platoon vehicles, the kinetic energy at the platooning is the synonym of the gross mass of the vehicle. The appropriate drive speed of the grouped vehicle (for example, the following vehicle Z 28 of FIG. 6) traveling on the route B 204 different from the vehicle platoon 200 i.e., (the rate at which the specific fuel consumption becomes the smallest when the following vehicle Z 28 travels) is different from the travel speed of the vehicle platoon 200. In this case, the kinetic energy may be used for determination of the grouped vehicle applicability.

When the above explanations are summarized, it is considered that "the only vehicle having the whole vehicle weight (mass) including the passengers and the load that falls within the range defined by a predetermined upper limit and a predetermined lower limit, can constitute the platoon" as the conditions of the vehicle capable of organizing the platoon. Next, the upper limit and the lower limit will be described.

The result of reviewing details of a relationship between the ratio of the maximum value to the minimum value of the inherent parameter (gross mass, gross weight, or the like) values of the individual vehicles 212 and 214 constituting the vehicle platoon 200 and the appropriate inter-vehicle distance securing characteristics between the adjacent vehicles 212 and 214 in the vehicle platoon 200 will be described below. As a result of reviewing the details, it is found that stable driving is difficult when the ratio exceeds 1000 on the general level ground road surface 210. In addition, when the ratio exceeds 100 the driving becomes difficult on the slope road surface 220. Furthermore, when the ratio exceeds 10 high-speed and high-precision control of the travel of all the vehicles 212 and 214 in the group 300 becomes difficult. Then, when the ratio exceeds 3 the waste of the fuel ratio in the platoon vehicle becomes large.

Based on the above, the ratio of the maximum value to the minimum value of the inherent parameters (such as the gross mass and the gross weight) that the vehicles capable of constituting the same vehicle group 300 (or the vehicle platoon 200) individually have needs to be set to 1000 or less (desirably 100 or less). Furthermore, when the ratio is set to 10 or less (desirably 3 or less), unnecessary waste of fuel ratio group is reduced and further stable group travel (platooning) can be performed, for the above reason.

The gross weight (gross mass) at the time of loading with baggage, persons, animals, and the like, has been mainly described as the inherent parameter of each vehicle. However, the overtaking acceleration, deceleration/braking performance, frictional force of the tires, kinetic energy, and the like have a close relationship with the gross weight of the vehicle. Therefore, the above ratio range may be defined by applying the overtaking acceleration and deceleration/braking performance, frictional force of the tires, kinetic energy, and the like, instead of the gross weight, as the inherent parameters of each vehicle.

As described above, the gross weight (gross mass) has a close relationship with the overtaking acceleration and deceleration/braking performance, frictional force of the tires, kinetic energy, and the like. Therefore, even when the parameters such as the overtaking acceleration and deceleration/braking performance, frictional force of the ties, the kinetic energy, and the like are compared with each other, the ratio of the maximum value to the minimum value is desirably defined within the same range as the above range.

The tolerance of the parameter values inherent to the vehicles capable of constituting the same vehicle group 300 (or the vehicle platoon 200) has been explained above. In addition, the relationship in inherent parameters between the adjacent vehicles 212 and 214 needs to be reviewed to secure the appropriate inter-vehicle distance between the vehicles platooning on the same lane.

The ratio of the larger value to the smaller value of the inherent parameters (gross mass, gross weight, overtaking acceleration, deceleration/braking performance, frictional force of the tires, and the like) values between the adjacent vehicles 212 and 214 in the vehicle platoon 200, and the characteristics of prevention of crush between the adjacent vehicles 212 and 214 have been reviewed in detail. As a result, the above ratio needs to be 100 or less on the general level ground road surface 210. In addition, the above ratio needs to be 10 or less on the slope road surface 220. Furthermore, it is clarified that the ratio is desirably 10 or less to control the inter-vehicle distance between the adjacent vehicles 212 and 214 with high accuracy in a short time.

Therefore, the ratio of the larger value to the smaller value of the inherent parameter (gross mass and gross weight, overtaking acceleration, deceleration/braking performance, frictional force of the tires, and the like) values between the adjacent vehicles 212 and 214 in the same vehicle group 300 (or the vehicle platoon 200) needs to be set to 100 or less (desirably 10 or less). Furthermore, the ratio is desirably 10 or less to control the inter-vehicle distance between the adjacent vehicles 212 and 214 with high accuracy in a short time.

Furthermore, in the present embodiment, as illustrated in FIG. 9, the traveling order of the vehicles in the vehicle platoon 200 may be set based on the inherent parameter values of the vehicles constituting the same vehicle platoon.

For example, if the overtaking acceleration of a subsequent vehicle is larger than that of a lead vehicle, the inter-vehicle distance is hard to be longer during traveling on the uphill slope road surface 220. Therefore, the order of traveling of the vehicles may be set to satisfy the following expression when overtaking accelerations of the following vehicles A 12, B 14, and C 16 are G1, G2, and G3.

$$G1 < G2 < G3 \quad (3)$$

When the relationship of expression (3) is restated in consideration of the expression (1), the order of traveling vehicles may be set such that the gross mass (gross weight) of the following vehicles 12, 14, and 16 closer to the lead vehicle is larger. Thus, when the traveling order is set in accordance with the order of the larger gross mass (gross weight) of the vehicles, a vehicle traveling on the rear side of the following vehicles 12, 14, and 16 tends to have higher braking performance. Therefore, when the order of the traveling vehicles is set in the above manner, the effect of reducing a crush risk when traveling on a wet road surface or snow-covered (ice) surface can also be obtained.

In addition, the system of the present embodiment is not limited to the above, and the order of the traveling vehicles may be flexible by using feedforward control to be described below. A case where a user rides a following vehicle C 16 of FIG. 9 (in a non-driving condition) will be considered. If the vehicles travel in the order of having larger gross mass (gross weight) as described above, the user in the following vehicle C 16 cannot see the front side and becomes anxious. To dissolve user's anxiousness, the order of traveling vehicles may be set in accordance with the order of lower height (or smaller gross mass (gross weight)) of the following vehicles 12, 14, and 16.

The above contents will be restated as mentioned below. That is,
1) if the following vehicles A 12, B 14, and C 16 of which at least one vehicle exists in the vehicle group 300 (or the vehicle platoon 200) organized by a plurality of vehicles have inherent parameter values G1, G2, and G3, respectively,
2) if the parameter values G1, G2, and G3 of all the following vehicles fall within a predetermined range (satisfy the condition: maximum value G3≤1000×G1 (G1 is a minimum value)),
3) if feedforward control is used for the vehicle platoon navigation,
4) even if the traveling order of the following wheels A 12, B 14, and C 16 does not necessarily satisfy "G1<G2<G3", and
5) the inter-vehicle distance between the following wheels A 12, B 14, and C 16 is kept appropriately irrespective of the road surface conditions (uphill slope and downhill slope, wet and slippery condition, the snow-covered road, and the like).

[Platoon Vehicle Conditions]

The overtaking acceleration ratio between two adjacent following vehicles is smaller than 100 times (100G1>G2, 100G2>G3).

Alternatively, the vehicle having the whole vehicle weight (mass) including the passengers and the load that falls within the range of the upper limit/lower limit is added to a predetermined platoon as the following vehicle (command vehicle).

Alternatively, the individual parameter values (gross weight (mass) including passengers (living bodies) and load, overtaking acceleration, deceleration/braking force, frictional force of the tires, kinetic energy, and the like) of all the vehicles in the same vehicle group fall within a predetermined range (where the ratio of the maximum value to the minimum value is 1000 or less).

[Order of Traveling Vehicles in Platoon]

The following vehicle in the platoon located more closely to the lead side has a smaller overtaking acceleration (G1<G2<G3). The following vehicle in the platoon located farther from the lead side has a larger deceleration/braking force. A vehicle loaded with a hazardous material is located on the rear side (for safety purpose).

Next, a method of actual measurement or a method of calculation of various parameters described in expression (1) will be explained. The gross mass of the vehicle can be recognized by performing either or both of the following methods:

1. estimating from user application information at the time of the first reservation application (S201 of the FIG. 4), and
2. directly measuring at the merge into the vehicle platoon 200 (or the vehicle group 300).

Figure 3:
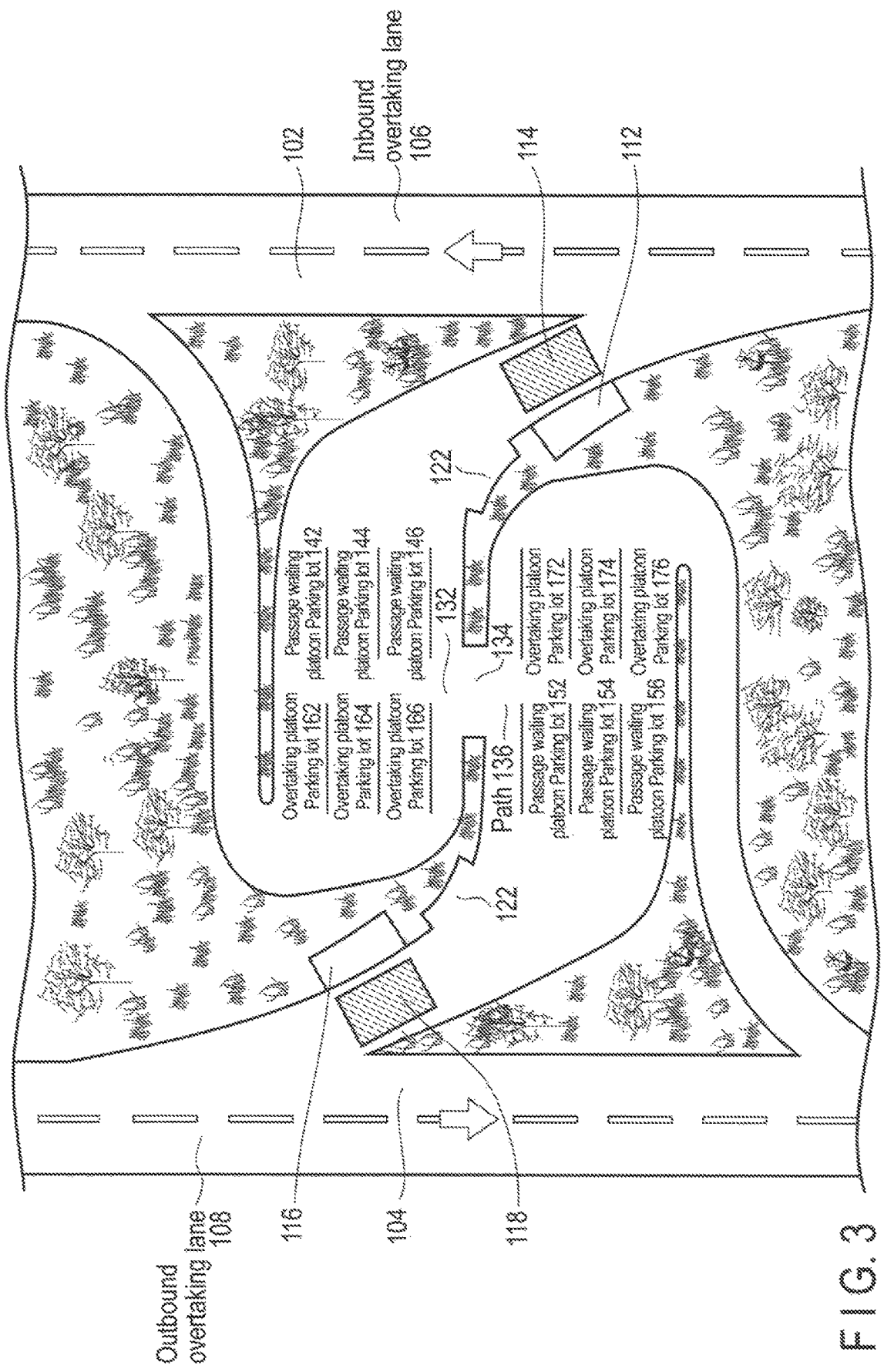
FIG. 3 is a view illustrating an example of a terminal in the present embodiment.

(For example, the gross mass may be directly measured by the gross weight measurement units 114 and 118 of the vehicles illustrated in FIG. 3.)

As for the gasoline vehicle, the overtaking acceleration is often defined by "middle accelerating time at 40→60 km/h, 80→120 km/h, 100→200 km/h, and the like". In contrast, as for the electric vehicle, the overtaking acceleration is often defined by "the ratio to gravitational acceleration G of the earth". To evaluate the gasoline vehicle and the electric vehicle on the same standards, the present embodiment employs the definition of the electric vehicle.

Figure 10:
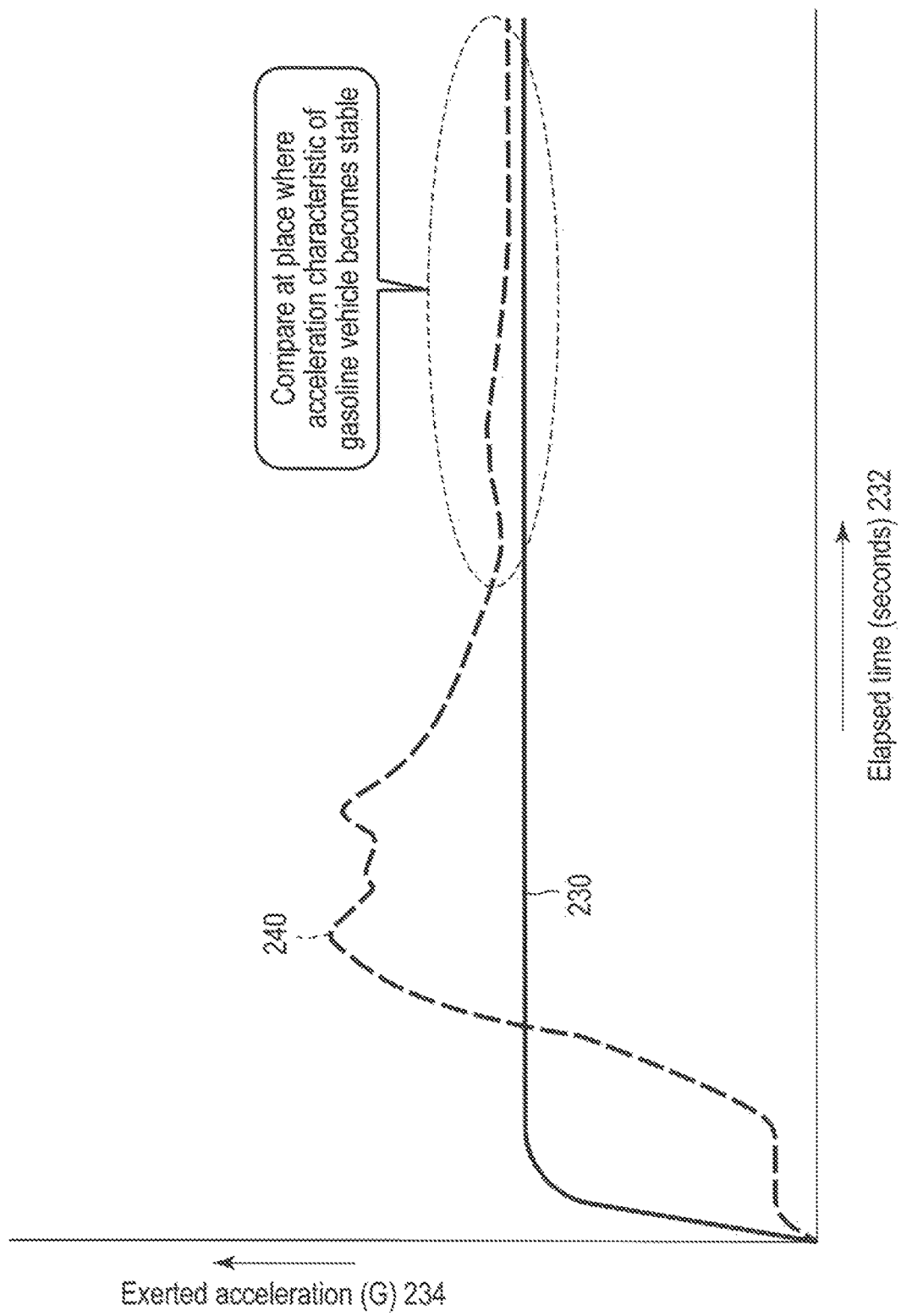
FIG. 10 is a graph illustrating comparison in driving performance between an electric vehicle and a gasoline vehicle.

In addition, as illustrated in FIG. 10, driving performance 230 of the electric vehicle is different from driving performance 240 of the electric vehicle in terms of the characteristic of exerted acceleration 234. To evaluate the driving performances 230 and 240 from the same viewpoint, they are compared at a place where the acceleration characteristic of the gasoline vehicle becomes stable.

Figure 11:
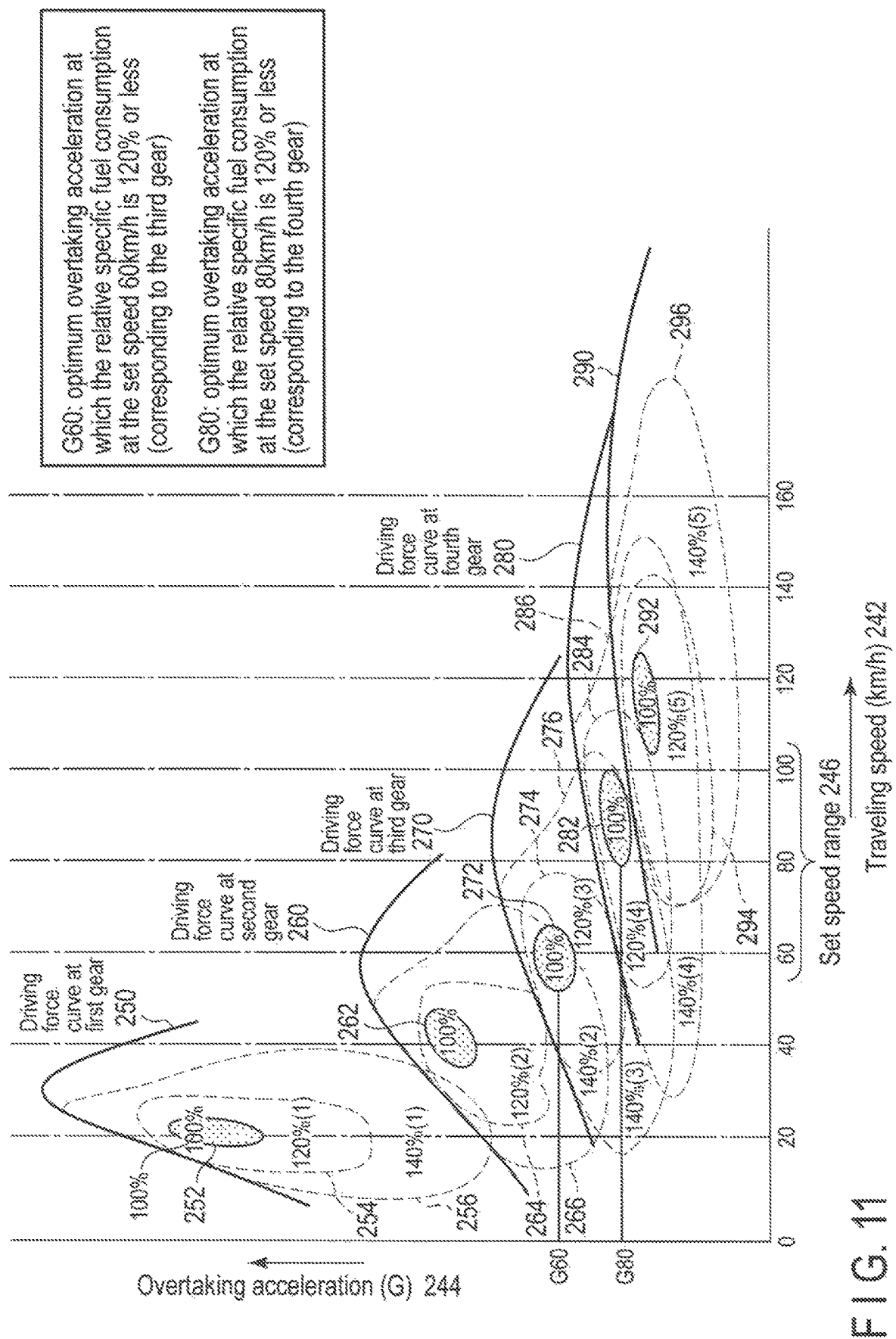
FIG. 11 is a graph illustrating a relationship between an overtaking acceleration property and a relative specific fuel consumption in a gasoline vehicle.

An overtaking acceleration 244 to a traveling speed 242 of a gasoline vehicle and relative specific fuel consumption contour line properties are illustrated in FIG. 11. Incidentally, 252, 262, 272, 282, and 292 represent relative specific fuel consumption 100% contour lines in the 1st/2nd/3rd/4th/5th gears in FIG. 11. In addition, 254, 264, 274, 284, and 294 represent relative specific fuel consumption 120% contour lines in the 1st/2nd/3rd/4th/5th gears. Then, 256, 266, 276, 286, and 296 represent relative specific fuel consumption 140% contour lines in the 1st/2nd/3rd/4th/5th gears.

The optimum overtaking acceleration in a set speed range 246 can be calculated using FIG. 11. For example, the highest overtaking acceleration at which the relative specific fuel consumption at the set speed 80 km/h is 120% or less is given at G80 corresponding to the fourth gear. Thus, overtaking acceleration 244 of the gasoline vehicle is obtained.

The vehicle driving performance (performance corresponding to the driving force of the expression (1)) on which the properties of FIG. 10 and FIG. 11 are based is often announced for each vehicle. Therefore, the overtaking acceleration properties can be calculated by also using the vehicle gross mass (gross weight) information. In addition, in the present embodiment, the information on the above overtaking acceleration can be obtained by using either or both of the following manners:

1. estimating from user application information at the time of the first reservation application (S201 of the FIG. 4),
2. acquiring history information from a driving unit control system 444 at the time of merging to the vehicle platoon 200 (or the vehicle group 300), and
3. acquiring the information in real time during platooning (or group traveling).

In addition, the deceleration/braking performance can be obtained by using either or both of the following manners:
1. acquiring history information from a driving unit control system 444 at the time of merging to the vehicle platoon 200 (or the vehicle group 300); and
2. acquiring the information in real time during platooning (or group traveling).

An example of the vehicle group navigation system in the present embodiment is illustrated in FIG. 12. Basically, the system is composed of the server 310 of the vehicle navigation management company which a vehicle navigation management company manages and the vehicle group 300. Control systems 338 and 332 are preliminarily built in the following vehicle Z 28 which is included in the only vehicle group 300 and the following vehicle A 12 which is included in both of the vehicle group 300 and the vehicle platoon 200.

In the example of FIG. 12, the mobile grouped vehicle guidance device 320 which the driver can carry exists and can execute wireless communication with the control systems 330, 332, and 338 of the respective vehicles (command vehicle A 2, and following vehicles A 12 and Z 28). Then, the mobile grouped vehicle guidance device 320 guides the cooperative travel of not only the following vehicles A 12 and Z 28 in the vehicle group 300 (vehicle platoon 200), but also the command vehicle A 2. The guiding is not limited to this, and a function of guiding the following vehicles A 12 and Z 28 may be preliminarily built in the control system 330 of the command vehicle A.

The cooperative operation between the units in FIG. 12 will be explained while linking to each of the already described steps in FIG. 4. The user's reservation application S201 is performed by using a portable unit 312 or a computer of home or a workplace (not illustrated). The server 310 of the vehicle navigation management company is notified of the reservation information via a long-distance communication relay machine 314.

In the database 318 managed by the server 310 of the vehicle navigation management company, not only grouped vehicle navigation management data (including the history) 322, but also driver navigation management data (including the history) 324, main road jam/accident history data 326, main road environment (meteorological information such as rain or snow) information history data 328, and the like are stored. Incidentally, necessary information such as the announced driving property of each vehicle type is obtained via an Internet line 316.

Incidentally, group type, season, day of the week, time zone, and a service form extra charge table 340 are stored in the above grouped vehicle navigation management data (including the history) 322 as described below. Therefore, when accepting (S201) the reservation application from the user, the server 310 of the vehicle navigation management company presents a fee according to the group type, season, day of the week, time zone, and service form which the user uses, by referring to the above charge table 340.

In addition, at acceptance (S201) of the reservation application from the user, the server 310 of the vehicle navigation management company obtains the information on the corresponding vehicle (following vehicle A 12 and the like) and stores the information in the grouped vehicle navigation management data (including the history) 322 in the database 318. Then, the server 310 of the vehicle navigation management company performs the vehicle group organization adapted to the vehicle (following vehicle A 12), based on the information (S203).

The server 310 of the vehicle navigation management company designates the command vehicle A 2 adapted to the vehicle group 300 thus organized. The inherent parameter values of vehicles (including the command vehicle A 2) of all of the vehicles in the organized vehicle group 300 need to fall within predetermined ranges. Therefore, a vehicle having the vehicle inherent parameter values adapted to the vehicle (following vehicle A 12) is designated as the command vehicle A 2.

Incidentally, even if the command vehicle A 2 and the following vehicle A 12 are geographically remote from each other, the command vehicle A 2 can guide travel of the following vehicle A 12 immediately after organizing the vehicle group 300. Then, the command vehicle A 2 departs (S206) and leads the following vehicle to the merging of S207 while performing guidance (remote operation) of the travel of the following vehicle A 12 and the like.

Figure 13:
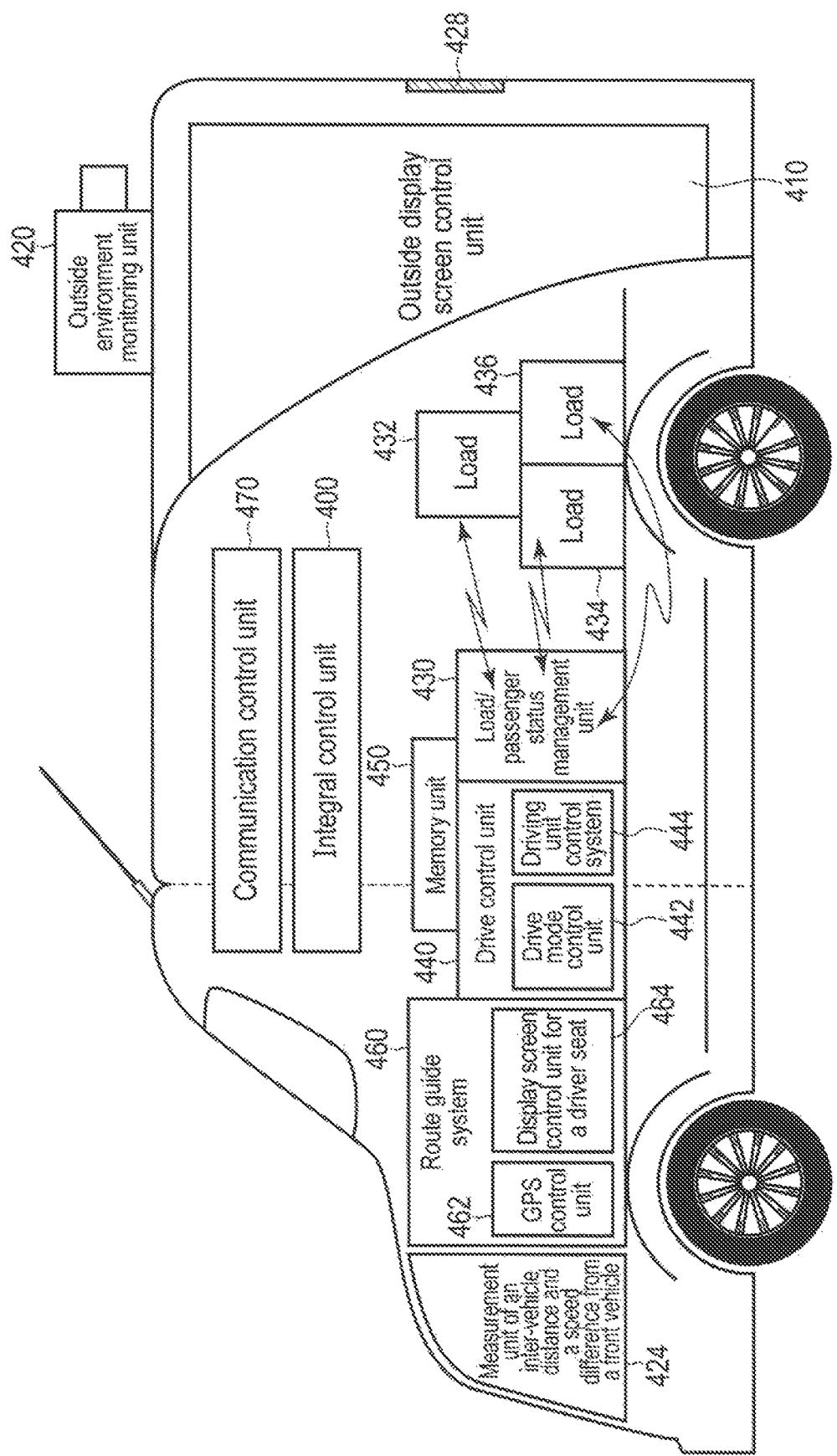
FIG. 13 is a view illustrating an example of a cooperatively driving vehicle used in the present vehicle group operation system.

Details in the control systems 330, 332, and 338 in the respective vehicles illustrated in FIG. 12 are illustrated in FIG. 13. Unlike the movable bodies which "need a dynamic action from the outside for movement" such as a platform truck and a cart, the vehicle is provided with a drive unit control system 444 enabling self-driving. Then, the self-driving vehicle capable of cooperative travel in the vehicle group (vehicle platoon) owns the structure or various functions illustrated in FIG. 13. Each of the units illustrated in FIG. 13 may be constituted by dedicated hardware or a dedicated software module for driving a processor.

The vehicle appropriately controls the inter-vehicle distances from adjacent vehicles with a "measurement unit 424 of an inter-vehicle distance and a speed difference from a front vehicle" installed near a front surface of the vehicle and a "reflection unit 428 for measuring an inter-vehicle distance and a speed difference from a subsequent vehicle" installed at a rear part of the vehicle.

In addition, an outside environment monitoring unit 420 can be used not only at change of the lane, but can be used to monitor inconvenient extension of the vehicle platoon length which results from interruption of a general vehicle, and the like. In addition, captured video/images of the outside environment monitoring unit 420 are appropriately stored in a memory unit 450 and can also be used as evidence references of a drive recorder at the time of the accident-generation.

In addition, "platoon display", "advertisement display", and the like for outside general vehicles may be performed by a function of an outside display screen control unit 410.

A communication control unit 470 is equipped with both of the middle-distance wireless function such as Wi-Fi or EnOcean, and the long-distance wireless function such as 2G/PDC, GSM (registered trademark) (Second Generation/Personal Digital Cellular, Global System for Mobile Communications), 3G/CDMA (Third Generation/Code Division Multiple Access), and WiMAX (World wide Interoperability for Microwave Access). Then, exchange of the information with other vehicles in the vehicle group can be performed via the communication control unit 470. In addition, the inter-vehicle distance from a front vehicle is controlled via the communication control unit.

A GPS control unit 462 and a display screen control unit 464 for a driver seat are installed in a route guide system 460. In particular, when traveling on the other route 204 before merging to the vehicle group 300, current position information of the merging platoon is temporarily sent from the server 310 of the vehicle navigation management company via the communication control unit 470. At the same time, the position of the own vehicle can be confirmed by the GPS control unit 462. In the route guide system 460, the route for merging to the target platoon is determined based on the information and the display screen control unit 464 for the driver seat is urged to display the route. A semitransparent organic Electro Luminescence (EL) layer is embedded in the windshield of the driver seat to display the merging route generated by the display screen control unit 464 for the driver seat, though not illustrated.

A drive mode control unit 442 and a drive unit control system 444 exist in the travel control unit 440. In the present embodiment, as described below, a guided mode 490 is defined besides a manual drive mode 480 and a full-automatic drive mode 485. The above-explained drive mode control unit 442 takes charge of changing the modes.

The drive unit control system 444 performs not only the drive control of the engine and the motor, but also the brake control and the wheel rotation control (including slip prevention control on a wet road surface and snow-covered road). In addition, the controlled data of each part obtained by the drive unit control system 444 are successively stored in the memory unit 450.

Therefore, the "overtaking acceleration", the "deceleration/braking force", and the "frictional force of tires" can be calculated using the above-explained calculating expressions, based on the data associated with the drive unit control system 444 stored in the memory unit 450. In addition, besides these, the "overtaking acceleration", the "deceleration/braking force", and "frictional force of tires" are appropriately calculated in real time inside the drive unit control system 444.

The "overtaking acceleration", "deceleration/braking force", and the "frictional force of tires" thus obtained in real time or the historical data thereof are appropriately sent to the mobile grouped vehicle guidance device 320 via the communication control unit 470.

In the system of the present embodiment, a communication function using short distance wireless communication or the near field communication is built in loads 432, 434, and 436 or package bodies gathering the loads, and a container itself. For example, at the transportation of perishables, thermal management and the humidity management of perishables in the transportation are important. Therefore, a load/passenger condition management unit 430 performs condition management of the load and of the load and physical condition of the passengers by using wireless communication. Then, when finding a condition abnormality of the load (such as storage temperature change of perishables) or poor physical health of the passengers, the load/passenger condition management unit 430 gives a warning to the mobile grouped vehicle guidance device 320 via the communication control unit 470.

Figure 14:
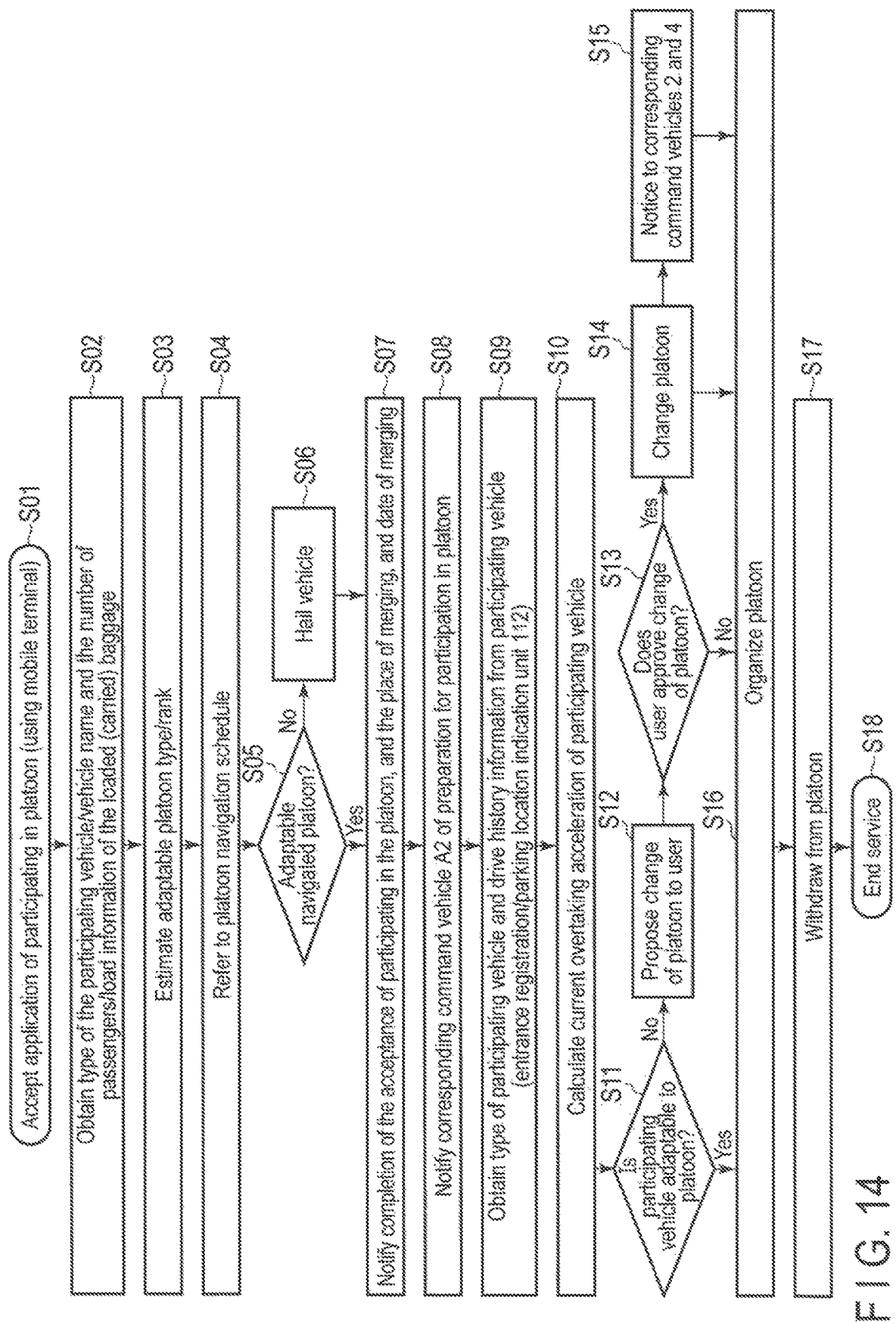
FIG. 14 is a flowchart illustrating an example of a platoon organization procedure in the system of the present embodiment.

An example of the procedure of platoon organization and a method of navigating the vehicle platoon, in the system of the present embodiment forming the vehicle group (vehicle platoon) of a plurality of vehicles having the parameters inherent to vehicles falling within predetermined ranges are illustrated in FIG. 14. The important points are:

obtaining the information on the vehicle (following vehicle) to be used at acceptance of the reservation from the user, organizing an appropriate vehicle group (vehicle platoon) based on the information, also obtaining the information on the vehicle (following vehicle) appropriately before merging to or at the cooperative travel with the vehicle group of the vehicle (following vehicle), determining the in-group aptitude of the vehicle (following vehicle), and when it is determined the above vehicle (following vehicle) is inappropriate, making a notice of the determination.

Incidentally, the above inherent parameter values can be obtained from the information on the above vehicle (following vehicle). The server 310 of the vehicle navigation management company may calculate the inherent parameter values from the above information or the inherent parameter values may be directly included in the above information. Then, the vehicle group (vehicle platoon) is organized such that the inherent parameter values fall within predetermined ranges.

When the user applies for participation in the vehicle platoon 200 using portable unit 312 in step S01, the server 318 of the vehicle navigation management company accepts the application. The server 318 obtains the type of the participating vehicle/vehicle name and the number of passengers, and load information of the loaded (carried) baggage at this stage (S02), and stores them in the grouped vehicle navigation management data (including the history) 322 in the database 318. Simultaneously with this, the server 318 of the vehicle navigation management company checks the drive property of the vehicle name specified using the Internet line 316.

In addition, the server 318 estimates the gross mass of the vehicle from the number of passengers and the load information of the loaded (carried) baggage. Next, the overtaking acceleration property of the target vehicle is calculated using the expression (1). In step S03, the type and rank of the vehicle platoon 200 to match are estimated using the result.

After that, the server 318 of the vehicle navigation management company retrieves the navigation management data 322 of the grouped vehicle in the database 318 and refers to the navigation schedule of each vehicle platoon 200 (S04).

If no navigated platoon matches (No in S05) hailing a vehicle is arranged (S06), and if a navigated platoon to match exists (Yes in S05), the user is notified of completion of the acceptance of participating in the platoon and the place and date of merging (S07). Then, the server 308 notifies the designated command vehicle A 2 of designation of the participation in platoon (S08).

When starting communication with the following vehicle A 12 which is regarded as (the mobile grouped vehicle guidance device 320 in) the command vehicle A 2, the mobile grouped vehicle guidance device 320 collects the history information of the drive unit control drive 444 stored in the memory unit 450 in the following vehicle A 12 (S09). Then, the overtaking acceleration (at the time of loading baggage, persons, animals, or the like) under the current conditions of the following vehicle A 12 is calculated (S10) and it is determined whether the following vehicle adapts to the current vehicle platoon 200 or not (S11), in the mobile grouped vehicle guidance device 320. Then, when the following vehicle adapts to the current vehicle platoon 200 (Yes in S11), the platoon organization in S16 is performed.

When the server 310 of the vehicle navigation management company wants to directly collect inherent parameter values of the following vehicle A 12 in a case other than the above, the server 310 may collect the data from the gross weight measurement units 114 and 118 of the vehicles in the terminal 42 (FIG. 3).

If the following vehicle does not adapt to the inherent parameter values of the following vehicle A 12 (No in S11) the server proposes the user to change the platoon to which the user is to belong (S12), and if the user approves the change (Yes in S13), the server changes the platoon (S14) and notifies the command vehicles A 2 and B 4 of the new and previous platoons of the change.

Figure 15:
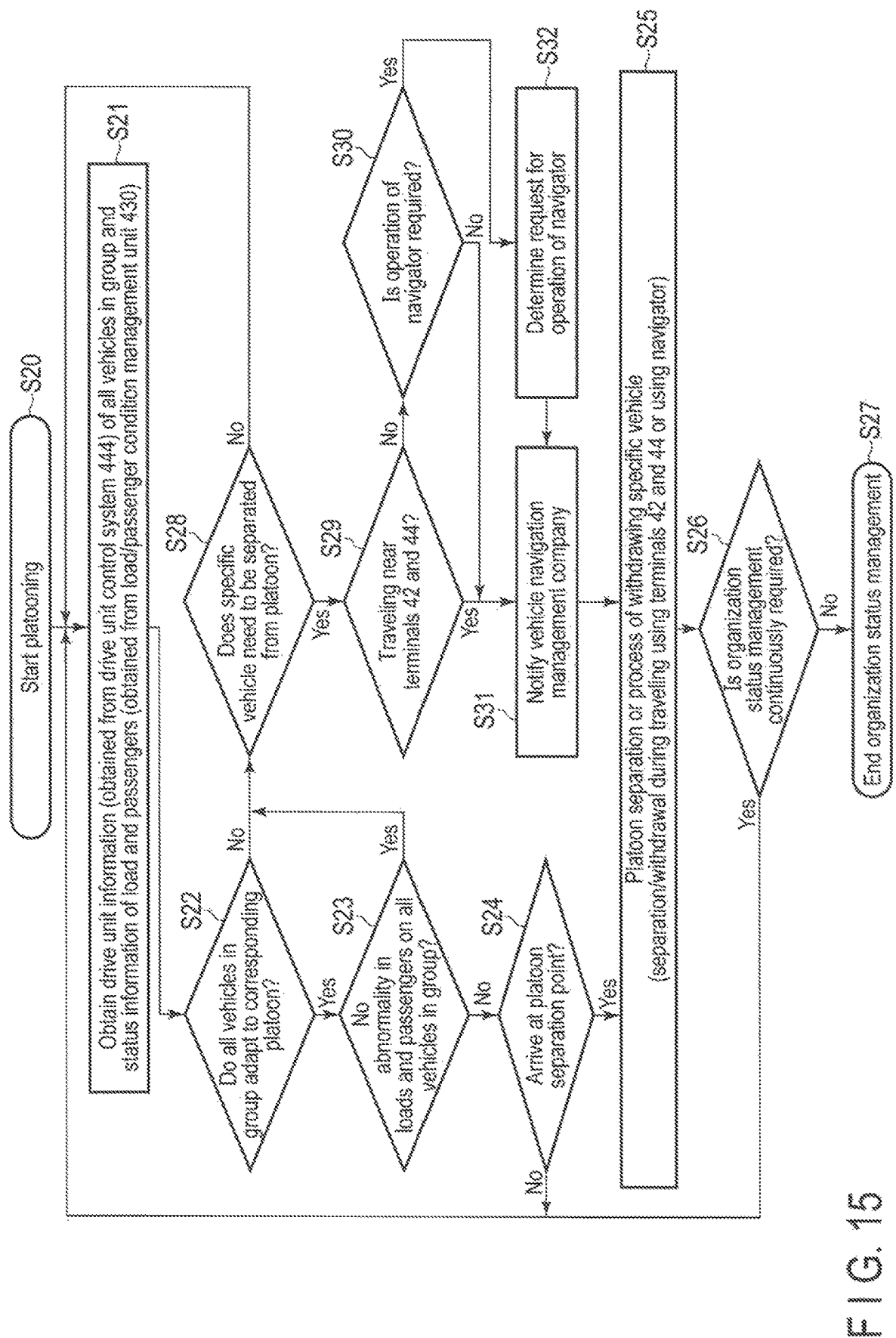
FIG. 15 is an explanatory flowchart illustrating an example of an organization condition management method in the system of the present embodiment.

FIG. 14 mainly illustrates the vehicle platooning method and vehicle group navigation system executed until the cooperative travel is started, and FIG. 15 illustrates the vehicle platooning method for determining adaptability of the vehicle group 300 (vehicle platoon 200) after the cooperative travel is started and the vehicle group navigation system. The points of using both of the vehicle group navigation system and the vehicle platooning method can be summarized below:

1) comprising a first unit and a second unit for detecting the parameter values of the following vehicle A 12, 2) urging the server 310 of the vehicle navigation management company to determine the adaptability of vehicle group of the following vehicle A 12 based on the parameter values of each following vehicle A 12 detected by the first unit, 3) urging the command vehicle A 2 (or the mobile grouped vehicle guidance device 320) determine the adaptability of vehicle group of the following vehicle A 12 based on the parameter values of each following vehicle A 12 detected by the second unit, and 4) making a notice when determining that the vehicle group is inadaptable as a result of the determination.

A process flow of FIG. 15 corresponding to the detection performed by the second unit will be explained. The information related to the travel of the following vehicle A 12 is collected in the drive unit control system 444 built in the following vehicle A 12. In contrast, the load/passenger condition management unit 430 collects the information on the loads and passengers in the following vehicle A 12.

The command vehicle A 2 (or the mobile grouped vehicle guidance device 320) collects the information (S21) and performs determination on whether all the grouped vehicles adapt to the corresponding platoon or not (S22). This corresponds to the determination of the vehicle group adaptability based on the detection result of the second unit.

In addition, besides this, determination on whether the loads and passengers on all of the vehicles in the group have abnormality or not (S23) is simultaneously performed in the system of the present embodiment.

Based on the determination result (i.e., in a case of No in S22 or Yes in S23), the vehicle in which a trouble occurs (or inadaptability of vehicle group is found) is withdrawn from the vehicle platoon (S25). In the system of the present embodiment, two response methods are prepared as the withdrawing method.

A) withdrawal in the terminals 42 and 44, and

B) platoon separation based on withdrawal during traveling⇒guidance of a new command vehicle B 4 (navigator).

When a place where a trouble occurs (inadaptability of vehicle group is found) is near the terminals 42 and 44 (Yes in S29), the response (A) is made. In contrast, when the determination result in S29 is No, the dispatch of the navigator corresponding to the new command vehicle B 4 necessary for platoon separation is requested (S32).

The principle of measurement of the inter-vehicle distance and speed difference from a front vehicle, which is performed in the vehicle capable of the cooperative travel will be explained prior to the explanation of the feedforward control method employed in the present embodiment. The measurement unit 424 of an inter-vehicle distance and a speed difference from a front vehicle in the vehicle capable of cooperative traveling is composed of a measurement unit of an inter-vehicle distance and a measurement unit of a speed difference from the front vehicle.

Figure 16:
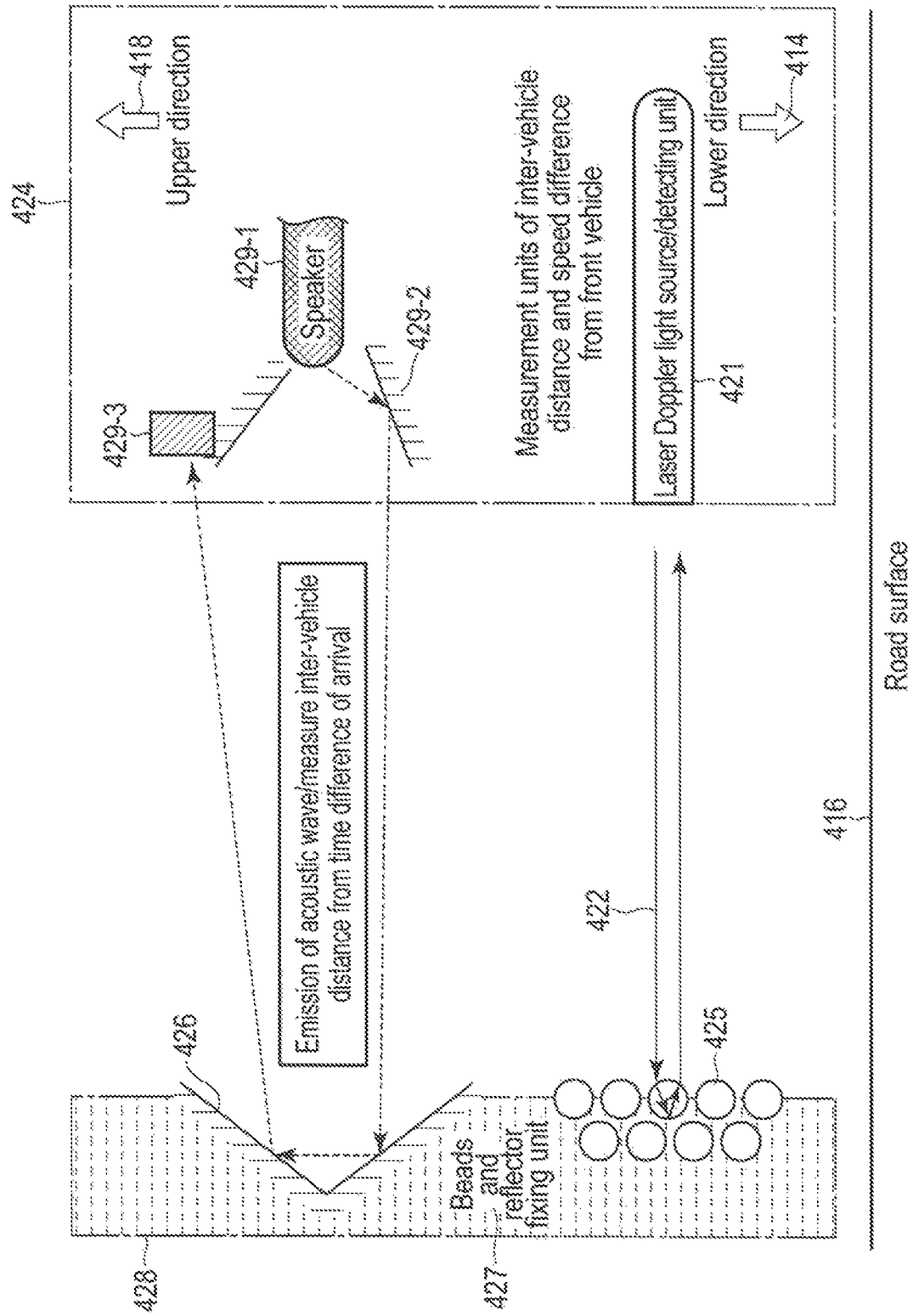
FIG. 16 is an explanatory view illustrating a method of measuring a difference between an inter-vehicle distance and a speed, and structures of a measurement unit/a reflection unit.

In the embodiment illustrated in FIG. 16, the inter-vehicle distance is measured using reflection of the acoustic wave (in time difference between emission/arrival of the acoustic wave), and the speed difference is measured using a laser Doppler effect. The measurement is not limited to this, and the inter-vehicle distance and the speed difference may be measured by arbitrary methods. That is, at least one of the inter-vehicle distance and the speed difference may be measured using, for example, a microwave and an electric wave.

It is known that the Doppler effect is generated in the acoustic wave emitted from a traveling vehicle. In the present embodiment, however, the harmful effect of the Doppler effect is offset since coming and going of the acoustic wave is used. It is known that the speed of sound in the air of 1 atmospheric pressure at 15° C. is 340 m/s. Since the required time for the acoustic wave to reflect on a front vehicle in the inter-vehicle distance of 80 m and return is 471 ms, a high signal band is not required for the inter-vehicle distance measuring circuit.

In addition, since the speed of sound at 0° C. is 332 m/s, a measurement error of the inter-vehicle distance which results from the variation in temperature is not a serious problem. It is therefore considered that use of the acoustic wave is suitable for measurement of the inter-vehicle distance.

In FIG. 16, the acoustic wave emitted from a speaker 429-1 is reflected on a conical acoustic wave reflector 429-2 to improve directivity of the acoustic wave in FIG. 16. In addition, a conical acoustic wave reflector 426 is provided at the reflection unit 428 for measuring the inter-vehicle distance and the speed difference from a subsequent vehicle such that the acoustic wave returns to the microphone 429-3. Then, the acoustic wave reflects two times and returns.

In contrast, a laser Doppler light source/detection unit 421 is provided in the speed difference measurement unit. The acoustic wave has much worse directivity as compared to a laser beam. Therefore, the measurement unit of the inter-vehicle distance from the front vehicle is arranged in an upper direction 418 than the speed difference measurement unit to prevent the acoustic wave from reflecting on a road surface 416 at the measurement and a measurement error from occurring.

Beads 425 for optical reflection are arranged in front of an optical path 422 of the laser beam for measurement of the speed difference, such that the laser beam can easily return to the detection unit. Incidentally, the beads 425 for optical reflection are fixed in a unit 427 for fixing the beads and the reflector together with the cone shaped acoustic wave reflector 426.

Figure 17:
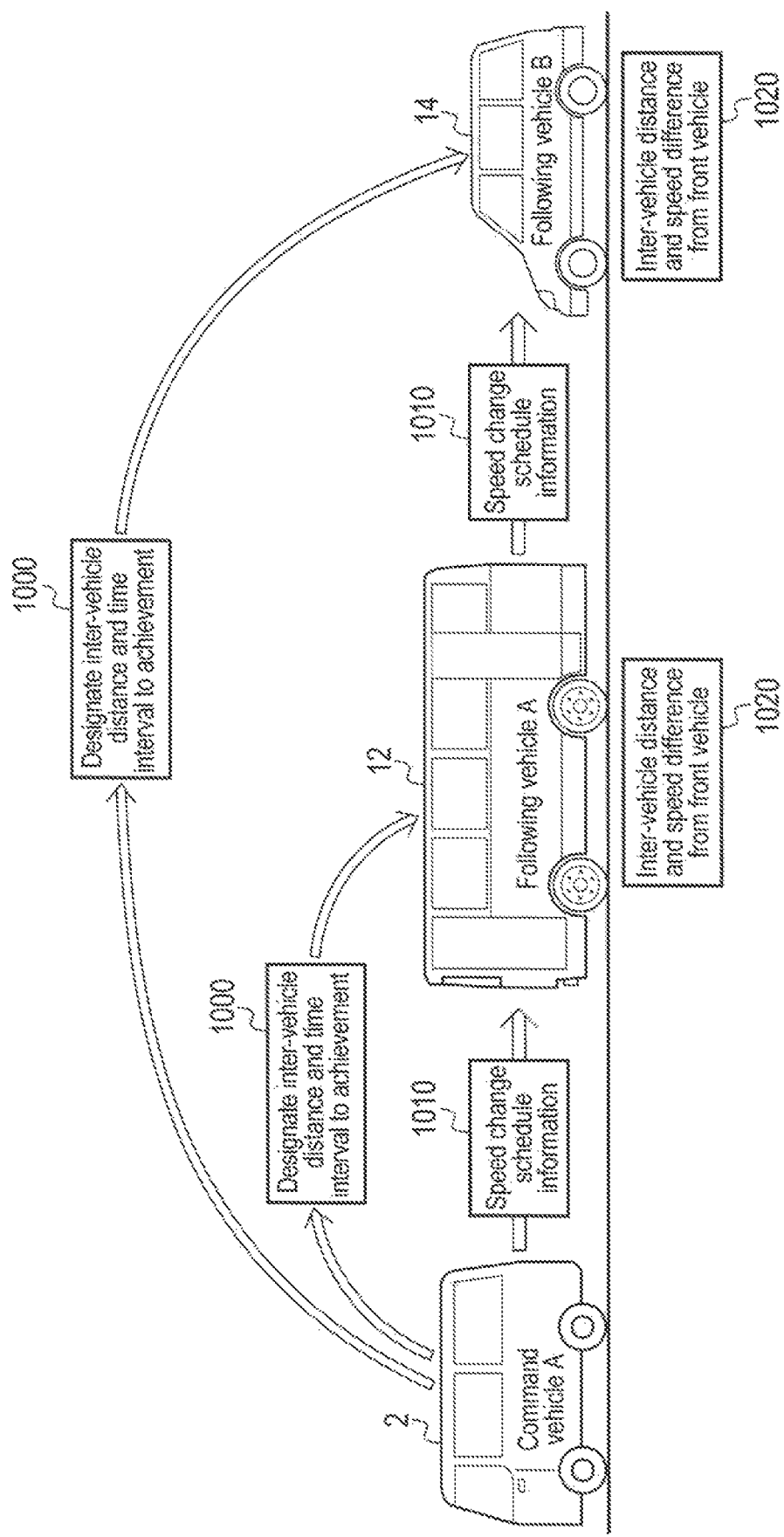
FIG. 17 is an explanatory view illustrating a principle of a deriving method using track driving in the present embodiment.

A control method (feedforward control method in the vehicle platoon) of the grouped vehicle guidance device (or the command vehicle A 2) which controls the travel such that the inter-vehicle distance from the lead vehicle of the following vehicles A 12 and B 14 becomes an appropriate value will be described with reference to FIG. 17.

The grouped vehicle guidance device (or the command vehicle A 2) specifies only "inter-vehicle interval 1000 from a front vehicle after a predetermined time interval Δt" to each of the following vehicles A 12 and B 14. In addition, each of the following vehicles A 12 and B 14 monitors inter-vehicle distance and speed difference 1020 from the front vehicle, in real time, by using the method of FIG. 16. Furthermore, the following vehicle also monitors the road surface status (uphill/downhill and slippery conditions) from information from the drive unit control system 444, in real time. At the same time, the following vehicle approximately notifies the subsequent vehicle of scheduled speed change information 1010 of the front vehicle.

First, it is assumed that the scheduled speed change information 1010 of the command vehicle A 2 is determined based on guidance of the grouped vehicle guidance device. The scheduled speed change information 1010 is transmitted to the following vehicle A 12.

Figure 18:
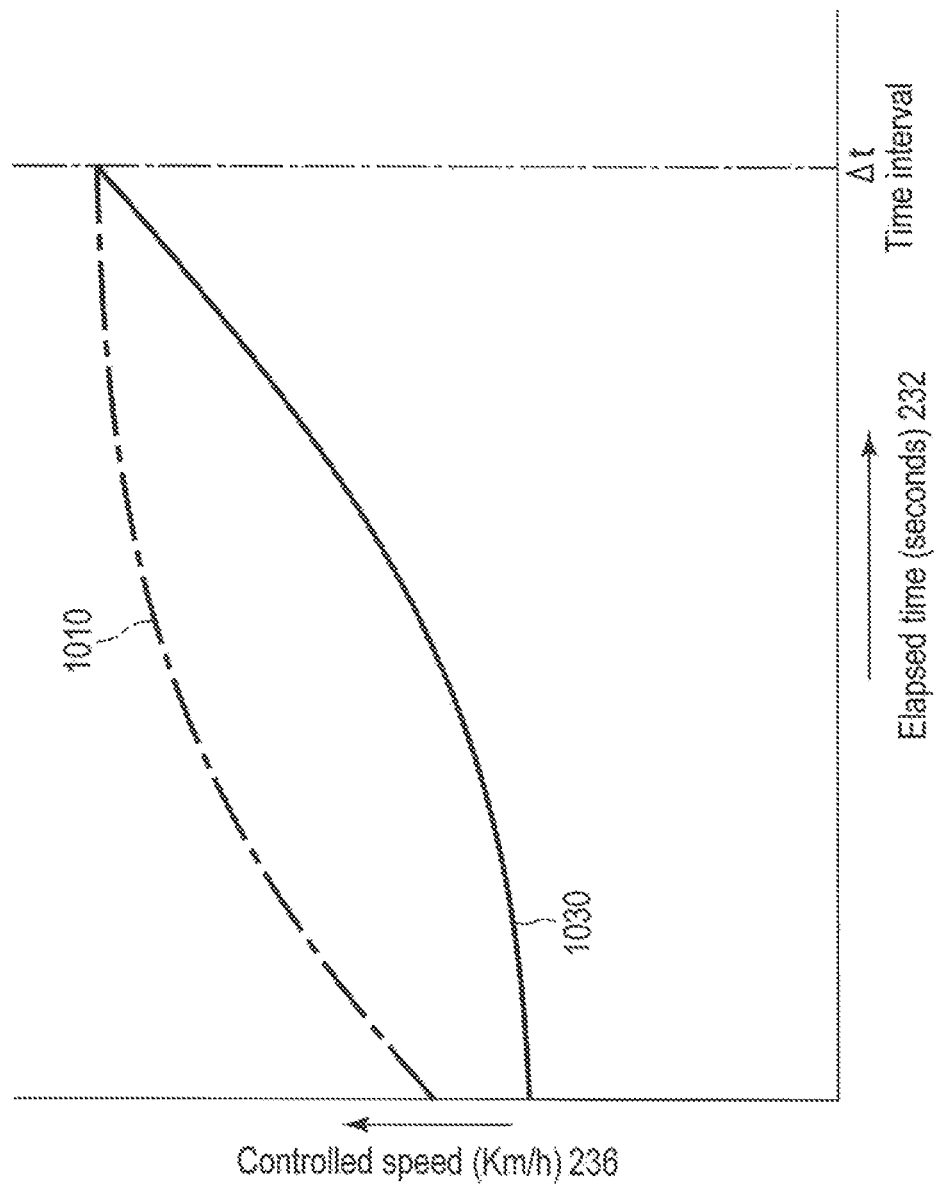
FIG. 18 is an explanatory graph illustrating a method of computing a predetermined control speed based on feedforward method.

A relationship between, for example, a scheduled control speed property 1030 of the own vehicle which is to be calculated by the following vehicle A 12 and the scheduled speed change information 1010 of the front vehicle transmitted from the command vehicle A 2 is illustrated in FIG. 18. A case where the "information 1000 of designation of inter-vehicle distance and time interval before achievement" transmitted from the grouped vehicle guidance device (or the command vehicle A 2) to the following vehicle A 12 has a scheduled control speed 236 after time interval Δt designated as illustrated in FIG. 18 will be considered.

The following vehicle A 12 recognizes the current inter-vehicle distance and speed difference from the command vehicle A 2. Then, the scheduled control speed 236 after time interval Δt needs to match the scheduled speed change information 1010 of the front vehicle after time interval Δt. A current road surface status is added to these prerequisites (boundary conditions), and the optimum "scheduled control speed 1030 of the own vehicle" from the current time to the time after time interval Δt is calculated in an integrated control unit 400. An effect of flexibly securing the high-precision inter-vehicle distance in a short time can be obtained by performing the above feedforward control.

Furthermore, when the traveling order of the following vehicles A 12, B 14, and C 16 in the vehicle platoon 200 is arbitrarily set as already explained with reference to FIG. 9, an appropriate inter-vehicle distance is secured by using the above feedforward control even if the road surface statuses change (change to an uphill slope or a downhill slope, a wet and slippery condition, and change to a snow-covered road).

For example, on a downhill slope or in a slippery condition, crush can be prevented if the inter-vehicle distance is preliminarily made longer by the feedforward control. In contrast, when reaching an uphill slope during traveling with a following vehicle of a small overtaking acceleration, the inter-vehicle distance is preliminarily made shorter before entering the uphill slope. If the feedforward control is thus performed, more extension of the inter-vehicle distance than required at an end point of the uphill slope can be prevented.

A detailed example of travel guidance (i.e., a detailed example of the vehicle platooning method) using the above feedforward control method performed by the grouped vehicle guidance device (or the command vehicle A 2) is illustrated in FIG. 19.

When platooning starts (S120), the grouped vehicle guidance device (or the command vehicle A 2) starts an action of collecting various types of information activity in step S121. The guidance device obtains the information on a scheduled travel route from the server 310 of the vehicle navigation management company as the collection target information as indicated in S122. Main road environment (weather and the like) information history data 328 are stored in the database 318 managed by the server 310 of the vehicle navigation management company. Uphill/downhill slope information, and real-time weather information such as rainy weather or snow are stored in the database 318. In addition, besides the above, main road jam/accident history data 326 are also stored in the database 318. The information is appropriately transmitted to the grouped vehicle guidance device (or the command vehicle A 2) via the long-distance communication relay machine 314.

In addition, simultaneously, the guidance device analyzes the information of the drive unit control system 444 in the command vehicle A 2 and originally acquires information such as the slippery condition of the road surface, the local slope gradient, and the like, as indicated in S123.

The tire friction coefficient of specific following vehicles A 12, B 14, and C 16 is deteriorated and the deceleration/braking force becomes worse depending on the road surface condition. For this reason, the information on the drive unit control system 444 and the inter-vehicle distance information of all the vehicles in the vehicle platoon need to be obtained as indicated in S124.

The optimum guidance information of all the vehicles in the platoon (including the command vehicle A 2) is calculated (S125) in the grouped vehicle guidance device (or the command vehicle A 2) before the road surface status changes (a gradient changes or slippery status changes).

In first step S126 of the feedforward control, the scheduled speed change information of the own vehicle (command vehicle A 2) is transmitted to the subsequent vehicle (following vehicle A 12). Next (S127), each of the following vehicles A 12, B 14, and C 16 in the vehicle platoon is notified of the "designated inter-vehicle distance and time interval Δt to the achievement".

When the inter-vehicle distance is much longer than required, a risk that a general vehicle may edge into the vehicle platoon increases. Therefore, "prevention of squeeze of a general vehicle more than required" is very important for the feedforward control. Therefore, the information obtained from the outside environment monitoring unit 420 (FIG. 13) of all the vehicles in the platoon is monitored sequentially, and "a sign of the squeeze of a general vehicle" is recognized preliminarily (S128). Then, when the sign is recognized (Yes in S128), the optimum guidance information is calculated again (S125) to reduce the inter-vehicle distance.

The feedforward control can be used for not only appropriate control of the inter-vehicle distance depending on change of the road surface status, but also control of the lane change to avoid an accident on the travel lane. An effect of avoiding an accident and avoiding a traffic jam can be obtained by using the feedforward control.

Figure 20:
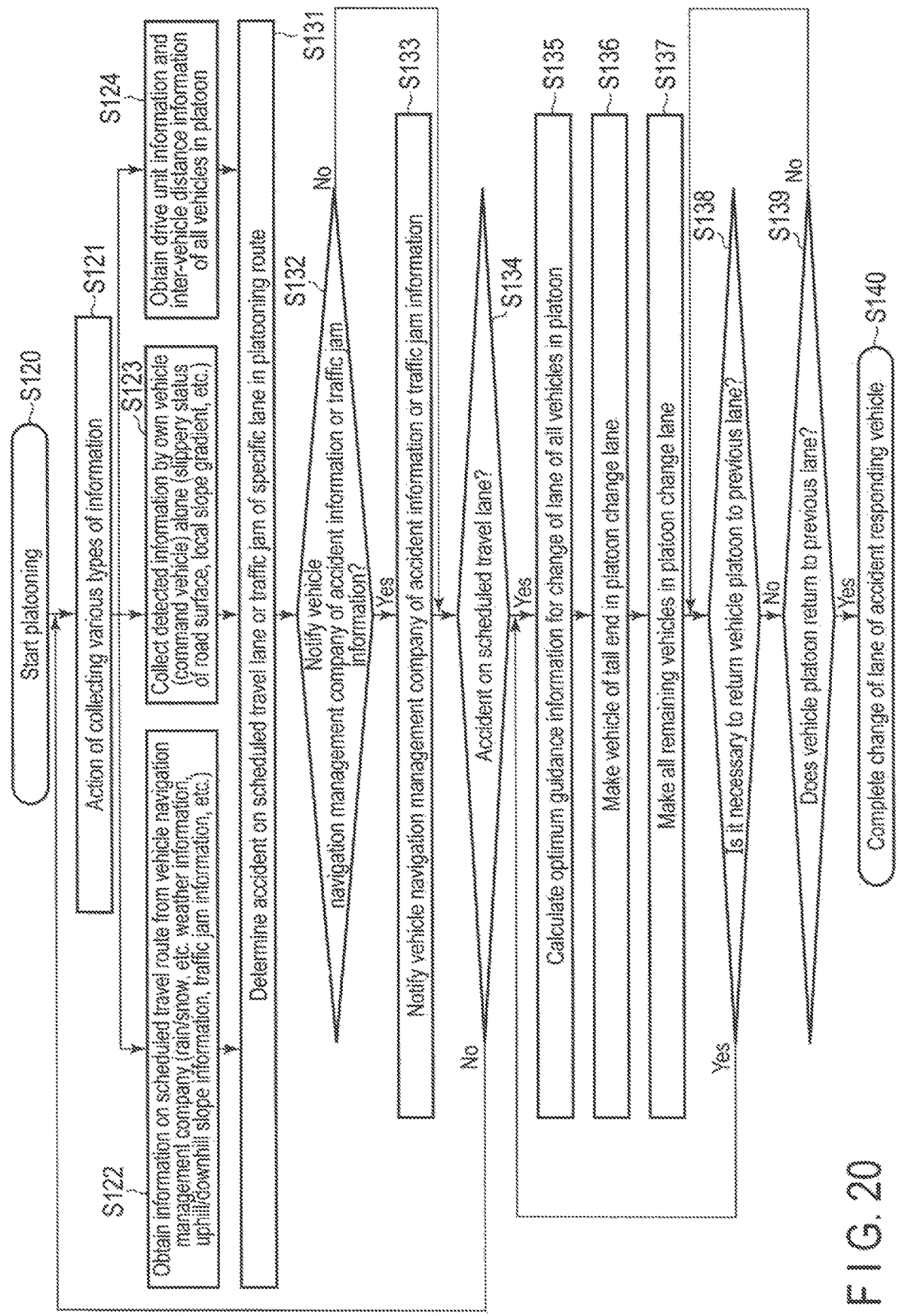
FIG. 20 is an explanatory flowchart illustrating an application example (response to accident) at the time of the guiding the platoon vehicle.

For example, a case of finding an accident or traffic jam on the way to a destination on the travel lane by the above outside environment monitoring unit 420 in step S131 of FIG. 20, is considered. If necessary (S132), the server 310 of the vehicle navigation management company is notified of the accident or traffic jam information (S132) to add the information into the main road jam/accident history data 326. The other vehicle groups 300 (vehicle platoon 200) can utilize the added accident/traffic jam information.

When a traffic jam occurs at the destination, its response can be made by making the drive speed slower. However, when an accident occurs on the travel lane on which the vehicle is to travel (Yes in S134), the whole vehicle platoon 200 needs to change the lane to an overtaking lane (S137). Therefore, the grouped vehicle guidance device (or the command vehicle A 2) calculates the optimum guidance for the change of lane in step S135.

As the lane change method of the whole vehicle platoon 200, the method of FIG. 20 causes the vehicle at the tail end in the platoon to change the lane (S136) and then causes all of the remaining vehicles to change the lane (S137). The concrete method will be described below with reference to FIG. 27. Then, the vehicle platoon 200 returns to the previous travel lane after passing by the accident site (Yes in S138).

Figure 21:
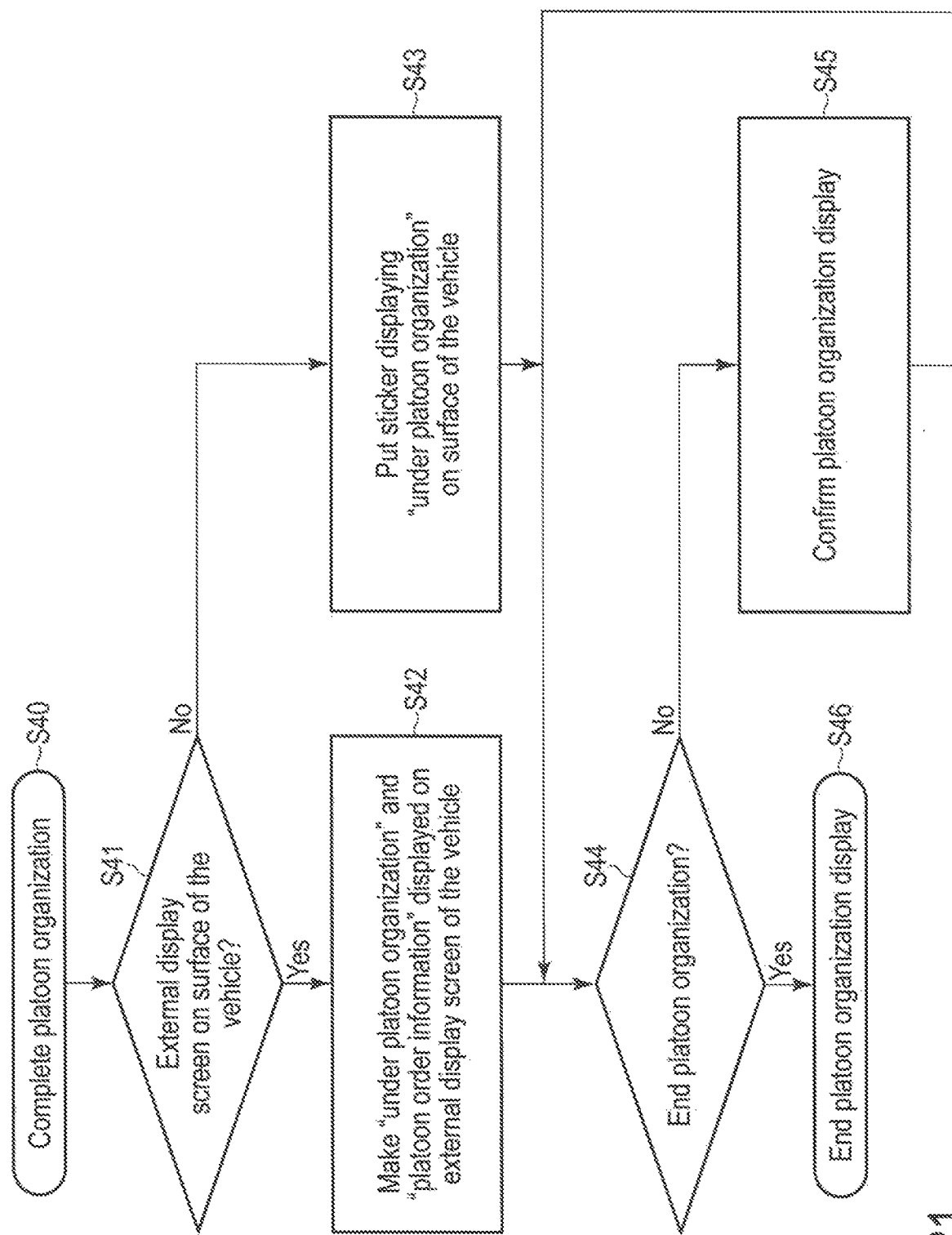
FIG. 21 is an explanatory flowchart illustrating a method of notifying a general vehicle of the platoon organization in the system of the present embodiment.

When a general vehicle is notified of the platooning status of a plurality of vehicles, a careless accident can be prevented and providing unnecessary stress to a general vehicle can also be prevented. As a method of disclosing the platooning to a general vehicle, in the present embodiment, physical notice (hardware-like display) of a display such as a sticker or software-like display on a display screen may be performed. An example of a method of notifying a general vehicle of vehicle platoon navigation of the present embodiment is illustrated in FIG. 21.

The notice to a general vehicle is performed after completing the platoon organization (S40). When an external display screen is formed on a part of the platoon vehicle surface (Yes in S41), software-like display can be performed. In this case, display of "under platoon organization" is performed on the external display screen of the platoon vehicle, similarly to step 42. Furthermore, when the information on the "number of the platoon vehicles" and the "traveling order in the platoon" of the corresponding platoon vehicles is displayed, traveling responding to a general vehicle can be performed.

In contrast, when an external display screen is not formed (No in S41), hardware-like display is required. As an example of the display, a sticker displaying "under platoon organization" may be put on the platoon vehicle surface in a manner like step S43. In addition, the confirmation of appropriate display (S45) may be performed as appropriate during platooning (during platoon organization).

Figure 22:
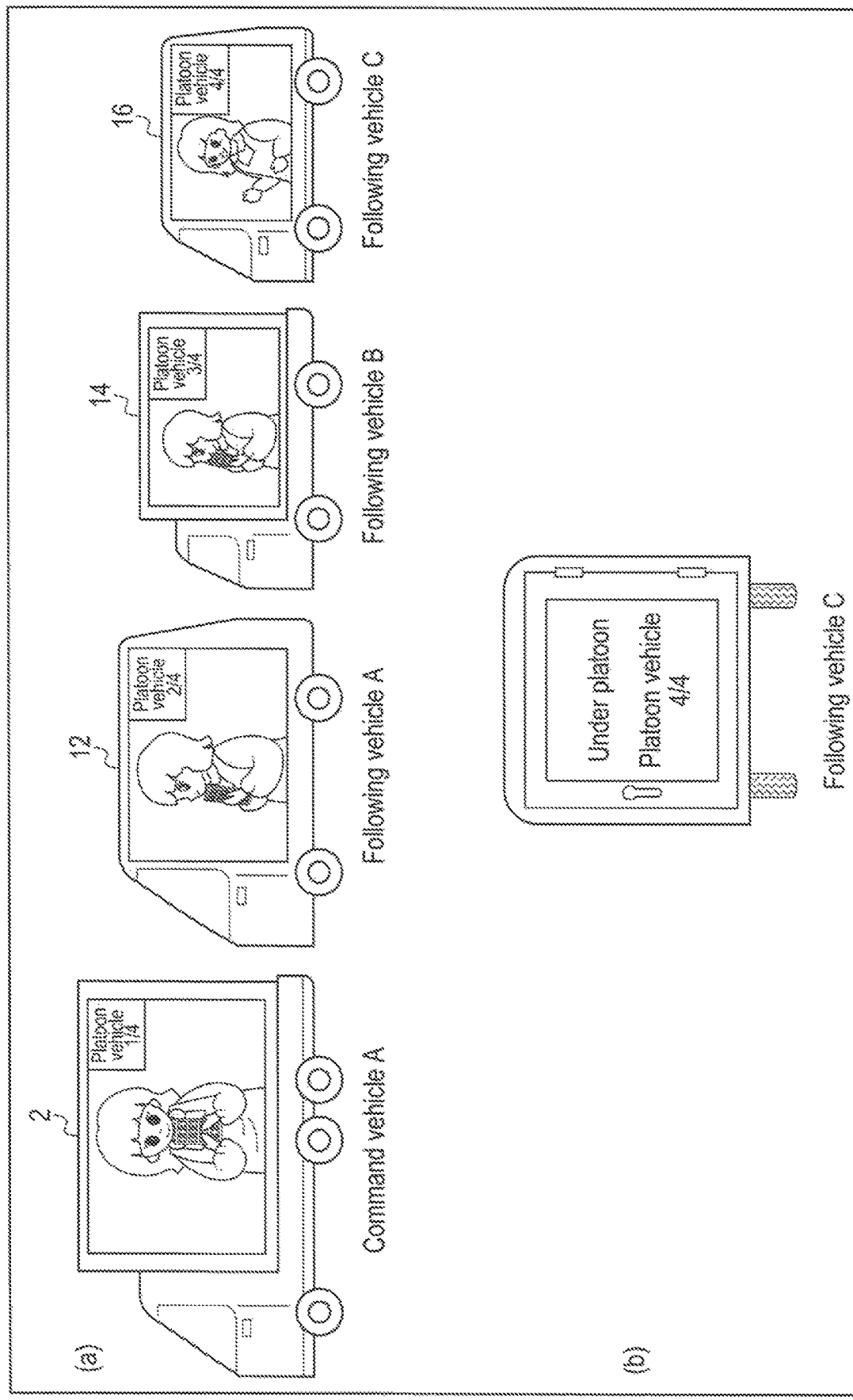
FIG. 22 is an explanatory view illustrating an example of screen display of a vehicle outside the platoon vehicle.

An example of the display thus performed is illustrated in FIG. 22. The information of "number of platoon vehicles" and "traveling order in the platoon" may be displayed in the form of fraction. In addition, the display is not limited to the side of the traveling vehicle (FIG. 22 (*a*)). When the display is performed on a rear side in a manner as illustrated in FIG. 22 (*b*), a subsequent general vehicle is easy to be understood.

FIG. 22 (*a*) illustrates an example of display using the external display screen of the platoon vehicle surface for advertisement. When cooperative images (or video) are displayed on the platoon vehicles as illustrated in FIG. 22 (*a*), an advertisement effect is improved. The cooperative images (or video) of the platoon vehicles are not limited to sequential video (sequential video) illustrated in FIG. 22 (*a*) but, for example, panoramic images (or panoramic video) or the like may be displayed.

An example of a concrete method of cooperating in displaying in the platoon vehicles is illustrated in FIG. 23. First, the grouped vehicle guidance machine (or the command vehicle A 2) receives all images/video for advertisement from the server 310 of the vehicle navigation management company (S51). After that, the grouped vehicle guidance device (or the command vehicle A 2) determines a method of dividing and distributing the images/video to be displayed into respective vehicles in the platoon as illustrated in step 52. The image/video information to display advertisement is transmitted for each vehicle in the platoon, based on the decision content (S53).

In the present embodiment, a vehicle group or a vehicle platoon organized by a plurality of vehicles in which the parameter values inherent to vehicles fall within predetermined ranges. As a result, for example, the vehicles are often classified into a vehicle group of a larger overtaking acceleration and a vehicle group of a smaller overtaking acceleration. In this case, the vehicle platoon of a larger overtaking acceleration often needs to overtake the vehicle platoon of a smaller overtaking acceleration in the main road (expressway) 50.

Figure 24:
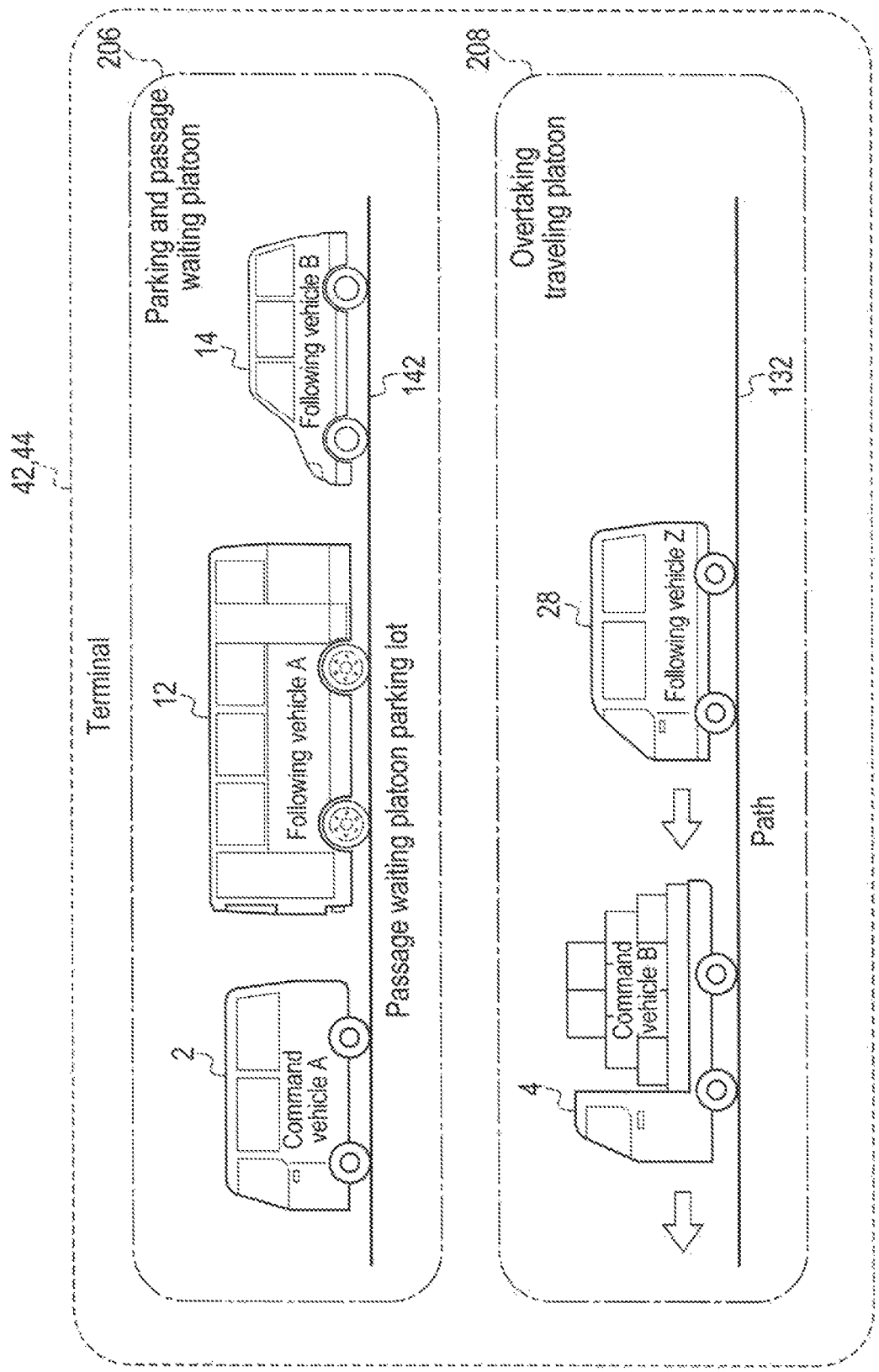
FIG. 24 is an explanatory view illustrating a method of overtaking between platoons using a terminal.

FIG. 24 illustrates an example of a method of overtaking in the vehicle platoons in the terminals 42 and 44. The vehicle platoon of a smaller overtaking acceleration that enters the terminals 42 and 44 earlier parks in the passage waiting platoon parking lot 142. An overtaking traveling platoon 208 (vehicle platoon of a larger overtaking acceleration) passes through a path 132 and performs overtaking through the vehicle platoon of the parking and passage waiting platoon 206.

An example of performing vehicle platoon overtaking during traveling without using platoon parking in the terminals 42 and 44 as explained above is illustrated in FIG. 25. The points of this method are:

making display for a general vehicle during overtaking in the vehicle platoon⇒performing avoidance of an accident, causing the only grouped vehicle guidance device (or the command vehicle) to guide during an overtaking process, and temporarily forming a mixed platoon during the overtaking process.

Thus, a careless contact risk in general vehicles can be reduced, a careless contact risk in the vehicle platoons can be reduced, and an accident can be prevented during overtaking in the vehicle platoons.

That is, when a platoon to overtake approaches from behind the traveling platoon (S101), display "under overtaking in vehicle platoons" is started for the general vehicles (S102). To unify guides in accordance with temporary mixed platoon organization (S105), the conventional command vehicle B 4 in the platoon to overtake (overtaking traveling platoon 208) is temporarily changed to following vehicle C 16 in step S104. In addition, almost simultaneously, the following vehicle Z 28 associated is notified of the change of the command vehicle (S103).

After the order of traveling of the vehicle platoons is changed (Yes in S111), the notice (display) to the general vehicles is ended (S114) and the mixed platoon is separated into a plurality of platoons (S115).

Figure 25:
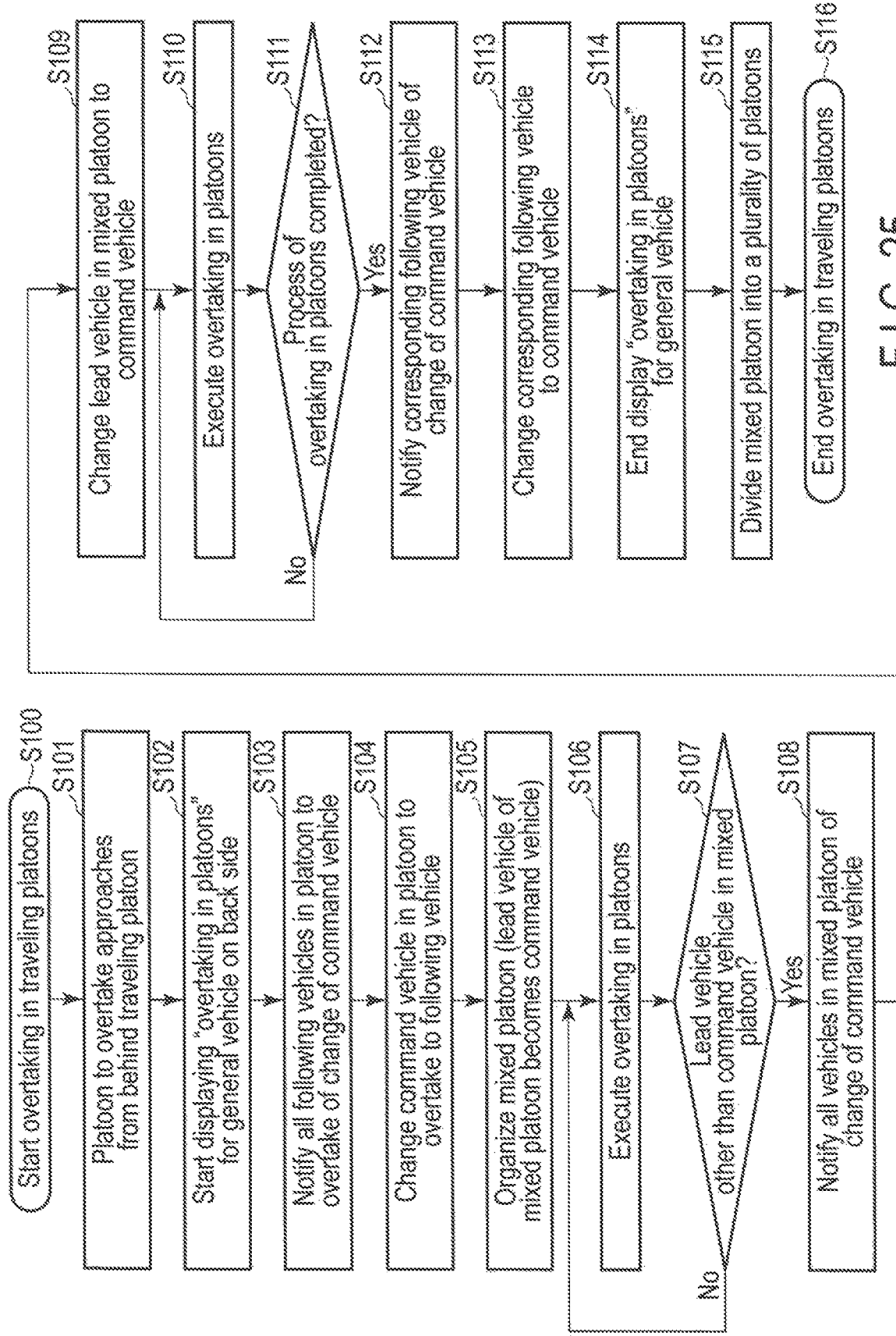
FIG. 25 is an explanatory flowchart illustrating a processing flow common to overtaking between the platoons during traveling.

In the example of FIG. 25, the lead vehicles in the mixed platoon are set to the command vehicles A 2 and B 4 as indicated by steps S105 and S109. However, the change of the command vehicles is not limited to this, but the change of the command vehicles A 2 and B 4 may be performed appropriately at arbitrary timing.

Figure 26:
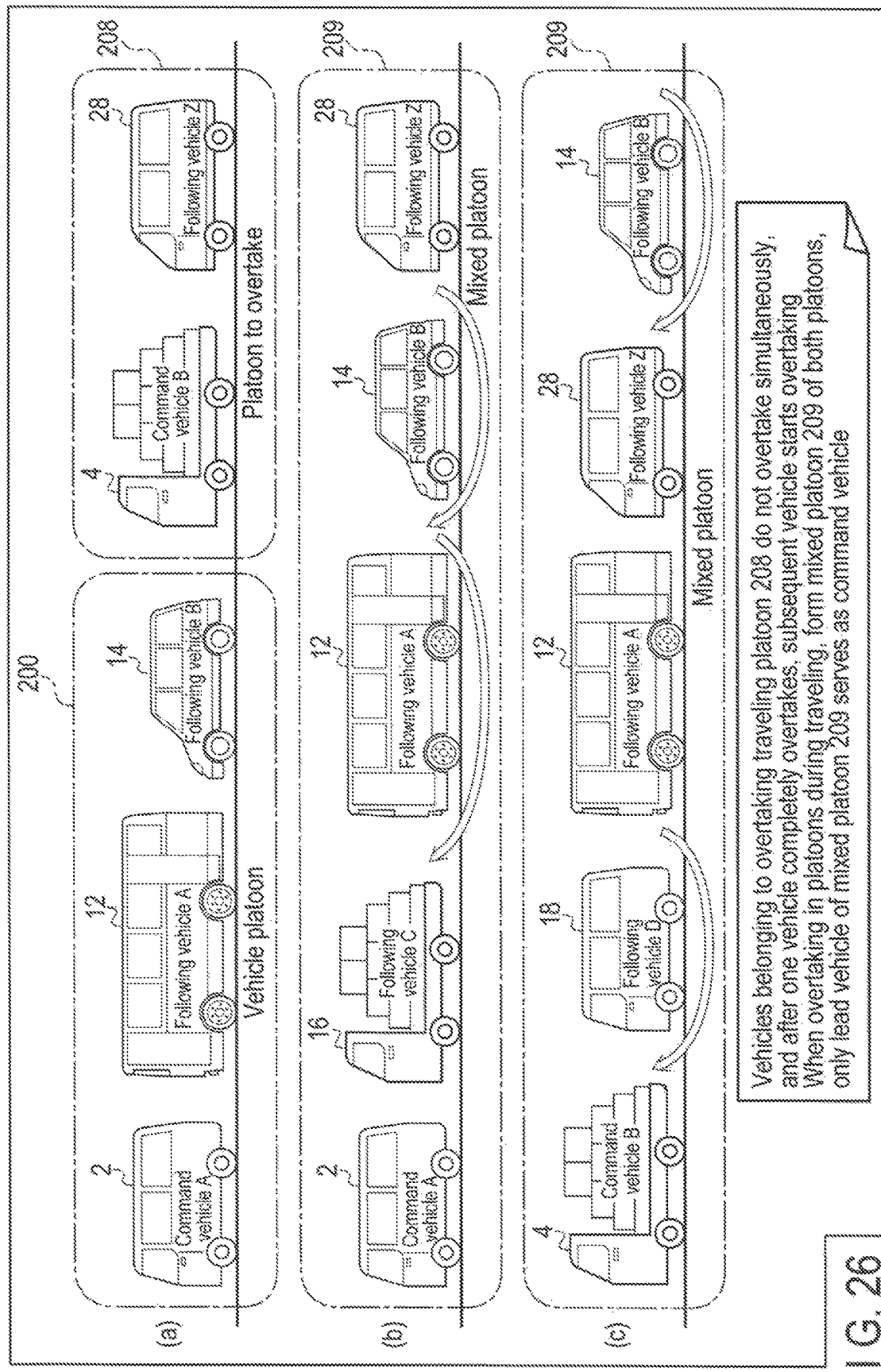
FIG. 26 is an explanatory view illustrating an example of overtaking between the platoons during traveling.

A specific example of the process of overtaking in the vehicle platoons as described with reference to FIG. 25 is illustrated in FIG. 26. The platoon vehicles 4 and 28 constructing the overtaking traveling platoon 208 do not perform the overtaking process simultaneously. After an overtaking process of the lead vehicle 4 is completely ended, the subsequent vehicle 28 starts an overtaking process.

Figure 27:
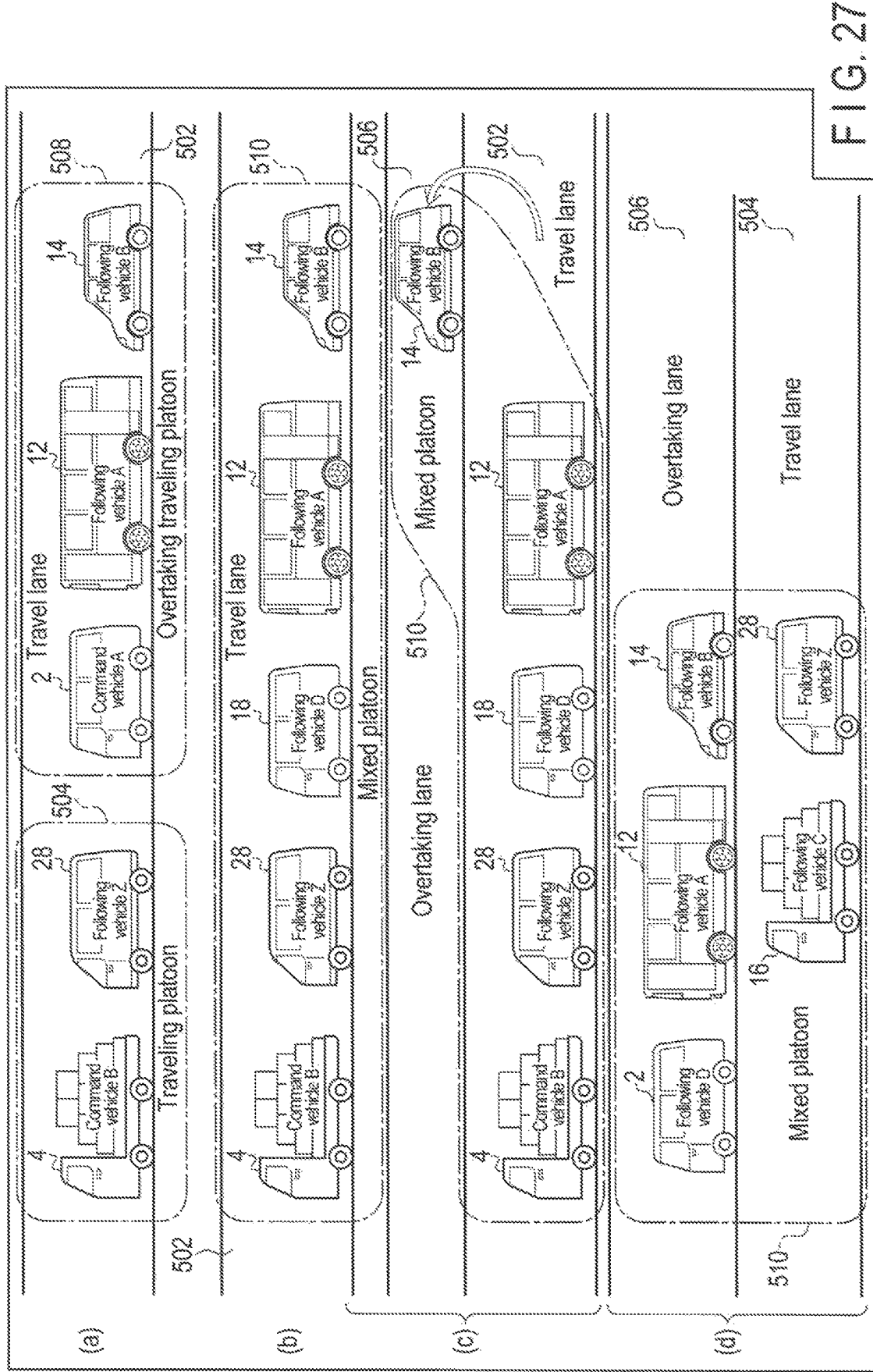
FIG. 27 is an explanatory view illustrating another example of overtaking between the platoons during traveling.

Another example of the process of overtaking in the vehicle platoons described with reference to FIG. 25 is illustrated in FIG. 27. An overtaking traveling platoon 508 approaches from behind a traveling platoon 504 leading as illustrated in FIG. 27 (*a*). When both the traveling platoons (vehicle platoons) 504 and 508 become closer than a predetermined distance, a mixed platoon 510 is temporarily organized as illustrated in FIG. 27 (*b*). Then, the command vehicle B 4 guides all of the vehicles in the mixed platoon 510. The conventional command vehicle A 2 is changed to a following vehicle D 18 in accordance with the organization of the mixed platoon 510. In addition, the following vehicles A 12 and B 14 are notified of the "change of the command vehicle A 2" prior to the change.

In FIG. 27 (*b*), all of the vehicles constituting the mixed platoon 510 travel on a travel lane 502. Then, when the vehicle platoon overtaking process starts, the following vehicle B 14 of the tail end changes the lane and enters overtaking lane 506 as illustrated in FIG. 27 (*c*).

At this time, only indication "change of lane to the overtaking lane 506" is sent from a command vehicle B (or the grouped vehicle guidance device) to the following vehicle B 14. When receiving this instruction, the following vehicle B 14 observes a condition of the overtaking lane 506 using an outside environmental monitoring unit 420 (FIG. 13) provided in the following vehicle B 14 and autonomously performs change of lanes at appropriate timing.

In the general cooperative traveling, an instruction "inter-vehicle interval 1000 from the front vehicle after a predetermined time interval Δt" is sent to the following vehicle B 14. In this case, however, an indication "travel speed" is sent from the command vehicle B (or the grouped vehicle guidance device).

When the following vehicle B 14 travels at a slow speed (irrespective of the overtaking lane 506), the inter-vehicle distance from the general vehicle traveling on a front side becomes largely increased. The following vehicle A 12 and the following vehicle D 18 sequentially move to the overtaking lane 506 by using the gap.

The method of FIG. 26 has a risk of contacting a general vehicle in the process of overtaking in the vehicle platoons. Since the method of FIG. 27 has a small risk of contacting a general vehicle in the process of overtaking the vehicle platoons as compared with this, the method has an effect of easily avoiding a contact accident in the process of overtaking in the vehicle platoons.

Use of the method of FIG. 27 is not limited to the process of overtaking in the vehicle platoons, but the method may be used in other conditions. For example, this method may be used when the vehicle platoon 200 moves from the terminals 42 and 44 to the travel lanes 102 and 104. When the number of vehicles constituting the vehicle platoon 200 is large, every small number of (for example, three or four) vehicles may move to the travel lanes 102 and 104.

Figure 28:
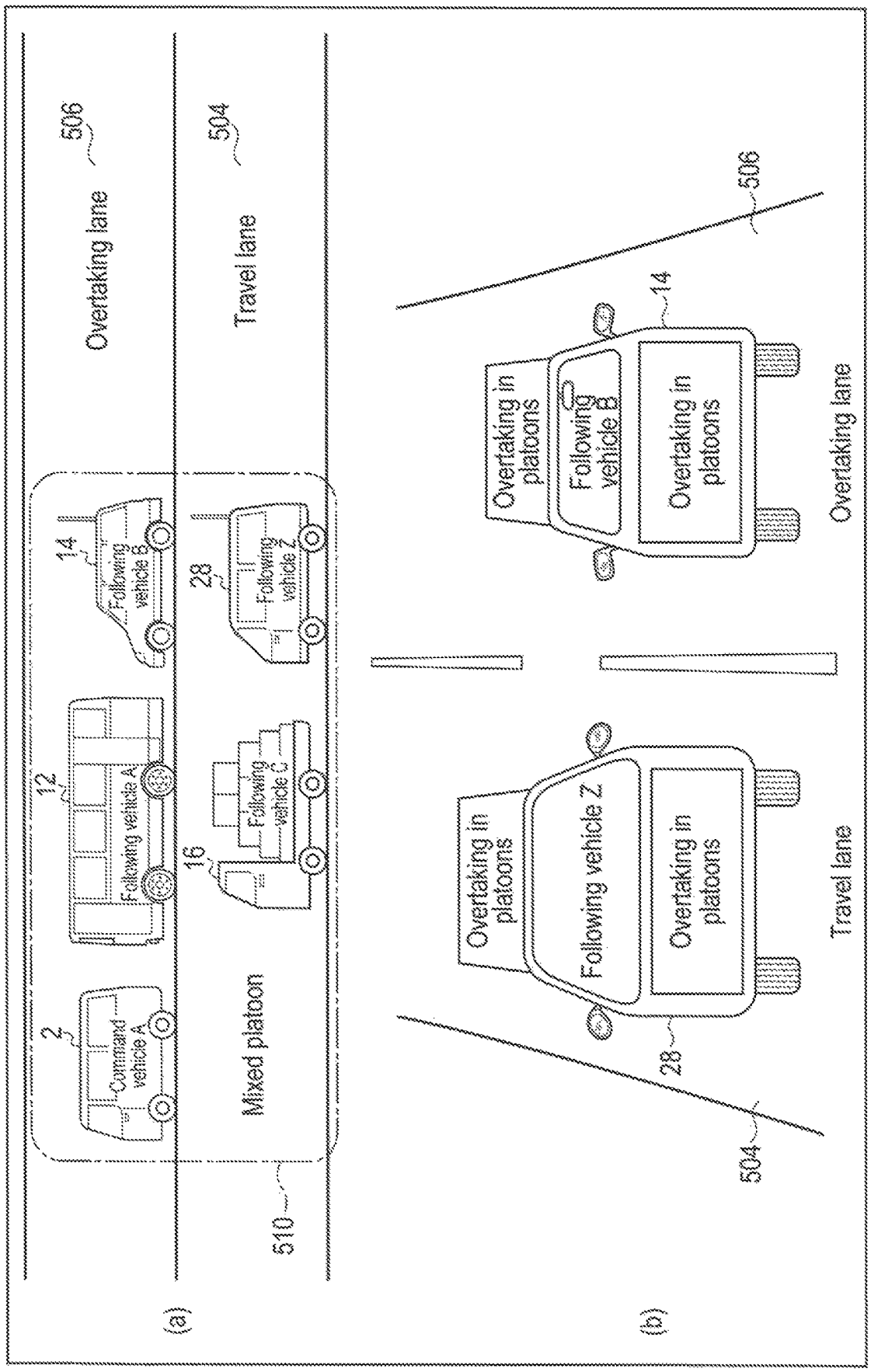
FIG. 28 is an explanatory view illustrating an example of displaying overtaking between the traveling platoons for the other general vehicle.

For example, when the above process is performed at the place where the main road (expressway) 50 is composed of two lanes, i.e., the travel lane 504 and the overtaking lane 506, the mixed platoon 510 temporarily occupies a part of the main road (expressway) 50. In this case, when the general vehicle is notified of the condition in the process of overtaking in the vehicle platoons as illustrated in FIG. 28 (*b*), the stress of the driver of the general vehicle is reduced and a cause of occurrence of an accident is relaxed.

Figure 29:
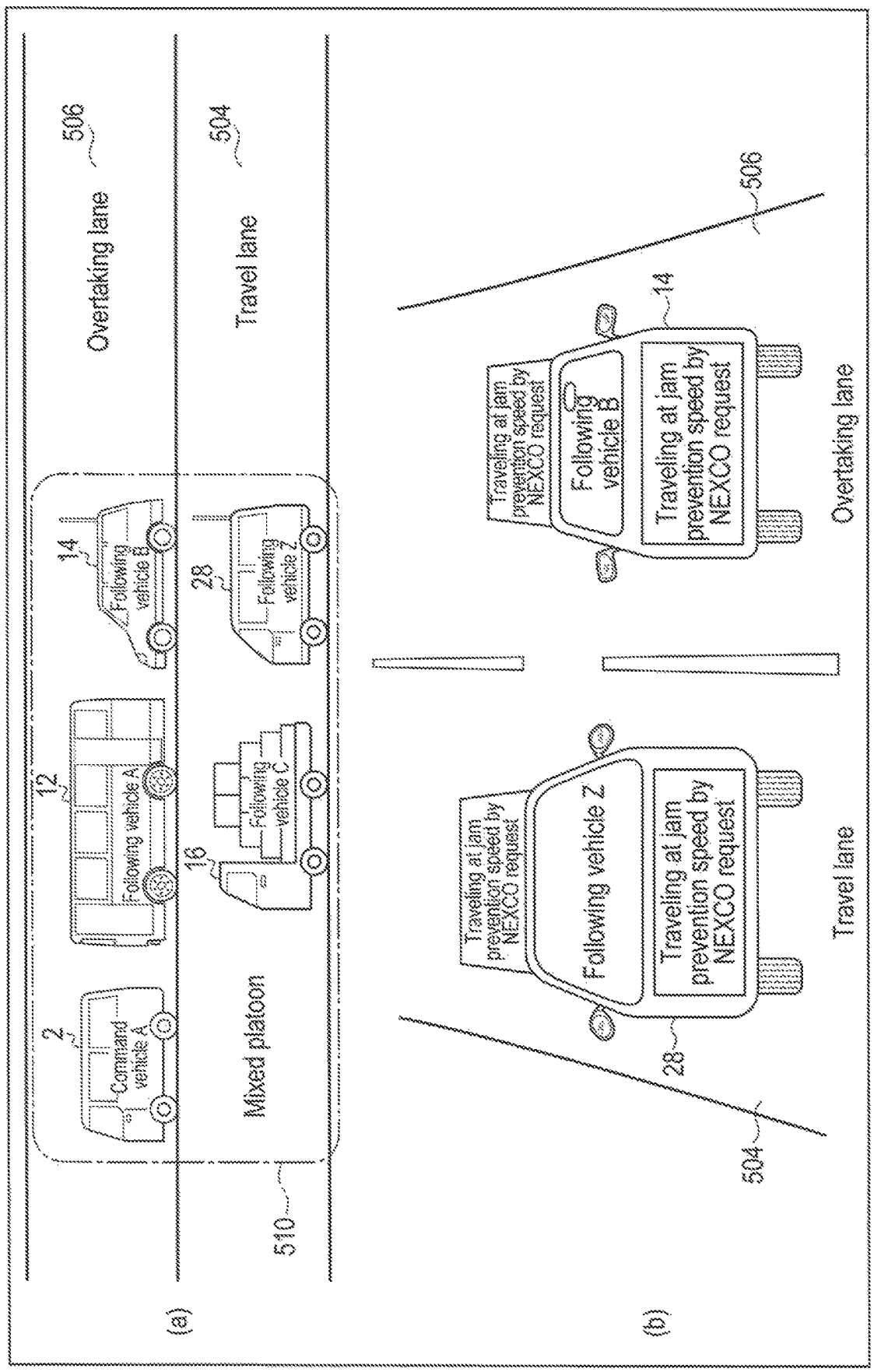
FIG. 29 is an explanatory view illustrating an example of displaying the other information for a general vehicle.

Another application example of the above method is illustrated in FIG. 29. A phenomenon that although smooth traveling can be secured by all of the vehicles traveling at a designated speed on the travel lane 504, traffic jam occurs by a specific vehicle performing a higher speed traveling than required is known. When a specific vehicle platoon (mixed platoon 510) is made to travel at a designated speed in response to a request from a management company (for example, NEXCO) of the main road (expressway) 50 to the vehicle navigation management company, smooth traveling of all the vehicles on the main road (expressway) 50 can be secured. In this case, when the display as illustrated in FIG. 29 (*b*) is performed, the cooperation of the general vehicle can easily be obtained.

In the server 310 of the vehicle navigation management company, organization of the vehicle group (S203) is performed based on general reception (S200 in FIG. 4) of the reservation (for example, using the Internet). Incidentally, frequency of reservation is greatly varied depending on a season, day of the week, and time and date.

Figure 30:
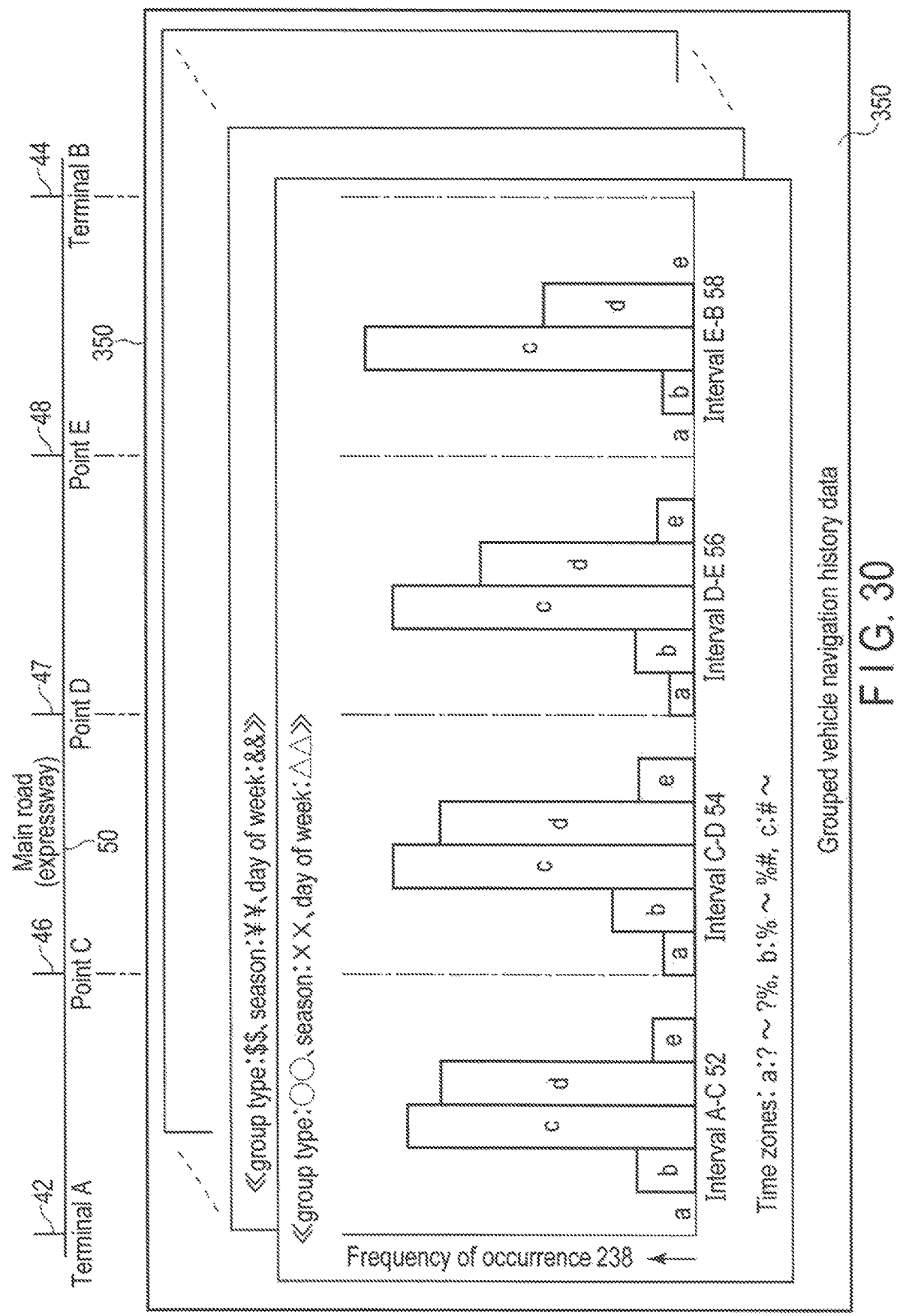
FIG. 30 is an explanatory view illustrating an example in the operation history data of the grouped vehicle.

To respond to large variation of the frequency of reservation flexibly and quickly, the vehicle group organization may be performed using past navigation history data in the server 310 of the vehicle navigation management company. An example of contents of the grouped vehicle navigation management data (including the history) 322 stored in the database 318 that the server 310 of the vehicle navigation management company manages is illustrated in FIG. 30.

Previously stored grouped vehicle navigation history data 350 is stored in the grouped vehicle navigation management data (including the history) 322. A time zone of one day is divided into a, b, c, d, e, . . . in the grouped vehicle navigation history data 350. In addition, points C 46, D 47, and E 48 are defined in accordance with the arrangement place of an interchange which exists between the terminals A 42 and B 44. A history of the number of the vehicle platoons passing through an interval between points (for example, interval C-D 54) in each time zone is displayed by a bar graph.

Since the frequency of reservation is varied depending on a season and a day, the frequency of reservation is graphed in each season and day. The "group types" are classified for each vehicle platoon in which the parameter values inherent to vehicles (such as the overtaking acceleration and the gross weight) fall within predetermined ranges.

An example of a method in which the server 310 of the vehicle navigation management company estimates the frequency of reservation using the data will be described. For example, it is assumed that the number of reservations in time zones a and b of interval E-B 58 is extremely small. However, the grouped vehicle navigation history data 350 shows a tendency that frequency of occurrence 238 radically increases in time zone c. Therefore, the server 310 of the vehicle navigation management company can prepare for hailing vehicles soon using the demand forecast.

Figure 31:
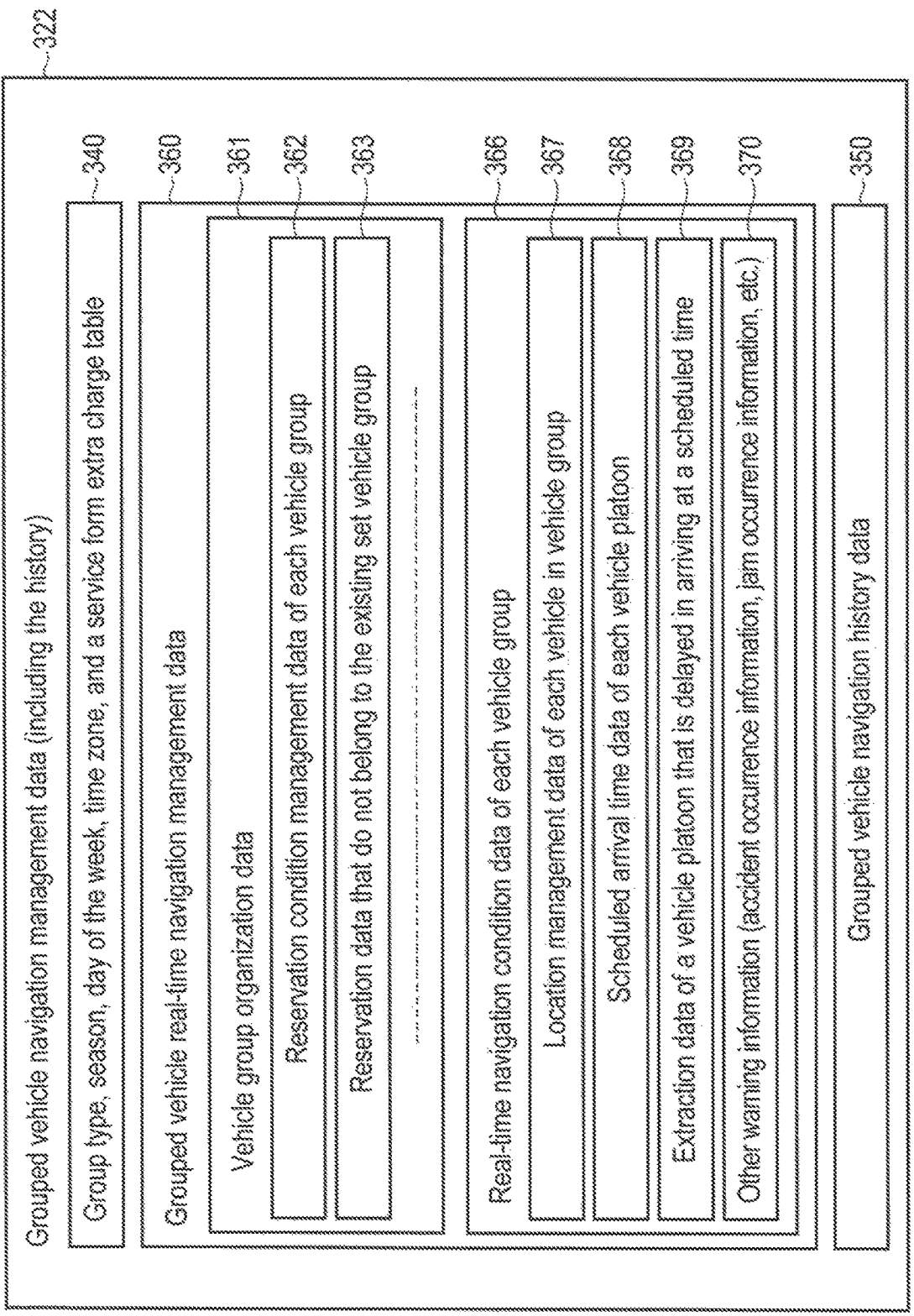
FIG. 31 is an explanatory view illustrating an example of details in operation management data of the grouped vehicle.

In addition, not only the grouped vehicle navigation history data 350, but also various types of data illustrated in FIG. 31 are stored in the grouped vehicle navigation management data (including the history) 322.

In the transport service indicated in the present embodiment, fees are different depending on group type, season, day of the week, time zone, and service form. Therefore, at the acceptance of reservation (using, for example, the Internet), the server 310 of the vehicle navigation management company performs informing the fees or requesting fees by referring to the group type, season, day of the week, time zone, and a service charge table 340.

Grouped vehicle real-time navigation management data 360 in FIG. 31 include vehicle group organization data 361 related to a service plan of the transport service which is appropriately changed in response to the user reservation, and real-time navigation condition data of each vehicle group 366 indicative of a monitoring result of the navigation condition.

In addition, the vehicle group organization data 361 include reservation condition management data of each vehicle group 362 and reservation data 363 that do not belong to the existing set vehicle group excluded from the vehicle group organization at present.

The real-time navigation condition data of each vehicle group 366 is composed of location management data of each vehicle in vehicle group 367, scheduled arrival time data of each vehicle platoon 368, extraction data 369 of a vehicle platoon that delays arriving on a scheduled time corresponding to warning data, other warning information 370, and the like.

Figure 32:
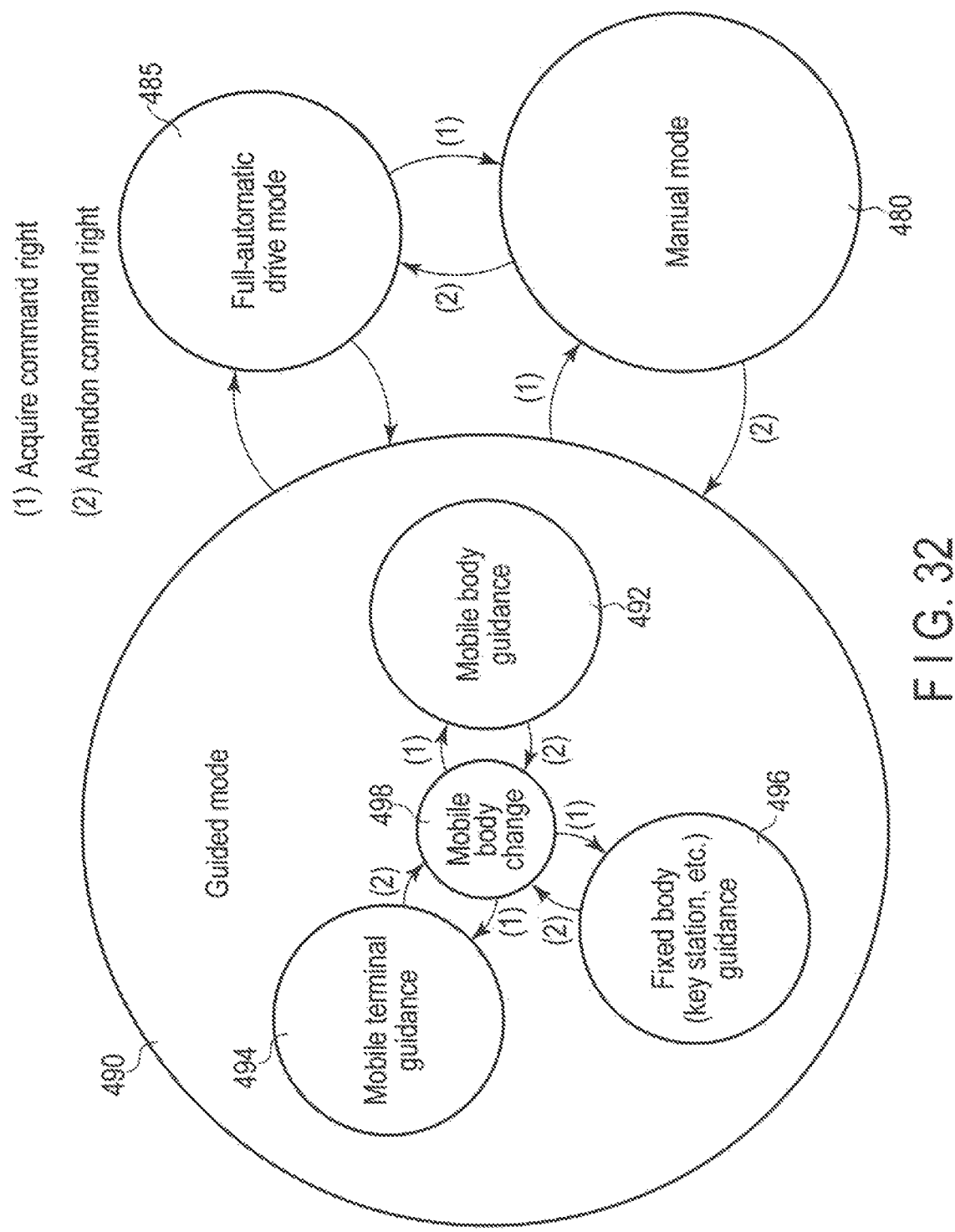
FIG. 32 is a view illustrating transition between drive modes of the vehicle.

In the vehicle capable of cooperative travel in the present embodiment, as illustrated in FIG. 32, the manual drive mode 480 for driving of a general driver, the full-automatic drive mode 485, and the guided mode 490 are defined.

In the modes, for example, when the vehicle is guided by the grouped vehicle guidance machine (or the command vehicle A 2), the guidance corresponds to movable body guidance 492. In contrast, for example, when the vehicle is guided by a fixed body such as the server 310 of the vehicle navigation management company, the guidance corresponds to a fixed body guidance 496. In addition, for example, in a process of "controlling the lock of the door using a mobile terminal 312", the guidance corresponds to mobile terminal guidance 494.

In the present embodiment, for example, a process that "the owner of the vehicle out of the vehicle makes a vehicle platoon automatically organize with the mobile terminal 312" can be performed. In this case, the guidance may be preliminarily set to mobile terminal guidance 494 and may be changed to movable body guidance 492 through a path of movable body change 498.

Figure 33:
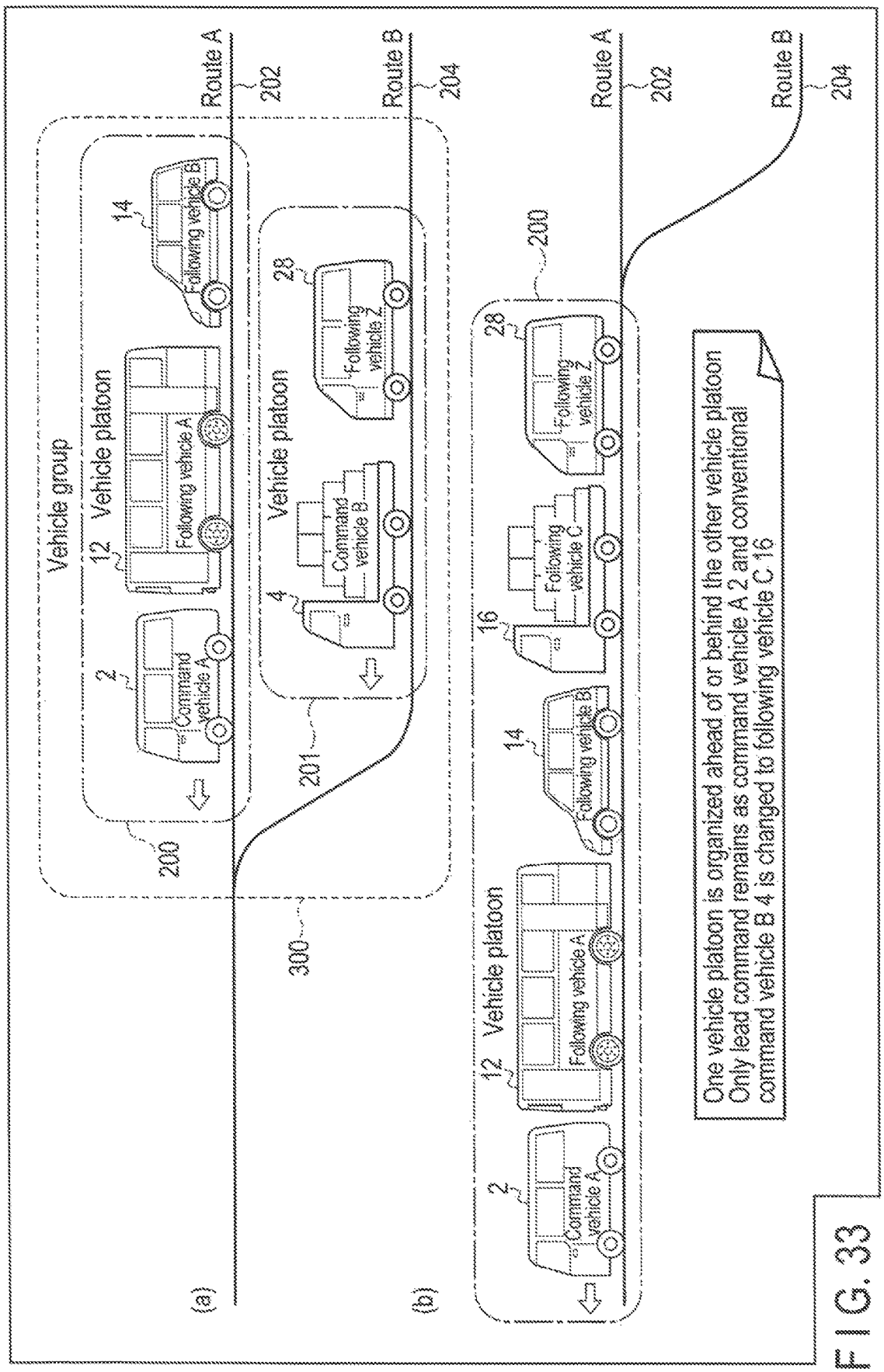
FIG. 33 is an explanatory view illustrating a status immediately after recombination of a plurality of different platoons.

FIG. 33 illustrates a method of merging vehicle platoons 200 and 201 in the system of the present embodiment. One vehicle platoon 201 is organized ahead of or behind the other vehicle platoon 200 to merge.

A process flow at this time is illustrated in FIG. 34. When a request for platoon merging is received in step S60, history information of the drive unit control system 444 of each vehicle platoon that is a target of merging is obtained (S61). Then, the parameter values (of the overtaking acceleration, gross weight, and the like) of the target vehicle are calculated to determine possibility of platoon merging (S62).

As the platoon merging method, if the terminals 42 and 44 are located near the platoons (Yes in S65), the platoon merging (S67) in the terminals 42 and 44 is performed. In contrast, if the terminals 42 and 44 are not located near the platoons (No in S65), the merging process is performed during traveling following step S69.

Figure 35:
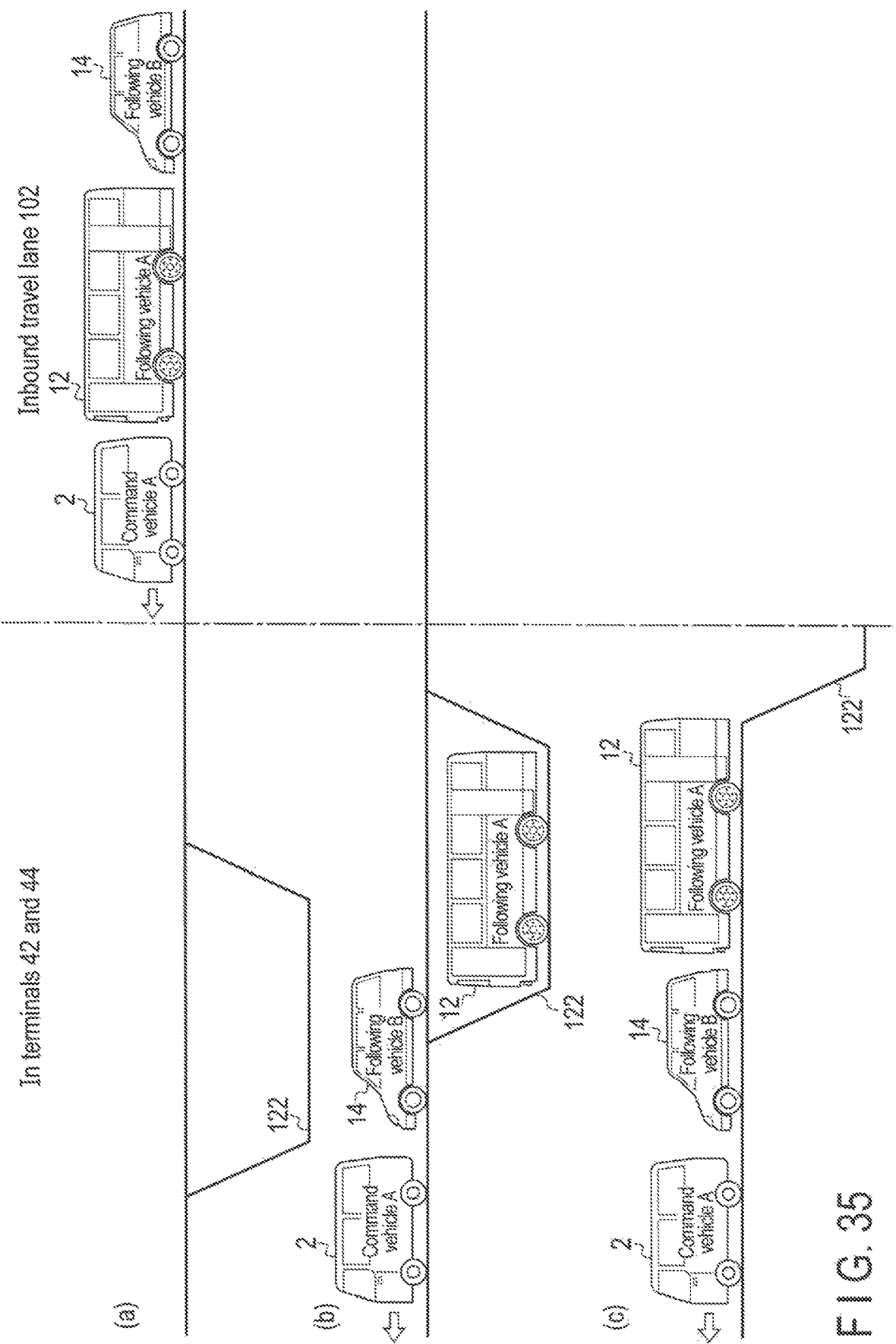
FIG. 35 is an explanatory view illustrating a method of changing a platoon order in the terminal.

An example of a method of changing a traveling order in the vehicle platoon using the terminals 42 and 44 is illustrated in FIG. 35. A vehicle (following vehicle A 12) which is to change its traveling order is made to temporarily retreat to a space for change of platoon order 122 and then the traveling order is changed.

Figure 36:
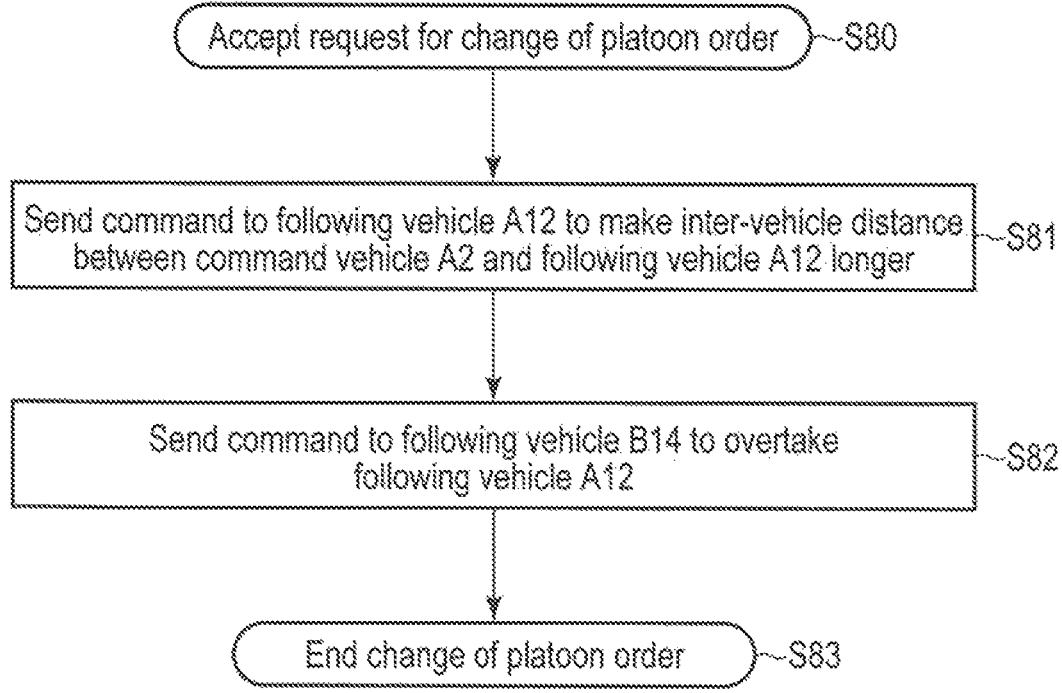
FIG. 36 is an explanatory flowchart illustrating an example of a method of changing the platoon order during the driving.

In contrast, the traveling order may be changed during traveling as illustrated in FIG. 36. In this case, the inter-vehicle distance between predetermined vehicles (between the command vehicle A 2 and the following vehicle A 12) is made longer and a target vehicle (following vehicle A 12) is made to enter the interval.

Figure 37:
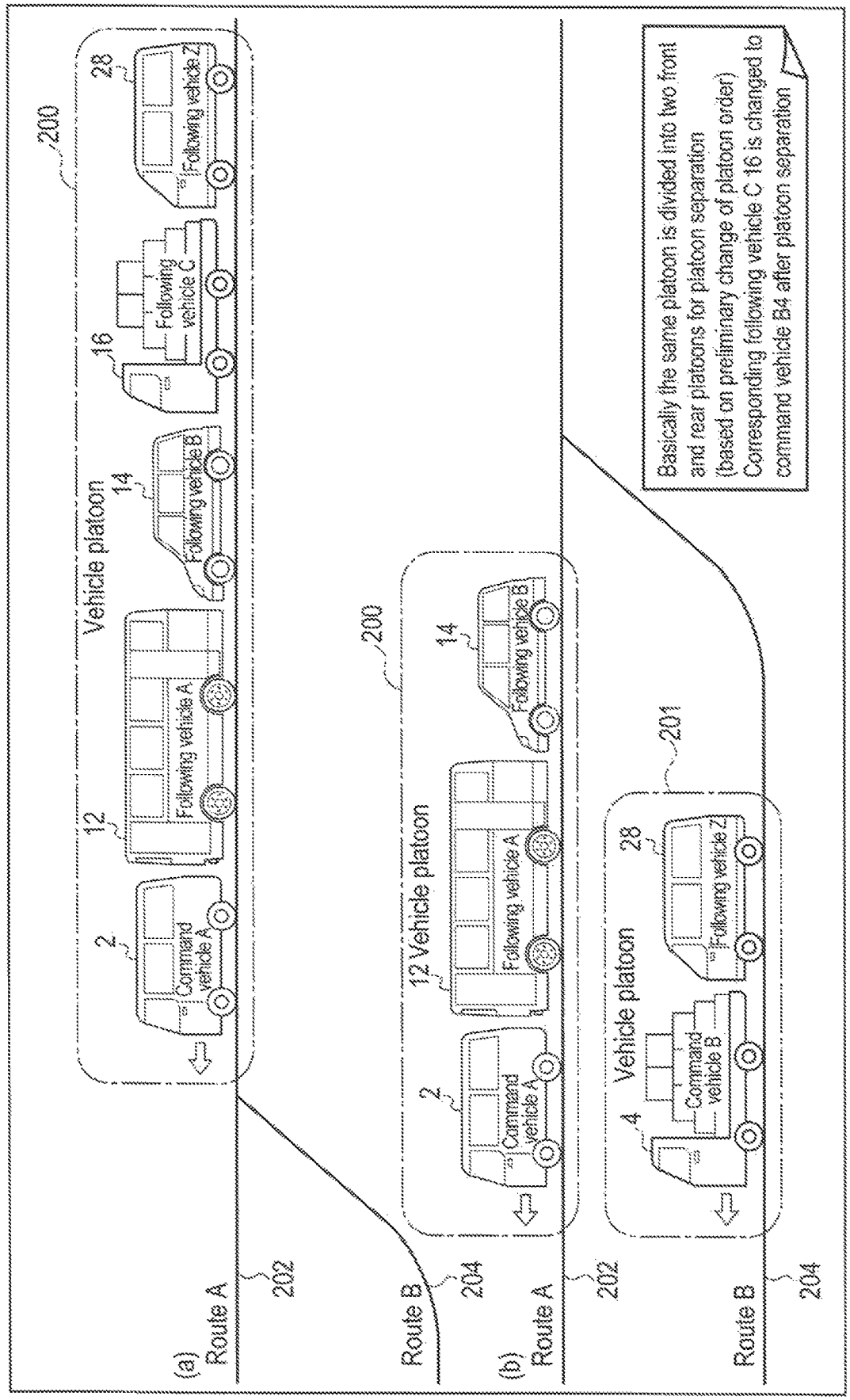
FIG. 37 is an explanatory view illustrating an example of a platoon dividing method.
Figure 38:
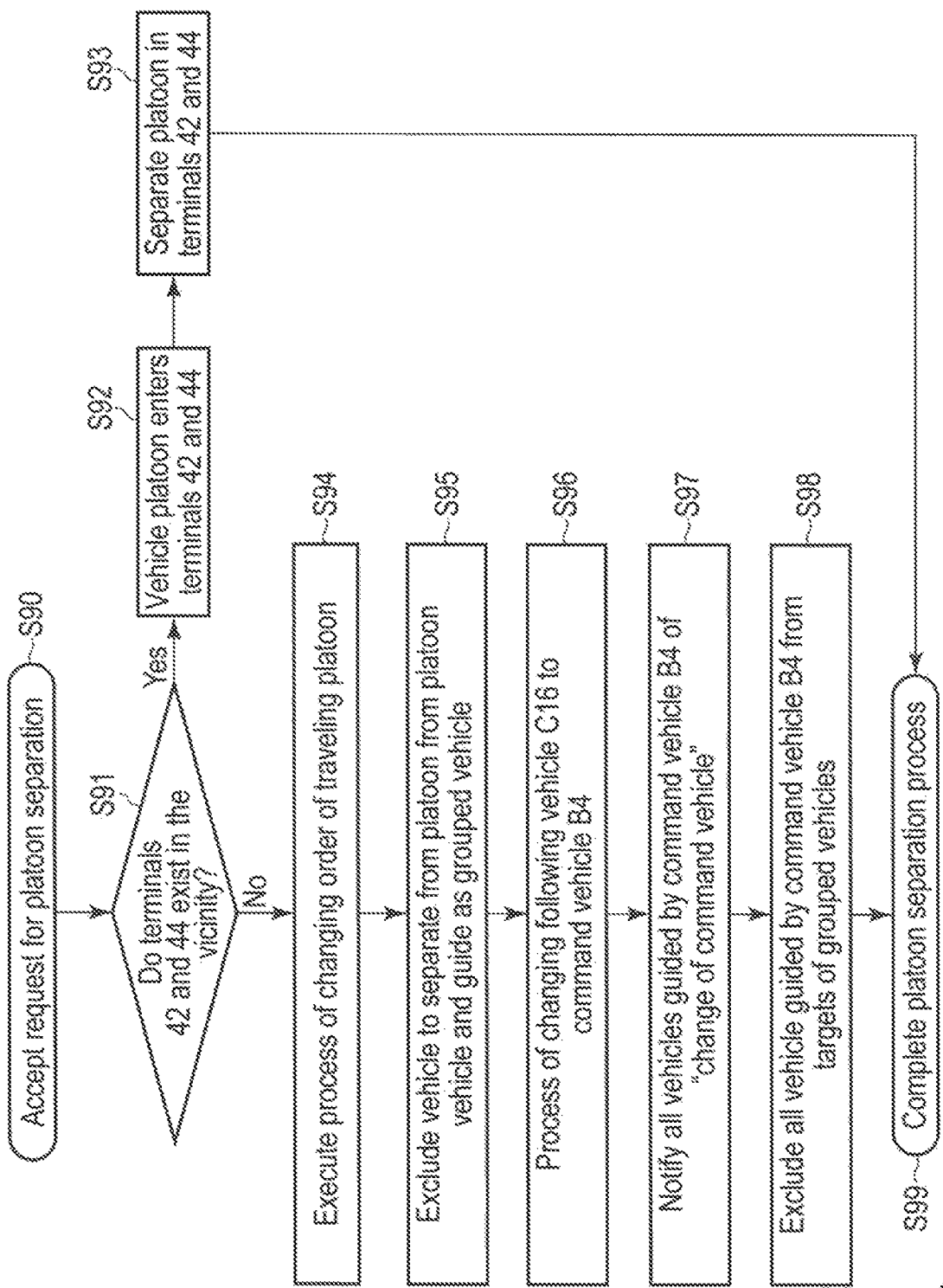
FIG. 38 is a flowchart illustrating a relationship between the platoon division and the command vehicle change.

The platoon separation may divide the platoon into two front and rear platoons as illustrated in FIG. 37. FIG. 37 illustrates an example of a platoon separation method using the terminals 42 and 44, and FIG. 38 illustrates an example of a method of separating the platoon during traveling.

In the vehicle platooning method in the present embodiment, the following vehicle A 12 under platooning is set to the guided mode 490 by the mobile body guidance 492. Therefore, absence of the driver is permitted during the guided mode 490 period.

Figure 39:
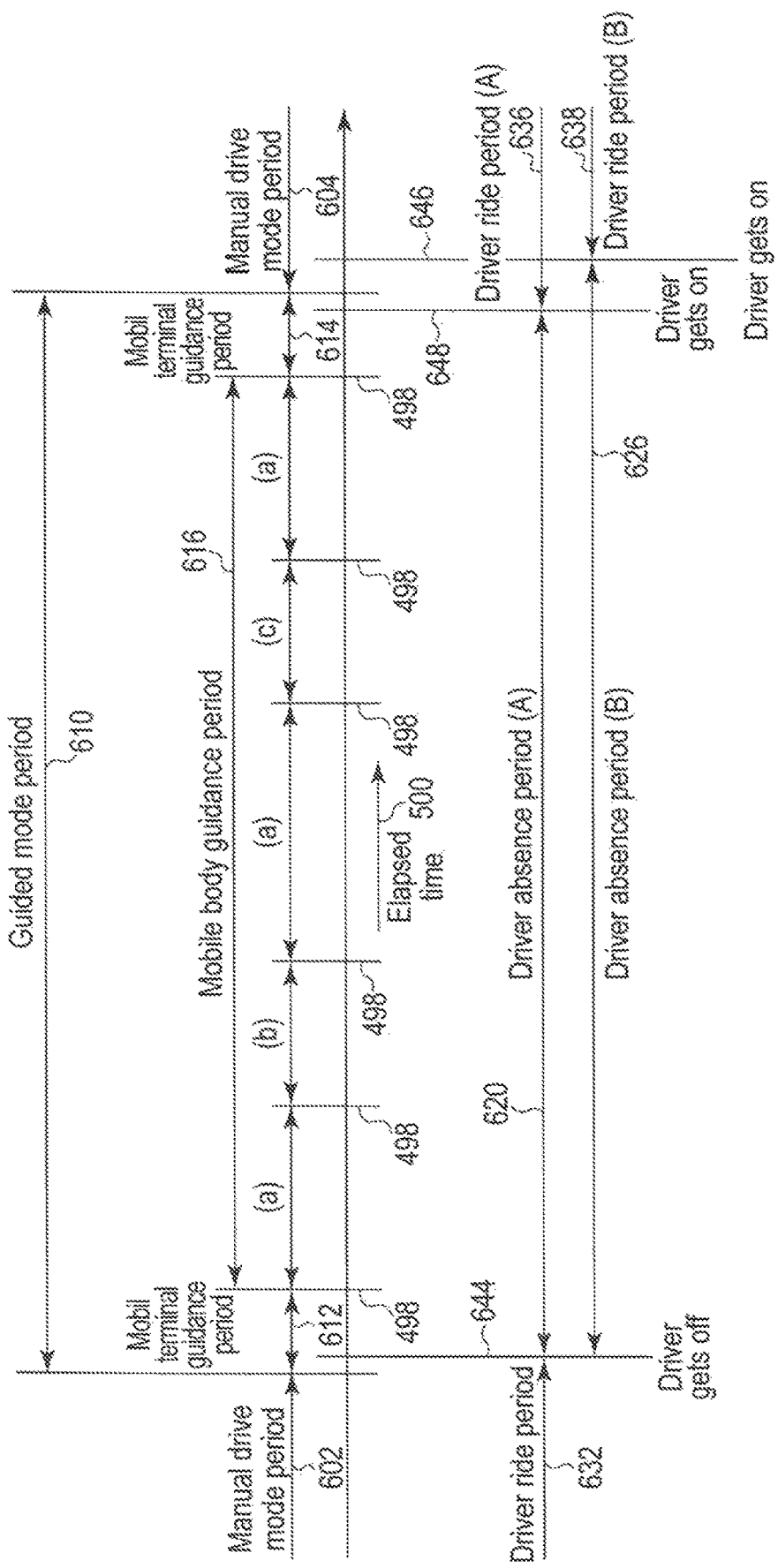
FIG. 39 is an explanatory view illustrating a relationship between a vehicle participating in a platoon and the timing of the driver getting on and off the vehicle.

A relationship between the driver's timing of getting on and off and the set mode in the following vehicle A 12 is illustrated in FIG. 39. The ride of the driver is indispensable during manual drive mode periods 602 and 604. Therefore, driver ride periods 632, 636, and 638 cover the manual drive mode periods 602 and 604 (wider than the manual drive mode periods 602 and 604).

At the point in time of locking the door using the mobile terminal 312 at the time 644 when the driver gets off, the manual drive mode period becomes a mobile body guidance period 612. After that, at the point in time of entering the vehicle group 300 using the mobile terminal 312, the period is changed to a movable body guidance period 616. Then, when the transport service in the vehicle group 300 is ended, the period returns to a mobile terminal guidance period 614.

The important element is that "the driver getting off 644 during the guided mode period 610" is necessary. An effect of starting smooth transport service can be thereby obtained. In contrast, as illustrated in FIG. 39, the driver's riding timing 646 and 648 may be set be before and after the timing of ending the guided mode period 610.

Figure 40:
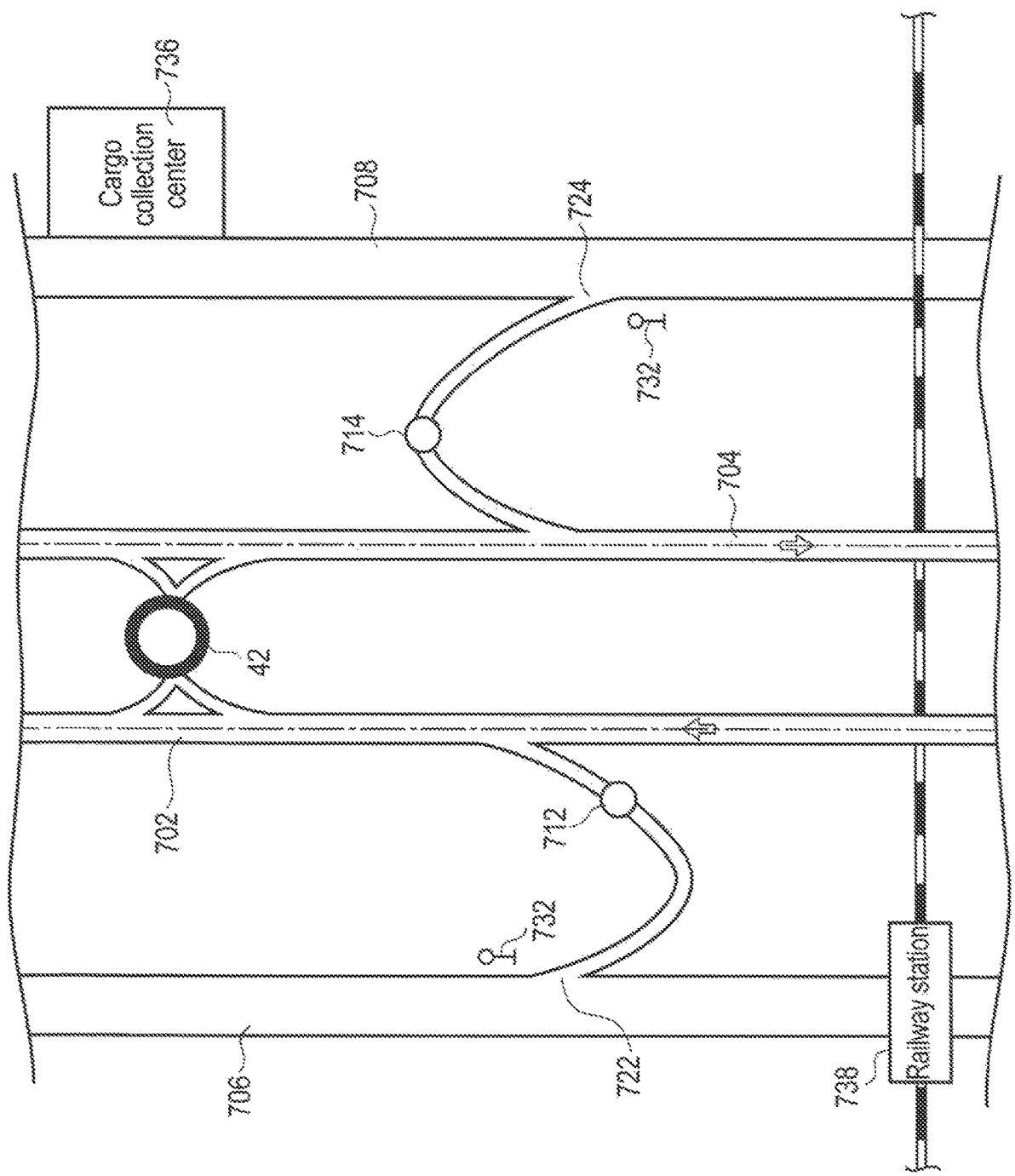
FIG. 40 is an explanatory view illustrating an example of a map of surrounding of the terminal.

An example of a map of surroundings of the terminal 42 installed in the middle of the route of the main road (freeway) 50 is illustrated in FIG. 40. Junctions 722 and 724 for traveling from public highways 706 and 708 to interchanges are provided such that the vehicles can travel to expressways 702 and 704 via interchanges 712 and 714.

Figure 41:
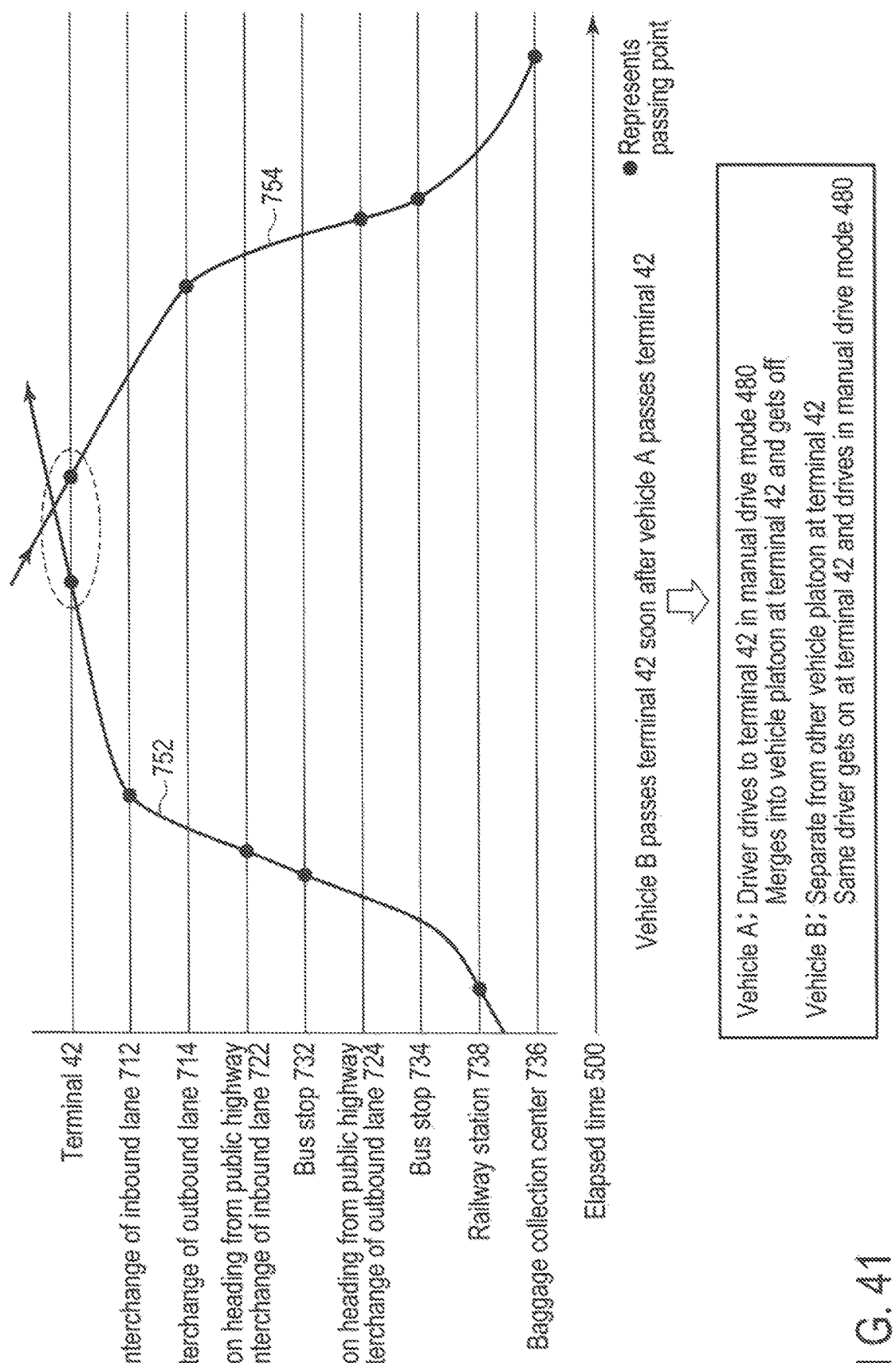
FIG. 41 is an explanatory view illustrating a vehicle operation table based on a first example.

A navigation curve at which a vehicle A 752 traveling from the public highway 706 and entering the terminal 42 from an inbound lane 702 of the expressway via the interchange 712, and a vehicle B 754 exiting from the terminal 42 and entering the public highway 708 from the outbound lane 704 of the expressway are displayed to overlap, is illustrated in FIG. 41.

A driver directly drove the vehicle A 752 in the manual drive mode 480 before entering the terminal 42. Then, the driver got off after the drive mode changed to the guided mode 490 at the terminal 42. After that, the driver getting off at the terminal 42 changed the vehicle to the vehicle B 754 and returned to the cargo collection center 736.

In contrast, although a navigation curve 752 of a vehicle A and a navigation curve 756 of a vehicle C follow substantially the same route in the navigation curves illustrated in FIG. 42, the driver passes through different routes. In the example of FIG. 41, the driver got off the vehicle A 752 at the terminal 42. In contrast, in the example of FIG. 42, the driver got off the vehicle C 756 at the junction 722 where the vehicle C headed from the public highway 706 to the interchange. Then, the driver returned to the cargo collection center 736 by a local bus 758 at a bus stop 732 installed near the point of getting off.

In the vehicle group navigation system of the present embodiment, personnel expenses can be reduced as the on-duty hours of the driver are shorter. Therefore, as illustrated in the example of FIG. 42, the on-duty hours of the driver are shortened by using not only the platoon vehicle, but the general vehicle such as a bus or taxi, and the effect of reducing the personnel expenses can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transport service method for a plurality of self-driving vehicles in which a parameter value inherent to vehicles falls within a predetermined range, the method comprising:
   organizing the plurality of self-driving vehicles into a vehicle group including a self-driving command vehicle and at least one self-driving following vehicle;
   performing transport service of a load using an inter-vehicle distance measurement unit, a communication control unit, and a travel control unit, the inter-vehicle distance measurement unit measuring an inter-vehicle distance from a front vehicle, the communication control unit allowing exchange of information with other vehicles in the vehicle group, and the travel control unit controlling cooperative travel of the plurality of self-driving vehicles;
   obtaining, by a server which manages navigation of the plurality of self-driving vehicles, information about the plurality of self-driving vehicles at an acceptance of reservation performed prior to performing the transport service, wherein the information includes at least the parameter value of each of the plurality of self-driving vehicles; and
   achieving an organization condition of the vehicle group based on the information.

2. The transport service method of claim 1, wherein:
   the parameter value comprises a gross weight when loaded with the load; and
   a ratio of a maximum value to a minimum value of the parameter value of each of the self-driving vehicles in the same vehicle group is set to 1000 or less.

3. The transport service method of claim 1, further comprising:
   determining, by the server, adaptability of a predetermined self-driving following vehicle for the vehicle group before the predetermined self-driving following vehicle merges with the vehicle group; and
   making a notice to the predetermined self-driving following vehicle when it is determined that the predetermined self-driving following vehicle does not have an aptitude for the vehicle group.

4. The transport service method of claim 1, further comprising:
   determining, by the self-driving command vehicle, adaptability of a predetermined self-driving following vehicle for the vehicle group when the predetermined self-driving following vehicle is in cooperative traveling in the vehicle group, and
   making a notice to the server when it is determined that the predetermined self-driving following vehicle does not have an aptitude for the vehicle group.

5. The transport service method of claim 1, wherein:
   the parameter value comprises an overtaking acceleration when loaded with the load; and
   a ratio of a maximum value to a minimum value of the parameter value of each of the self-driving vehicles in the same vehicle group is set to 1000 or less.

\* \* \* \* \*